(12) United States Patent
Yokoyama et al.

(10) Patent No.: US 7,586,242 B2
(45) Date of Patent: Sep. 8, 2009

(54) ACTUATOR AND METHOD FOR MANUFACTURING PLANAR ELECTRODE SUPPORT FOR ACTUATOR

(75) Inventors: Kazuo Yokoyama, Osaka (JP); Katsuhiko Asai, Nara (JP); Nozomu Matsukawa, Nara (JP); Masaki Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 166 days.

(21) Appl. No.: 10/588,260

(22) PCT Filed: Feb. 3, 2005

(86) PCT No.: PCT/JP2005/001591

§ 371 (c)(1), (2), (4) Date: Aug. 3, 2006

(87) PCT Pub. No.: WO2005/076452

PCT Pub. Date: Aug. 18, 2005

(65) Prior Publication Data

US 2007/0159031 A1 Jul. 12, 2007

(30) Foreign Application Priority Data

Feb. 5, 2004 (JP) ............................. 2004-028838

(51) Int. Cl.
 H01L 41/047 (2006.01)
(52) U.S. Cl. ...................... 310/365; 310/800
(58) Field of Classification Search ........... 310/365, 310/366, 800
See application file for complete search history.

(56) References Cited

U.S. PATENT DOCUMENTS 4,651,310 A * 3/1987 Kaneko et al. .............. 367/140
6,629,341 B2 * 10/2003 Wilkie et al. ............... 29/25.35
7,034,432 B1 * 4/2006 Pelrine et al. ............... 310/309
2005/0027198 A1 * 2/2005 Couvillon, Jr. ............. 600/466
2005/0200243 A1 * 9/2005 Spangler et al. ............ 310/338

FOREIGN PATENT DOCUMENTS

| EP | 0 924 033 | 6/1999 |
| EP | 0 943 402 | 9/1999 |
| JP | 6-133922 | 5/1994 |
| JP | 7-83159 | 3/1995 |
| JP | 11-93827 | 4/1999 |
| JP | 11-169394 | 6/1999 |
| JP | 11-280639 | 10/1999 |
| WO | 97/26039 | 7/1997 |

OTHER PUBLICATIONS

Machine translation of JP 11-169394.*

* cited by examiner

*Primary Examiner*—Quyen Leung
*Assistant Examiner*—Derek J Rosenau
(74) *Attorney, Agent, or Firm*—Wenderoth, Lind & Ponack, L.L.P.

(57) ABSTRACT

An actuator as a drive source of robots and the like is usable for housekeeping assistance, job assistance, and nursing help. The drive source itself is small, light, flexible, and safe. A manufacturing method for a planar electrode support therefor is also described. The actuator has an electrolyte layer in contact with a conductive polymer layer disposed in between a first electrode having the conductive polymer layer attached thereto and opposite second electrode, for deforming the conductive polymer layer by application of electric fields to the electrodes. The first electrode has low rigidity in a longitudinal direction of the conductive polymer layer to facilitate expansion and contraction thereof.

19 Claims, 49 Drawing Sheets

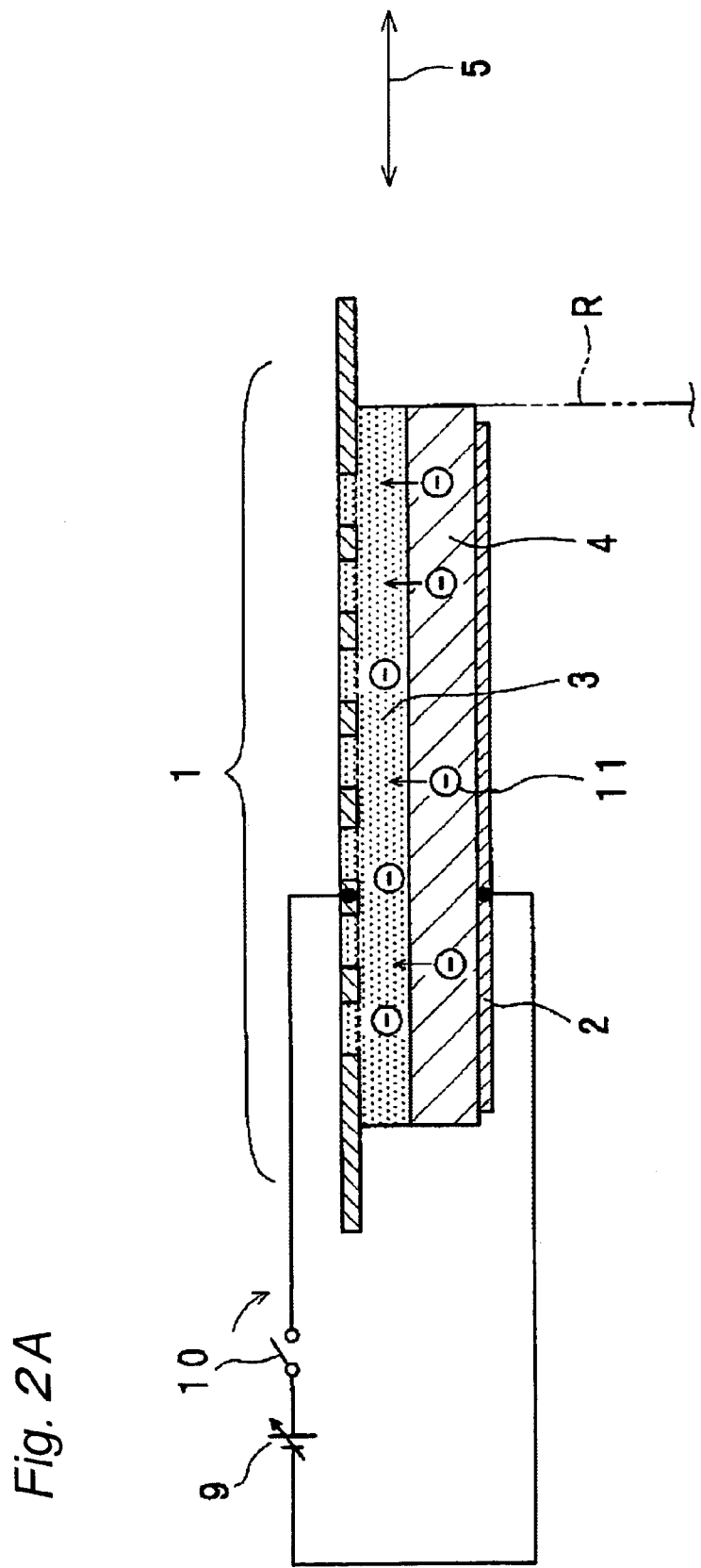

Fig. 4

| SHAPE OF ELECTRODE | (a) FLAT PLATE (SOLID SHAPE) | (b) FIRST EMBODIMENT | (c) CASE OF ALIGNING LINK PORTIONS IN LONGITUDINAL DIRECTION | (d) WAVEFORM |
|---|---|---|---|---|
| ELECTRODE CONFIGURATION DIAGRAMS | | | | |
| ASSUMED VALUE FOR CALCULATION<br>MATERIAL: SUS304<br>ELASTIC MODULUS:<br>$E=0.072 \times 10^{12}$ N/m$^2$<br>PLATE THICKNESS: 0.010mm | SIZE<br>WIDTH: 14mm, LENGTH: 8mm<br>LOAD (DISTRIBUTED LOAD): TOTAL<br>LOAD =1mN | SIZE<br>TOTAL WIDTH: 14mm,<br>TOTAL LENGTH: 8mm,<br>LINE WIDTH: 0.1mm,<br>Pitch: 1mm,<br>LOAD (CONCENTRATED LOAD): 1mN | SIZE<br>TOTAL WIDTH: 14mm,<br>TOTAL LENGTH: 8mm,<br>LINE WIDTH: 0.1mm,<br>Pitch: 1mm,<br>LOAD (CONCENTRATED LOAD): 1mN | SIZE<br>TOTAL WIDTH: 14mm,<br>TOTAL LENGTH: 8mm,<br>LINE WIDTH: 0.1mm,<br>Pitch: 8mm,<br>LOAD (CONCENTRATED LOAD): 1mN |
| CALCULATION RESULT | DISPLACEMENT<br>0.308 μm | DISPLACEMENT<br>50.56mm | DISPLACEMENT<br>38.6 μm | DISPLACEMENT<br>3.31mm |
| RIGIDITY RATIO<br>*RATIO IN RIGIDITY TO FLAT PLATE | 1 | $6.1 \times 10^{-6}$ | $7.9 \times 10^{-3}$ | $9.31 \times 10^{-5}$ |

RELATIVE DISPLACEMENT : 1

RELATIVE DISPLACEMENT : 1.16

RELATIVE DISPLACEMENT : 0.62

RELATIVE DISPLACEMENT : 1.09

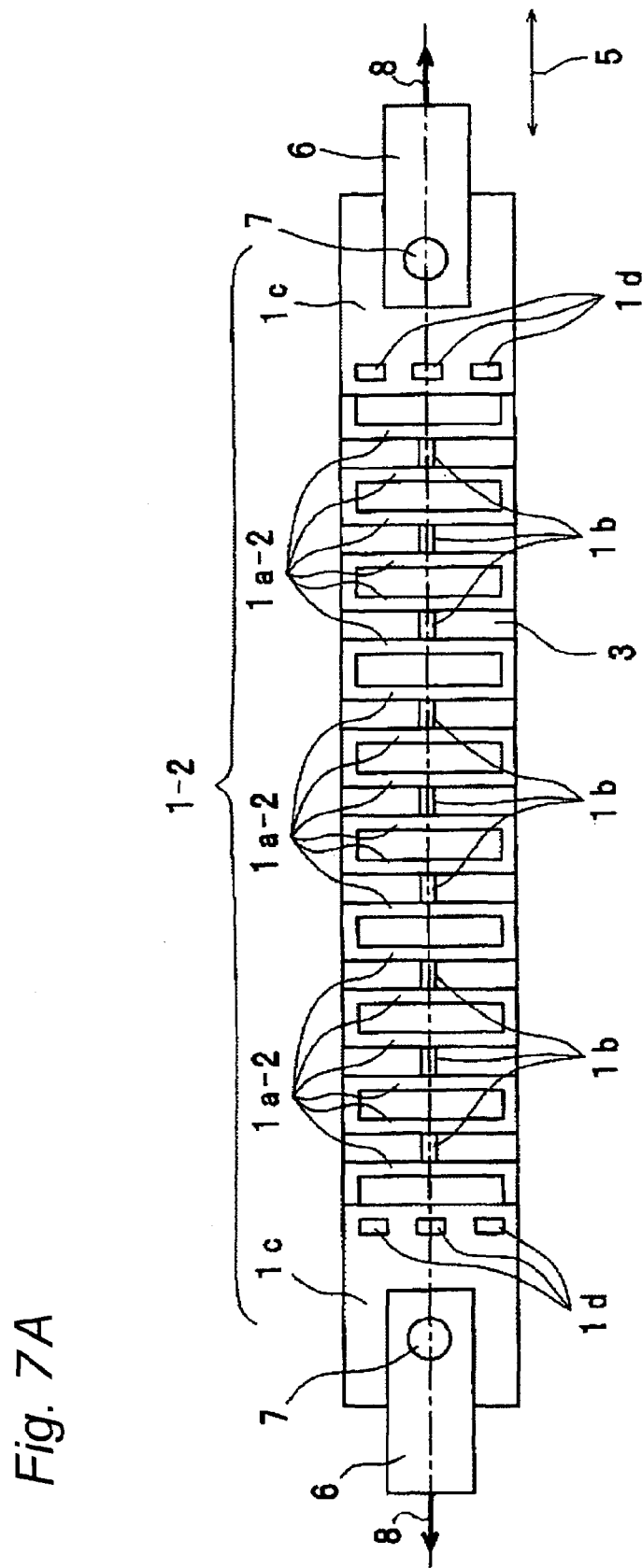

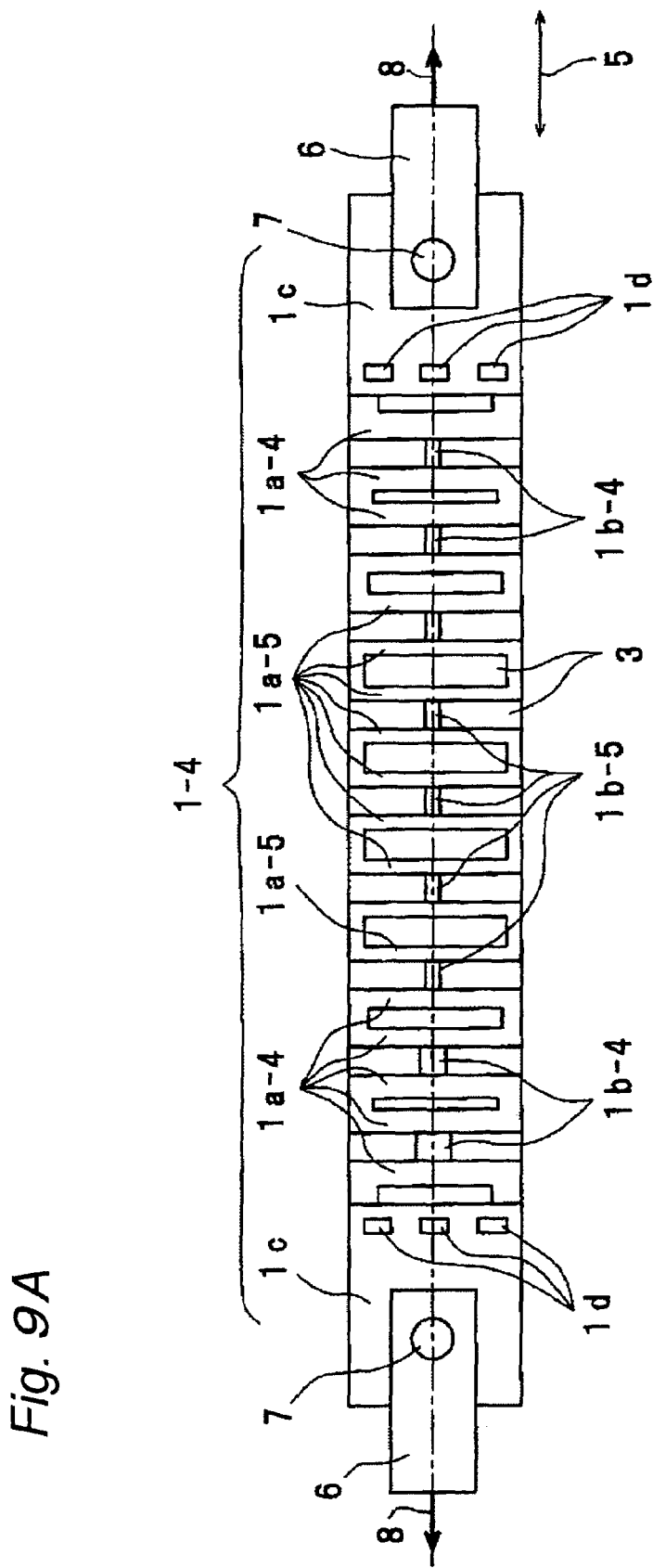

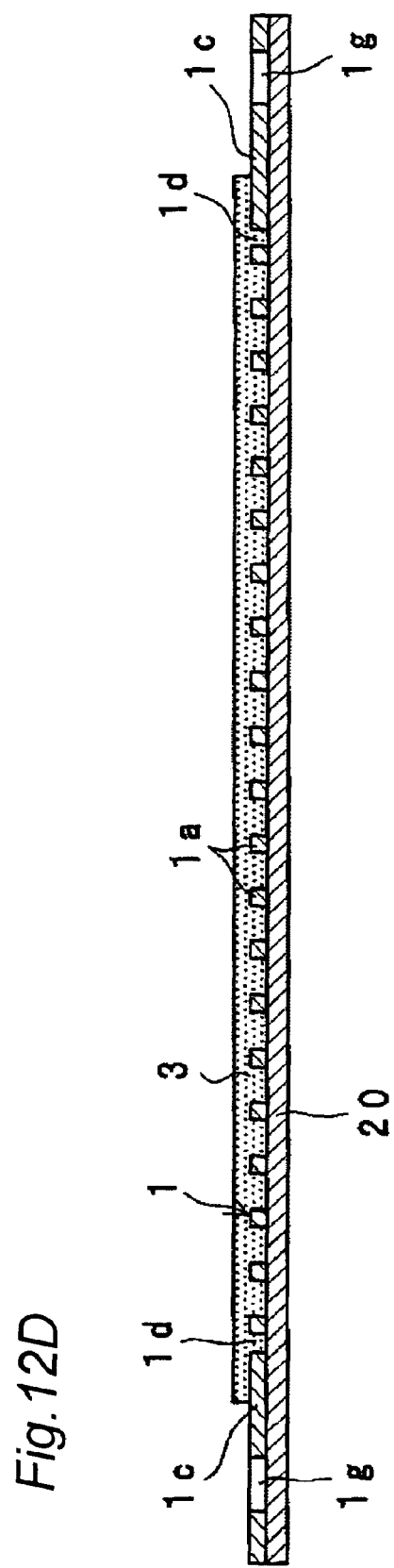

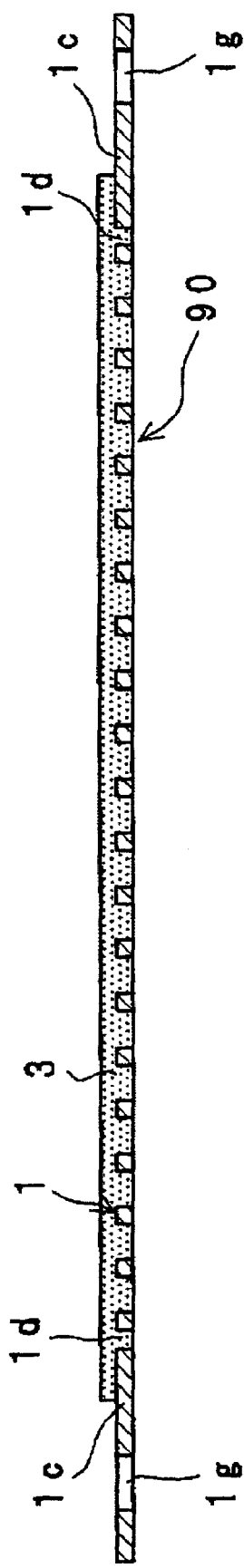

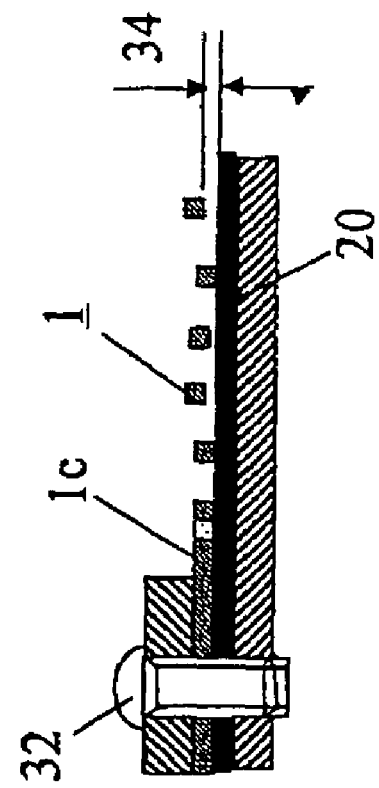
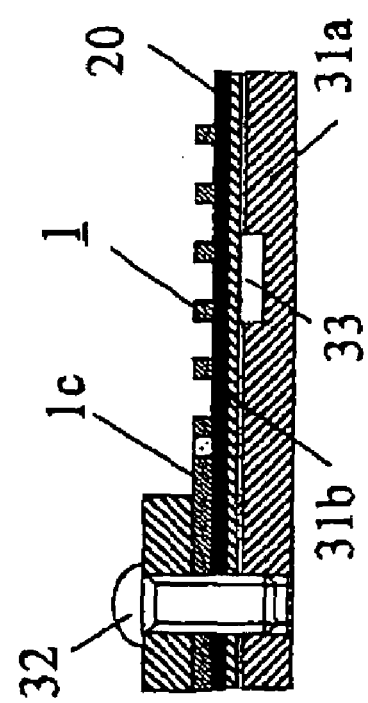

ACTUATOR AND METHOD FOR MANUFACTURING PLANAR ELECTRODE SUPPORT FOR ACTUATOR

TECHNICAL FIELD

The present invention relates to a flat-plate low-profile actuator that is applicable to household robots and the like, is deformed by electrical impulses, and has flexibility and light weight, and to a manufacturing method for a planar electrode support for the flat-plate low-profile actuator.

BACKGROUND ART

Several conventional drive sources are used for joint drive mechanisms of industrial robots including electromagnetic motors, hydraulic actuators, and pneumatic actuators. The joint drive mechanisms using these drive sources, which include those using electromagnetic motors and reduction mechanisms mainly made from metals and those using metal hydraulic/pneumatic cylinders, are themselves made of hard and heavy materials and are managed and used in specific locations within factories.

Drive sources of apparatuses such as robots which are expected to operate near the presence of human beings for housekeeping assistance, job assistance, and nursing help for elderly and physically-challenged persons in homes, offices, and hospitals, are required to be small, light, flexible, safe.

Examples of such actuators include a rubber pneumatic actuator having high flexibility among the pneumatic actuators, though this actuator requires auxiliary equipment such as compressors and control valves for driving, which limits weight reduction of the entire system.

Accordingly, an artificial muscle actuator using various kinds of polymer materials which have light weight and high flexibility has been proposed, and its practical application is much desired.

A polymer actuator operated by electric impulses is described in the keynote speech in Non Patent Document 1 (S G. Wax, R. R. Sands, Smart Structures And Materials 1999: Electroactive Polymer Actuators and Devices, Proc. SPIE, Vol. 3669, pp. 2-10, 1999). A conference concerning research in this field is held annually, and active research efforts are being made. The research is about polymer actuators, which are made of polymer gels, metal composite ion polymers, organic conductive polymers, carbon dispersion conductive polymers, dielectric elastomers, and the like which are driven by electric impulses. Among these, the conductive polymers such as the organic conductive polymers and the carbon dispersion conductive polymers can be driven at relatively low voltage and generate stress having a capacity larger than living body muscles, and have characteristics such as light weight and flexibility.

As an example of the conductive polymers, Patent Document 1 (Japanese Unexamined Patent Publication No. H11-169394) discloses an actuator manufactured by forming metal electrodes on a polyaniline film article that is an organic conductive polymer and sandwiching the metal electrode between solid electrolyte molding objects. While the organic conductive polymers themselves have conductivity and so a voltage can be applied by using these as electrodes, the metal electrodes are formed for the purpose of avoiding voltage drop caused by resistance of the conductive polymers. By applying a voltage to between these electrodes, anions in the solid electrolyte molding objects move from the cathode to the anode, as a result of which the polyanilines in the anodes are doped with anions and swell. Contrary to this, the polyanilines in the cathode are subject to the reverse action, that is, the anions are separated from the polyanilines and the polyanilines shrink. As a result, the actuator composed of the conductive polymer and the polyaniline film article is curved. This is a phenomenon of the thin film article being deflected to provide a large displacement, though the deflection rigidity is too low to produce large forces.

An example of the actuator in which a conductive polymer is not deformed by deflection but deformed by expansion and contraction in its longitudinal direction, and in which an organic conductive polymer is attached to a metallic coil spring as an electrode is disclosed in Non Patent Document 2 (Gordon G. Wallace etc., Smart Structures And Materials 2002: Electroactive Polymer Actuators and Devices, Proc. SPIE, Vol. 4695, pp. 8-16, 2002.). The organic conductive polymer is a cylinder shape, resulting in a small effective cross-sectional area for generating generative force in a bundle. Further in this example, a cylinder-shaped conductive polymer with a coil spring is structured to be housed in a cylinder-shaped container in order to seal an electric field liquid, which further decreases the effective cross-sectional area. Moreover, a force action portion is structured so as to be combined with a movable pin and a spring, which complicates manufacturing.

Moreover, Patent Document 2 (Japanese Unexamined Patent Publication No. H07-83159) and Patent Document 3 (Japanese Unexamined Patent Publication No. H06-133922) each disclose an actuator having an electrode formed into a cylinder shape which performs flexing actions by electric impulses. In both cases, the actuator is formed into a cylinder shape or a coiled shape with a large thickness, which causes the actuator to have poor responsivity, to operate only at low speed, and which makes its manufacturing difficult.

The term "conductive polymers" is herein used to broadly refer to conductive polymers including an organic conductive polymer in which the polymer itself has conductivity and a conductive polymer doped with conductive materials such as carbon particles.

DISCLOSURE OF INVENTION

Issues to be Solved by the Invention

Several objectives of the present invention are to provide a flat-plate low-profile actuator and a manufacturing method for a planar electrode support for the flat-plate low-profile actuator using a conductive polymer, which is capable of generating large force and operating at high speed, and which is easy to manufacture and excellent in reliability, for solving the above identified issues.

Means for Solving the Issues

In order to accomplish these objectives, the present invention is structured as shown below.

According to the present invention, there is provided a flat-plate low-profile actuator, comprising:
  a planar conductive polymer layer;
  an electrode in contact with the conductive polymer layer;
  an opposite electrode opposite to the electrode; and
  an electrolyte layer in contact with the conductive polymer layer, disposed in between the electrode and the opposite electrode,
    the electrode being a planar electrode patterned to have at least one bent portion along a longitudinal direction that is an expansion and contraction direction of the conductive polymer layer so that rigidity in the longitudinal direction is low while rigidity in a width direction almost orthogonal to the longitudinal direction is high, the conductive polymer layer being deformed to be swelled and shrunken by application of electric fields to between both the electrodes.

According to the present invention, there is provided a flat-plate low-profile actuator, comprising:

a planar conductive polymer layer;

an electrode in contact with the conductive polymer layer;

an opposite electrode opposite to the electrode; and an electrolyte layer in contact with the conductive polymer layer, disposed in between the electrode and the opposite electrode, the electrode being a planar electrode patterned to have at least one bent portion along an output direction of drive force associated with expansion and contraction of the conductive polymer layer so that rigidity in the output direction is low while rigidity in a direction almost orthogonal to the output direction is high, the conductive polymer layer being deformed to be swelled and shrunken by application of electric fields to between both the electrodes so that the drive force is outputted in the output direction.

According to the present invention, there is provided a manufacturing method for a planar electrode support for a flat-plate low-profile actuator, in which the flat-plate low-profile actuator has an electrolyte layer in contact with a conductive polymer layer disposed in between an electrode having the planar conductive polymer layer attached thereto and an opposite electrode for deforming the conductive polymer layer to be swelled and shrunken by application of electric fields to between both electrodes, and the planar electrode support is composed of the conductive polymer layer and the electrodes, comprising:

patterning a planar electrode as the electrode through etching or punching to have at least one bent portion along a longitudinal direction that is an expansion and contraction direction of the conductive polymer layer so that rigidity in the longitudinal direction is low while rigidity in a width direction almost orthogonal to the longitudinal direction is high; and in a state that the patterned planar electrode is in contact with another flat plate, forming the conductive polymer layer on the electrode by electrolytic polymerization or casting method, and then removing the flat plate to manufacture the planar electrode support.

EFFECTS OF THE INVENTION

According to the present invention, it becomes possible to provide the flat-plate low-profile actuator having the electrolyte layer in contact with the conductive polymer layer and disposed in between the electrode having the planar conductive polymer layer attached thereto and the opposite electrode for deforming the conductive polymer layer to be swelled and shrunken by application of electric fields to between both electrodes, in which the electrode having the conductive polymer layer attached thereto can be the planar electrode also serving as the support, which is patterned (pattern-formed) so that rigidity in the longitudinal direction that is an expansion and contraction direction of the conductive polymer layer (i.e., an output direction of drive force of the actuator) is low while rigidity in the width direction almost orthogonal to the longitudinal direction is high. Consequently, it becomes possible to realize an actuator as a drive source of apparatuses such as the robots, which are expected to operate near the presence of human beings for housekeeping assistance, job assistance, and nursing help for elderly and physically-challenged persons in homes, offices, and hospitals, and in which the drive source is small, light, flexible, and safe. It becomes also possible to provide a manufacturing method for, as such an actuator, a flat-plate low-profile actuator, as well as a planar electrode support of the flat-plate low-profile actuator, which is capable of generating large force and operating at high speed and which is easy to manufacture and excellent in reliability.

BRIEF DESCRIPTION OF DRAWINGS

These and other aspects and features of the present invention will become clear from the following description taken in conjunction with the preferred embodiments thereof with reference to the accompanying drawings, in which:

FIG. 2A is a cross sectional view explaining the operation principle of the actuator of the present invention;

FIG. 4 is a view showing a table of comparison of rigidity between an electrode having a pattern form in patterning according to the first embodiment of the present invention and electrodes having other forms;

FIG. 7A is a plane view showing an actuator in a second embodiment of the present invention;

FIG. 9A is a plane view showing an actuator in still another configuration in the second embodiment of the present invention;

FIG. 12D is a cross sectional view showing the state where the conductive polymer layer is formed so as to cover most parts of the planar electrode and the flat plate in the manufacturing method for a planar electrode support equipped with a conductive polymer in the fourth embodiment of the present invention;

FIG. 12F is a cross sectional view showing the state where the flat plate is removed from the electrode and the conductive polymer layer in the manufacturing method for a planar electrode support equipped with a conductive polymer in the fourth embodiment of the present invention;

FIG. 13E is a partially enlarged view showing a failure which may occur in the case of using the regulating jigs of FIG. 13A and FIG. 13B;

FIG. 13F is a cross sectional view showing the state where the magnet attracts the electrode to the side of the magnet by use of the regulating jigs of FIG. 13D;

BEST MODE FOR CARRYING OUT THE INVENTION

Figure 1A:
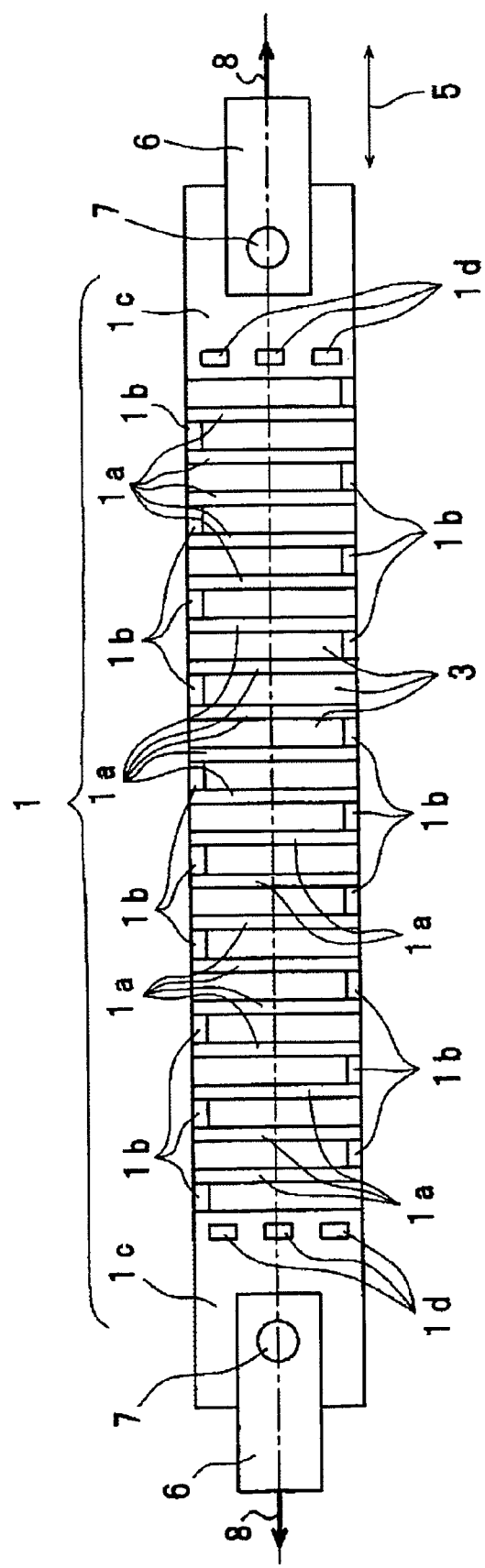
FIG. 1A is a plane view showing an actuator in one configuration in a first embodiment of the present invention.

Hereinbelow, the embodiments of the present invention will be described in detail with reference to the drawings.

Before the embodiments of the present invention will be described in detail, various aspects of the present invention will be describes below.

According to a first aspect of the present invention, there is provided a flat-plate low-profile actuator, comprising:
a planar conductive polymer layer;
an electrode in contact with the conductive polymer layer;
an opposite electrode opposite to the electrode; and
an electrolyte layer in contact with the conductive polymer layer, disposed in between the electrode and the opposite electrode,
the electrode being a planar electrode patterned to have at least one bent portion along a longitudinal direction that is an expansion and contraction direction of the conductive polymer layer so that rigidity in the longitudinal direction is low while rigidity in a width direction almost orthogonal to the longitudinal direction is high, the conductive polymer layer being deformed to be swelled and shrunken by application of electric fields to between both the electrodes.

According to a second aspect of the present invention, there is provided the flat-plate low-profile actuator as defined in the first aspect, wherein the electrode is a zigzag-shaped planar electrode having a plurality of bent portions along the longitudinal direction that is the expansion and contraction direction of the conductive polymer layer.

According to a third aspect of the present invention, there is provided the flat-plate low-profile actuator as defined in the first or second aspect, wherein the electrode is a planar electrode comprising: a plurality of band-like portions along the width direction almost orthogonal to the longitudinal direction that is the expansion and contraction direction of the conductive polymer layer; and link portions along the longitudinal direction for linking the adjacent band-like portions.

According to a fourth aspect of the present invention, there is provided the flat-plate low-profile actuator as defined in any one of the first to third aspects, further comprising planar extension portions disposed on both sides of the electrode in the longitudinal direction that is the expansion and contraction direction of the conductive polymer layer, the planar extension portions being used as force action portions.

According to a fifth aspect of the present invention, there is provided the flat-plate low-profile actuator as defined in the fourth aspect, wherein the conductive polymer layer is placed on both front and back surfaces of the electrode, and a hole is provided on the force action portion that is the extension portion of the electrode so as to link the front and back conductive polymer layers for reinforcement.

According to a sixth aspect of the present invention, there is provided the flat-plate low-profile actuator as defined in any one of the first to fifth aspects, wherein the electrode and the opposite electrode placed on the conductive polymer layer are stacked in such a way as to be alternately disposed.

According to a seventh aspect of the present invention, there is provided the flat-plate low-profile actuator as defined in any one of the first to sixth aspects, wherein the electrode is a thin plate made of: metal including gold, platinum, nickel, titanium, and stainless steel; alloy thereof; or carbon, or any one of these thin plates coated with these material groups or subjected to surface treatment such as chemical oxidation.

According to an eighth aspect of the present invention, there is provided a flat-plate low-profile actuator as defined in any one of the first to seventh aspects, wherein the conductive polymer layer is composed of a pi-conjugated polymer with a substrate of polyaniline, polypyrrole, or polythiophene; any one of organic conductive polymers which are derivatives thereof; or a carbon dispersion conductive polymer such as carbon fine particles, carbon nanotubes, and carbon fibers.

According to a ninth aspect of the present invention, there is provided the flat-plate low-profile actuator as defined in any one of the first to eighth aspects, wherein the electrolyte layer is a polymer gel or a polymer containing an ionic liquid.

According to a 10th aspect of the present invention, there is provided the flat-plate low-profile actuator as defined in the first or second aspect, wherein a ratio of a thickness of the conductive polymer layer to a thickness of the electrode is not more than 3.

According to an 11th aspect of the present invention, there is provided a flat-plate low-profile actuator, comprising:
a planar conductive polymer layer;
an electrode in contact with the conductive polymer layer;
an opposite electrode opposite to the electrode; and
an electrolyte layer in contact with the conductive polymer layer, disposed in between the electrode and the opposite electrode,
the electrode being a planar electrode patterned to have at least one bent portion along an output direction of drive force associated with expansion and contraction of the conductive polymer layer so that rigidity in the output direction is low while rigidity in a direction almost orthogonal to the output direction is high, the conductive polymer layer being deformed to be swelled and shrunken by application of electric fields to between both the electrodes so that the drive force is outputted in the output direction.

According to a 12th aspect of the present invention, there is provided a manufacturing method for a planar electrode support for a flat-plate low-profile actuator, in which the flat-plate low-profile actuator has an electrolyte layer disposed in between an electrode having a planar conductive polymer layer attached thereto and an opposite electrode in the state of being in contact with the conductive polymer layer, for deforming the conductive polymer layer to be swelled and shrunken by application of electric fields to between both electrodes, and the planar electrode support is composed of the conductive polymer layer and the electrodes, comprising:
patterning a planar electrode as the electrode through etching or stamping to have at least one bent portion along a longitudinal direction that is an expansion and contraction direction of the conductive polymer layer so that rigidity in the longitudinal direction is low while rigidity in a width direction almost orthogonal to the longitudinal direction is high; and in a state that the patterned planar electrode is in contact with another flat plate, forming the conductive polymer layer on the electrode by electrolytic polymerization or casting and then removing the flat plate to manufacture the planar electrode support.

According to a 13th aspect of the present invention, there is provided the manufacturing method for a planar electrode support for a flat-plate low-profile actuator as defined in the 12th aspect, wherein the conductive polymer layer is further formed, by electrolytic polymerization or casting, on a surface with the flat plate being removed to manufacture the planar electrode support.

According to a 14th aspect of the present invention, there is provided the manufacturing method for a planar electrode support for a flat-plate low-profile actuator as defined in the 12th aspect, wherein in a state that the planar electrode to make the electrode is linked to a cutoff portion, which will not remain as the electrode, through a cutoff portion link portion, the conductive polymer layer is formed on the electrode by electrolytic polymerization or casting and then the cutoff portion is removed by cutting at the cutoff portion link portion to manufacture the planar electrode support.

According to a 15th aspect of the present invention, there is provided the manufacturing method for a planar electrode support for a flat-plate low-profile actuator as defined in the 12th aspect, wherein the planar electrode to make the electrode is a magnetic substance, and the electrode made of the magnetic substance is brought into contact with the another flat plate through attraction by magnetic force.

Hereinbelow, the embodiments of the present invention will be described in detail with reference to the drawings.

First Embodiment

Figure 1B:
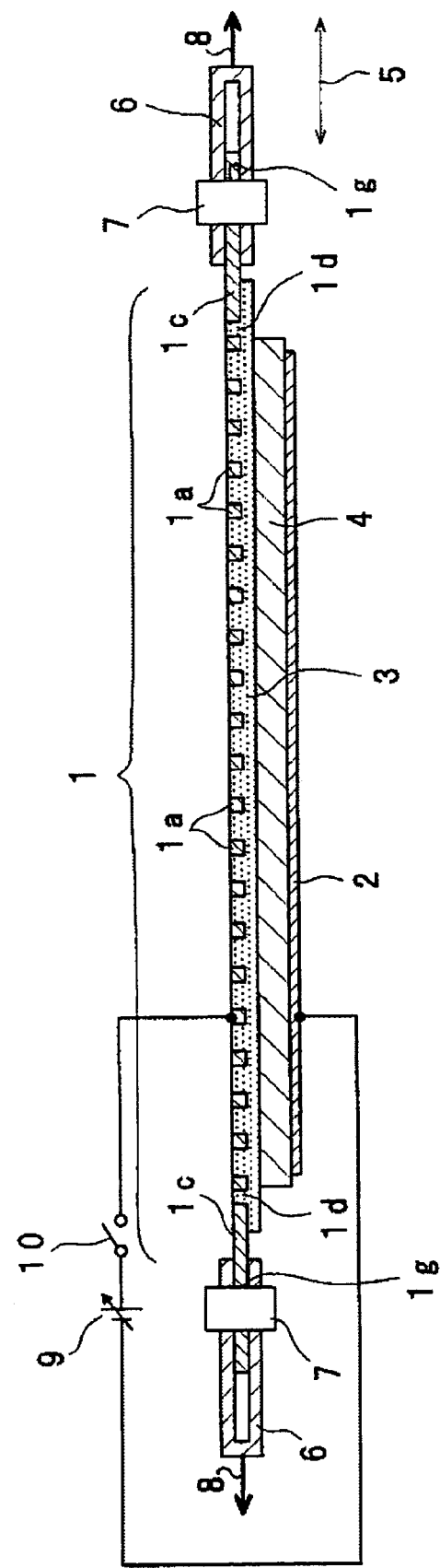
FIG. 1B is a cross sectional view showing the actuator in the one configuration in the first embodiment of the present invention.

FIG. 1A and FIG. 1B are a plane view and a cross sectional view showing a flat-plate low-profile actuator in one configuration in a first embodiment of the present invention, in which a conductive polymer layer 3 and an opposite electrode 2 are disposed on either one side in a thickness direction of an electrode 1, e.g., on the lower side. This one configuration is an example of the present invention composed of minimum component members.

Figure 1C:
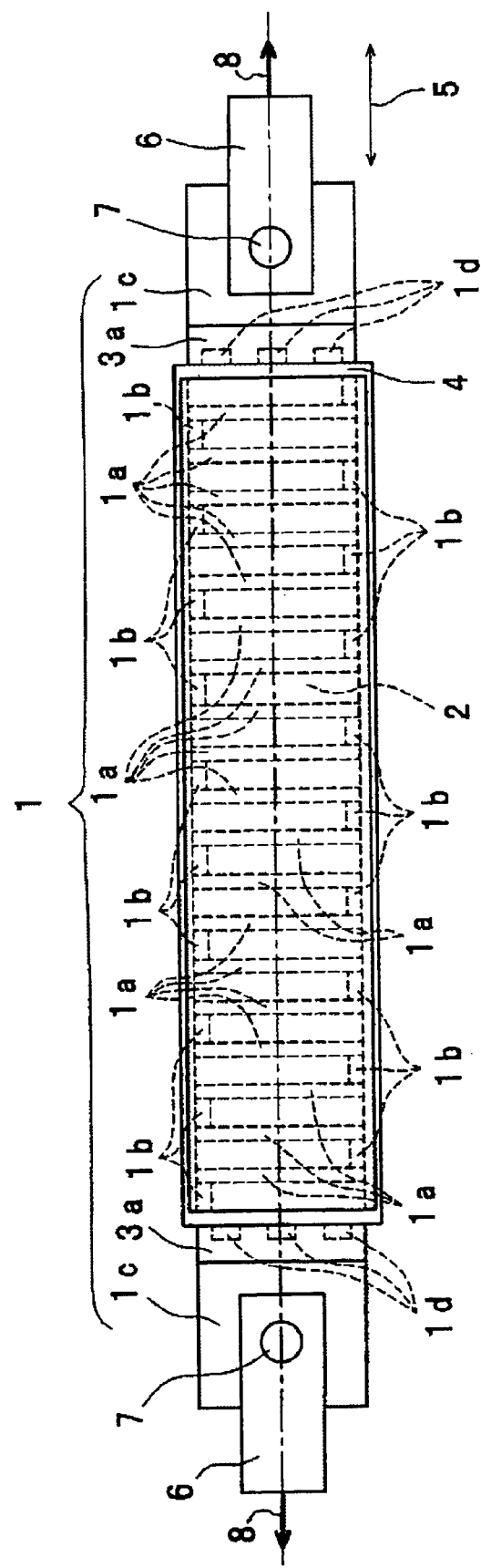
FIG. 1C is a plane view showing an actuator in another configuration in the first embodiment of the present invention.
Figure 1D:
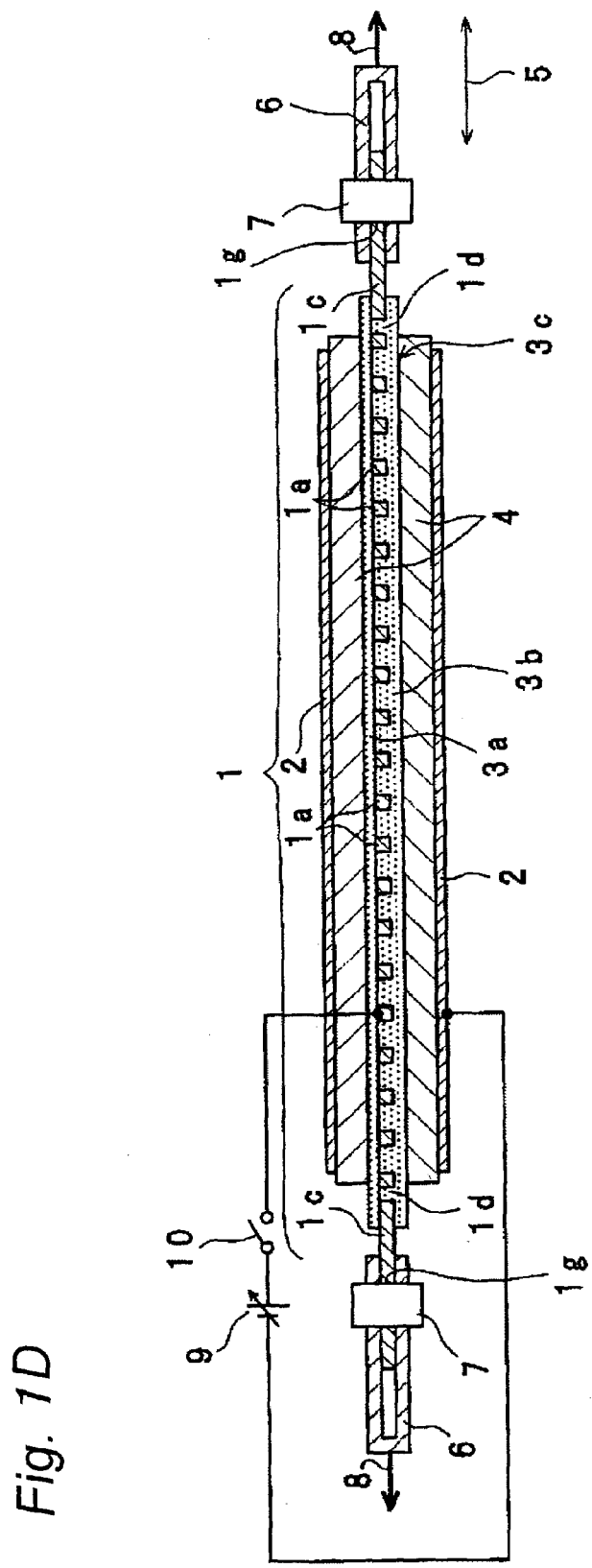
FIG. 1D is a cross sectional view showing the actuator in the another configuration in the first embodiment of the present invention.

FIG. 1C and FIG. 1D are a plane view and a cross sectional view showing a flat-plate low-profile actuator in another configuration in the first embodiment of the present invention. The configuration in FIG. 1C and FIG. 1D is such that with respect to the electrode 1 in the former configuration in FIG. 1A and FIG. 1B, the conductive polymer layer 3 and the opposite electrode 2 are disposed symmetrically in upper and lower positions along the thickness direction. By applying in-phase voltage to two electrodes 2 opposite to the electrode 1, the actuator can be deformed to be expanded and contracted in an expansion and contraction direction 5. In this structure, since the structure is symmetric in the thickness direction, unnecessary bending deformation due to rigidity imbalance will not occur, and so it becomes possible to effectively expand and contract the actuator in a longitudinal direction of the actuator, in other words, the expansion and contraction direction 5 (i.e., an output direction of drive force of the actuator), which makes the configuration more preferable.

The actuator shown in FIG. 1A and FIG. 1B is composed of a rectangular parallelepiped planar conductive polymer layer 3, an electrode 1 set in such a way as to be embedded on the upper surface of the conductive polymer layer 3 in FIG. 1A and made of metal such as stainless steels or the like and, a rectangular plate-like opposite electrode 2 disposed away from the electrode 1 so as to be opposed to the electrode 1 and made of metal such as stainless steels or the like, and an electrolyte layer 4 in between the conductive polymer layer 3 in contact with the electrode 1 and the opposite electrode 2.

The actuator shown in FIG. 1C and FIG. 1D is composed of a rectangular parallelepiped plate-like conductive polymer layer 3C, an electrode 1 set in such a way as to be embedded in a center portion in a thickness direction of the conductive polymer layer 3C in FIG. 1D and made of metal such as stainless steels or the like, rectangular plate-like opposite electrodes 2 disposed in upper and lower positions away from the electrode 1 so as to be opposed to the electrode 1, and made of metal such as stainless steels or the like, and electrolyte layers 4 in between respective portions of the conductive polymer layer 3C which are in contact with the electrode 1 in upper and lower positions and the respective opposite electrodes 2. As described before, the former actuator (FIG. 1A and FIG. 1B) has the opposite electrode 2 disposed on only one side of the electrode 1, whereas the latter actuator (FIG. 1C and FIG. 1D) is different from the former in that it has the opposite electrodes 2 disposed on both the upper and lower sides of the electrode 1.

It is preferable, as one example, to structure a flat-plate low-profile actuator having the conductive polymer layer with a thickness of 80 μm or less and the electrode with a thickness of 5 to 50 μm. If the thickness of the electrode is less than 5 μm, it becomes difficult to fulfill the function as a support, whereas if it is over 50 μm, then rigidity becomes too large and deformation becomes difficult to achieve, thereby making this thickness undesirable. If the thickness of the conductive polymer layer is over 80 μm, then it becomes difficult for ion species which come and go from the front and back sides of the conductive polymer layer to spread to the center of the film, and this decreases generated deformation and reduces operation speed, thereby making this thickness undesirable. Further, as one more preferable example, it is preferable to structure a flat-plate low-profile actuator having a conductive polymer layer with a thickness of 30 μm or less and an electrode with a thickness of 5 to 10 μm.

The electrodes 1 having the conductive polymer layers 3, 3C attached thereto in FIG. 1A to FIG. 1D are patterned (pattern-formed) so that rigidity in the expansion and contraction direction 5 of the conductive polymer layers 3, 3C (longitudinal direction of the actuator in FIG. 1A) is low to make a planar electrode. The pattern form in patterning of the electrodes 1 in FIG. 1A to FIG. 1D is such that a number of elongated rectangular width-direction strip-like patterns 1a are disposed so as to extend along a width direction (width direction of the actuator) almost orthogonal to the longitudinal direction 5 at constant intervals in the longitudinal direction 5, and the width-direction strip-like patterns (one example of the band portions) 1a, which extend in the longitudinal direction, are in a rectangular short strip shape, and are adjacent to each other, are respectively linked to link portions 1b at width-direction end portions opposed to each other and are bent at the respective width-direction end portions of the actuator. Thus, when the end portions of the adjacent width-direction strip-like patterns 1a are linked through the link portions 1b, the link portions 1b are disposed alternately in the longitudinal direction so that the electrode 1 constitutes a rough zigzag shape. The rough zigzag shape herein refers to an elongated shape which has at least one notch or space in the width direction and which disposed in succession in the longitudinal direction 5. If the rough zigzag shape is an uniform pattern, then operation control of the actuator is facilitated. In the spaces formed by the adjacent width-direction strip-like patterns 1a and the link portions 1b, a part of the conductive polymer layers 3, 3C is entrapped, and in FIG. 1A, the electrode 1 is embedded in the conductive polymer layer 3 from the top surface to about half the depth of the conductive polymer layer 3 so that in FIG. 1A, the upper surfaces of the conductive polymer layer 3 and the electrode 1 are almost the same. In FIG. 1D, the electrode 1 is embedded in a first conductive polymer layer 3b from the top surface to about half the thickness of the first conductive polymer layer 3b, as in FIG. 1A, so that the top surfaces of the first conductive polymer layer 3b and the electrode 1 are almost the same. A thin rectangular parallelepiped plate-like second conductive polymer layer 3a is disposed on the top surface, as a result of which the electrode 1 is made to be disposed in a middle portion of the conductive polymer layer 3C, composed of the first conductive polymer layer 3b and the second conductive polymer layer 3a. In terms of functionality, the conductive polymer layer 3C corresponds to the conductive polymer layer 3 in FIG. 1A.

Moreover, on both the ends of the longitudinal direction 5 (in other words, an arrow 5 may be an output direction of drive force of the actuator) of each electrode 1 in FIG. 1A to FIG. 1D, rectangular plate-like extension portions 1c of the electrode 1 provided and each of the extension portions 1c functions as a force action portion. On the pattern formation side of each force action section 1c of the electrode 1, the side being opposite to the edges of the force action section, three holes 1d for reinforcing the link between the electrode 1 and the conductive polymer layer 3 are disposed in alignment along the width direction in FIG. 1A. Further, a pin hole 1g for inserting a link pin 7 into the force action portion is formed in the vicinity of the center of each of the extension portions 1c, so that a hook 6 for clipping the extension portion 1c and the extension portion 1c are linked through the pin 7 inserted into the pin hole 1g, by which a load 8 acting onto each extension portion 1c is supported. Between the electrode 1 and the opposite electrode 2, a power source 9 capable of applying variable voltages to them is connected via a switch 10. By turning the switch 10 on, a voltage is applied to both the electrodes 1 and 2 so as to expand and contract the conductive polymer layer 3 in the longitudinal direction 5.

In the case where the conductive polymer layer is an organic conductive polymer, this expansion and contraction action is generated by the conductive polymer layer 3 being doped with or separated from the ion species contained in the electrolyte layer 4. The expansion and contraction action is caused by changes in bulk of the conductive polymer layer 3 according to coming and going of the ion species as the ion species have a certain level of bulk, changes in conformation of the conductive polymer chain structure of the conductive polymer layer 3 associated with oxidation reduction action, and further attributed to electrostatic repulsion by charges of the same kind injected by voltage application. In the case where the conductive polymer layer is a carbon dispersion conductive polymer, the expansion and contraction action does not accompany the oxidation reduction action, but the deformation is considered to be achieved by the coming and going of the ion species and the electrostatic repulsion by charges of the same kind.

Figure 2B:
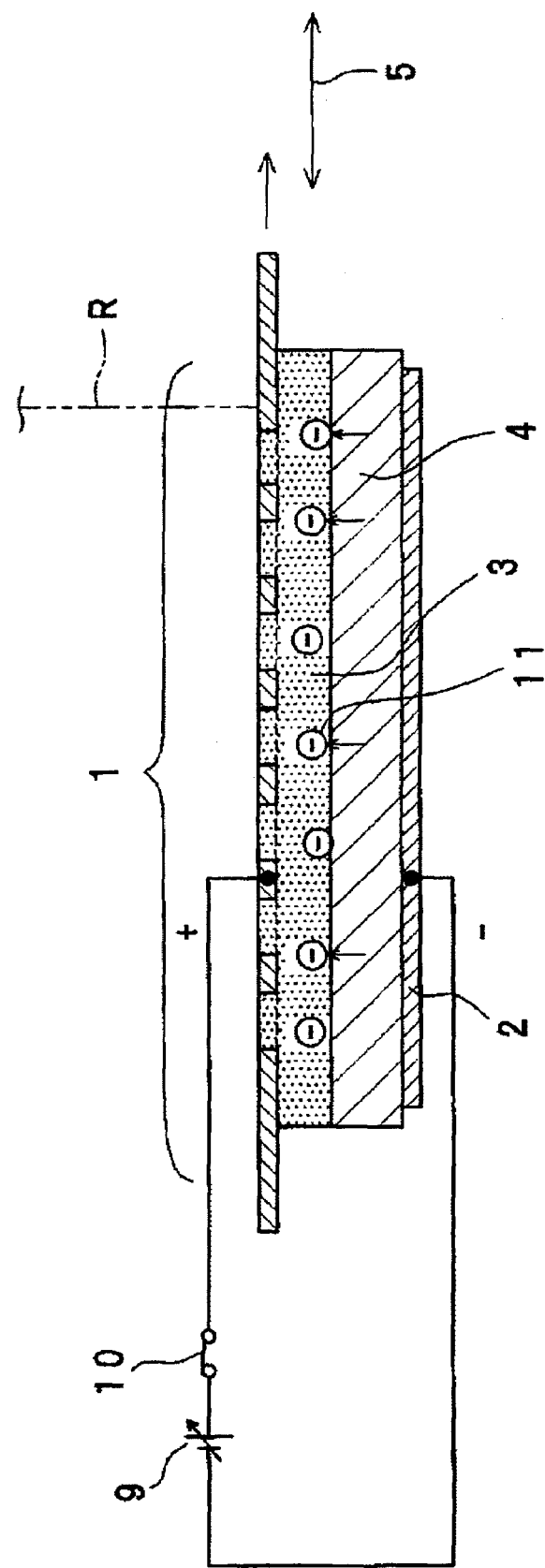
FIG. 2B is a cross sectional view explaining the operation principle of the actuator of the present invention.
Figure 2C:
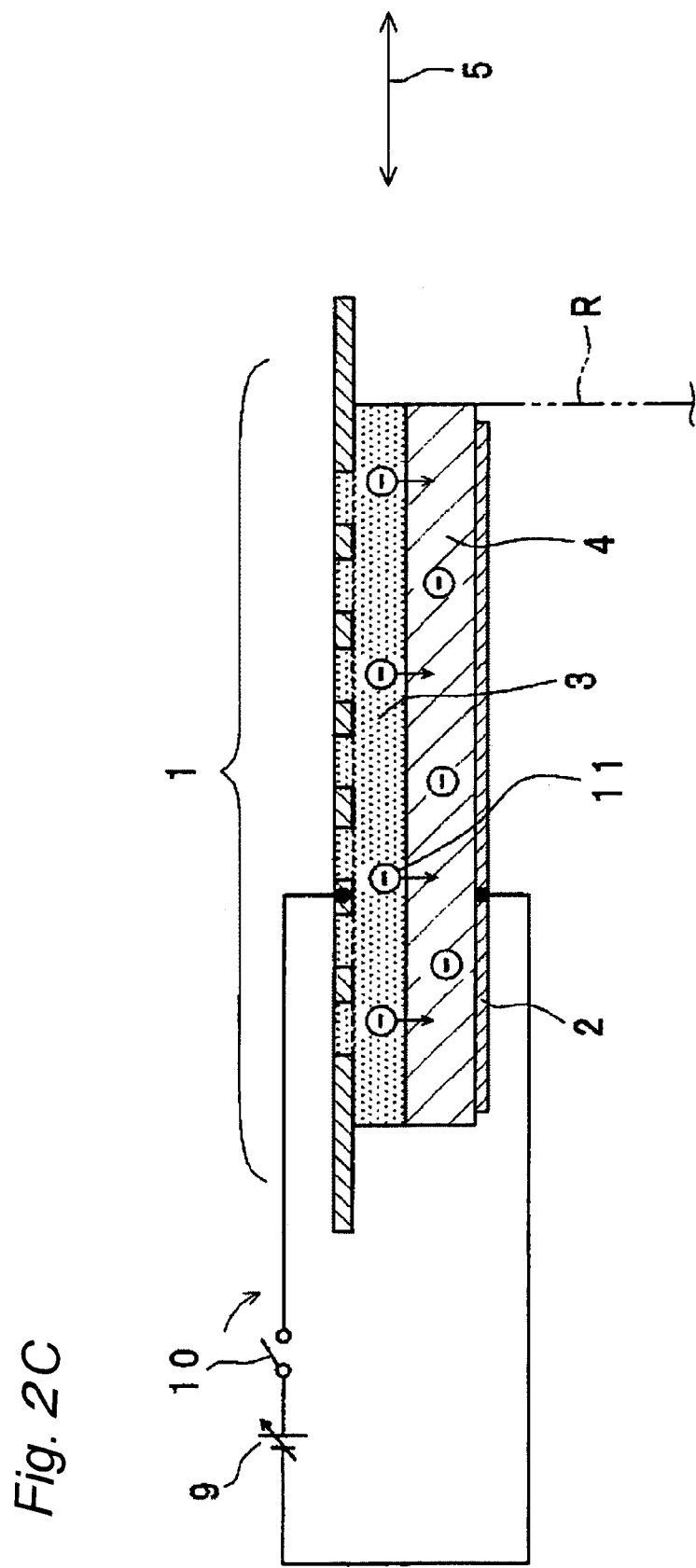
FIG. 2C is a cross sectional view explaining the operation principle of the actuator of the present invention.
Figure 2D:
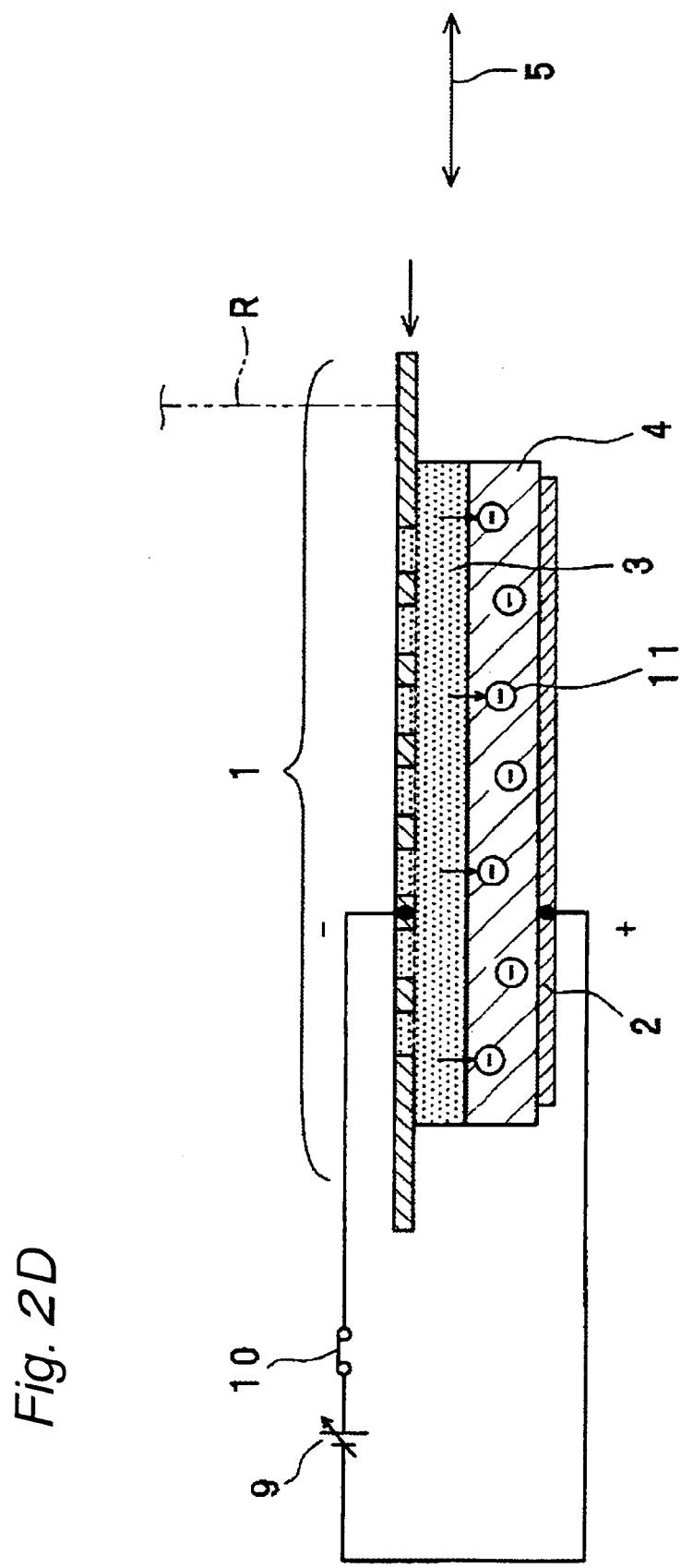
FIG. 2D is a cross sectional view explaining the operation principle of the actuator of the present invention.

For easy understanding of the operation principle, including causes of the deformation mechanism, swell and shrinkage deformation accompanied by the conductive polymer layer 3 (since the conductive polymer layer 3C operates in the same way, description is herein given by representatively using the conductive polymer layer 3) being doped with or separated from anions 11 (negative ions) is shown in cross sectional views in FIG. 2A, FIG. 2B, FIG. 2C, and FIG. 2D. In some kinds of organic conductive polymer materials, the primary deformation mechanism is attributed to doping and separation of the anions 11. FIG. 2A shows a switch-off state in which a voltage is not applied to the electrode. FIG. 2B shows the state in which a positive voltage is applied to the side of the conductive polymer layer 3. The anions 11 uniformly present in the electrolyte layer 4 when no voltage is applied are pulled to the conductive polymer layer side on the side of the positive electrode (see arrows of the anions 11 in FIG. 2A and FIG. 2B), and go into the inside of the conductive polymer layer 3 from the electrolyte layer 4. Along with the oxidation process, the volume of the conductive polymer layer 3 swells and so the conductive polymer layer 3 expands in the longitudinal direction 5 along the inside of the lamination surface of the conductive polymer layer 3. It is to be noted that FIG. 2B shows the state in which the left end of the actuator in the longitudinal direction 5 is secured while the right end extends from a reference position R on the right end in the switch-off state. FIG. 2C shows a switch-off state in which a voltage is not applied to the electrode, while FIG. 2D shows the state in which a negative voltage is applied to the conductive polymer layer 3 contrary to FIG. 2B. The anions 11 present in the conductive polymer layer 3 are pulled to the opposite electrode 2 (see arrows of the anions 11 in FIG. 2C and FIG. 2D), and go away from the conductive polymer layer 3 into the electrolyte layer 4. Along with the reduction process, the volume of the conductive polymer layer 3 shrinks and the conductive polymer layer 3 contracts in the longitudinal direction 5 along the inside of the lamination surface of the conductive polymer layer 3. It is to be noted that FIG. 2D shows the state in which the left end of the actuator in the longitudinal direction 5 is secured while the right end shrinks from the reference position R on the right end in the switch-off state. In other materials, the expansion and contraction action may be generated by the coming and going of cations (positive ions) from and to the conductive polymer layer 3 or by reciprocal coming and going of anions and cations. However, description has been limited to the mechanism of expansion and contraction action with reference to the coming and going of the anions for simplification purposes.

With the electrodes 1 being set on the conductive polymer layers 3, 3C, application voltages can be applied instantaneously and uniformly to the conductive polymer layers 3, 3C compared to the case where the electrodes 1 are not set, so that the doping phenomenon of the ion species occurs at high speed, allowing high-speed expansion and contraction action of the conductive polymer layers 3, 3C. Patterning the electrode 1 in such a way that rigidity in the longitudinal direction 5 is low while rigidity in the width direction is high as described above makes it possible to generate large generated distortion without blocking the expansion and contraction action of the conductive polymer layer 3, 3C. It has been found that generating the large generated distortion is not only a function in a passive sense of term, that is, to prevent blocking of the expansion and contraction action, but the function also fulfills an effect of actively increasing the generated distortion through assignment of anisotropy in rigidity by the patterned electrode 1. This will be described in detail later with reference to FIG. 5A to FIG. 5D.

Further, structuring the electrode 1 as a plate-like electrode having the function as a support makes it easy to handle the conductive polymer layers 3, 3C which are difficult to handle as individual thin layers. The function as the support herein refers to a function of holding and supporting the conductive polymer layer by setting a part of the rigidity of the planar electrode having the function to be larger than the rigidity of the conductive polymer layer. Further, since the electrode 1 is planar, each component member of the actuator is given a planar structure, which makes stacking easy. The cross sectional ratio of the conductive polymer layer 3, 3C involving the expansion and contraction action of the stacked actuator allows employment of such a planar lamination structure, advantageously allowing for easy enhancement of packing density.

A specific structure for patterning the electrode 1 so as to provide low rigidity in the longitudinal direction may be obtained by disposing a number of elongated patterns 1a in the width direction orthogonal to the longitudinal direction 5 and linking these patterns 1a through the link portions 1b in a zigzag shape or in a bent state as described above. Though the in-phase rigidity of flat plates is extremely high, such patterning allows easy implementation of low rigidity in the longitudinal direction 5. Such a structure concurrently provides high rigidity in the width direction orthogonal to the longitudinal direction 5, and assigns anisotropy in rigidity between the longitudinal direction and the direction orthogonal thereto.

In the first embodiment, providing the extension portion 1c of the electrode 1 on both the ends of the longitudinal direction and using the extension portion 1c as a force action portion makes it possible to form the force action portion, which is an essential element of the actuator, in concurrence with patterning, which yields an actuator having the force action portion in the electrode 1 itself. This brings about the advantage that an additional member is not necessary as the force action portion. Further, since the electrode 1 is a member directly linked to the conductive polymer layer 3, 3C which produce the expansion and contraction action, it becomes possible to secure sufficient strength against the load exerted over the force action portion.

Providing the holes 1d on the extension portions of the electrodes 1 and filling the holes 1d with the conductive polymers of the conductive polymer layers 3, 3C make it possible to generate anchor effect, and the anchor effect allows for increasing the strength of the hole portions. While there may be cases where the bond strength in the interface between the electrode 1 and the conductive polymer layers 3, 3C is not necessarily strong depending on the combination of materials, setting such holes 1d to be filled with the conductive polymers allows the bond strength in the interface between the electrodes 1 and the conductive polymer layers 3, 3C to be reinforced.

Figure 3A:
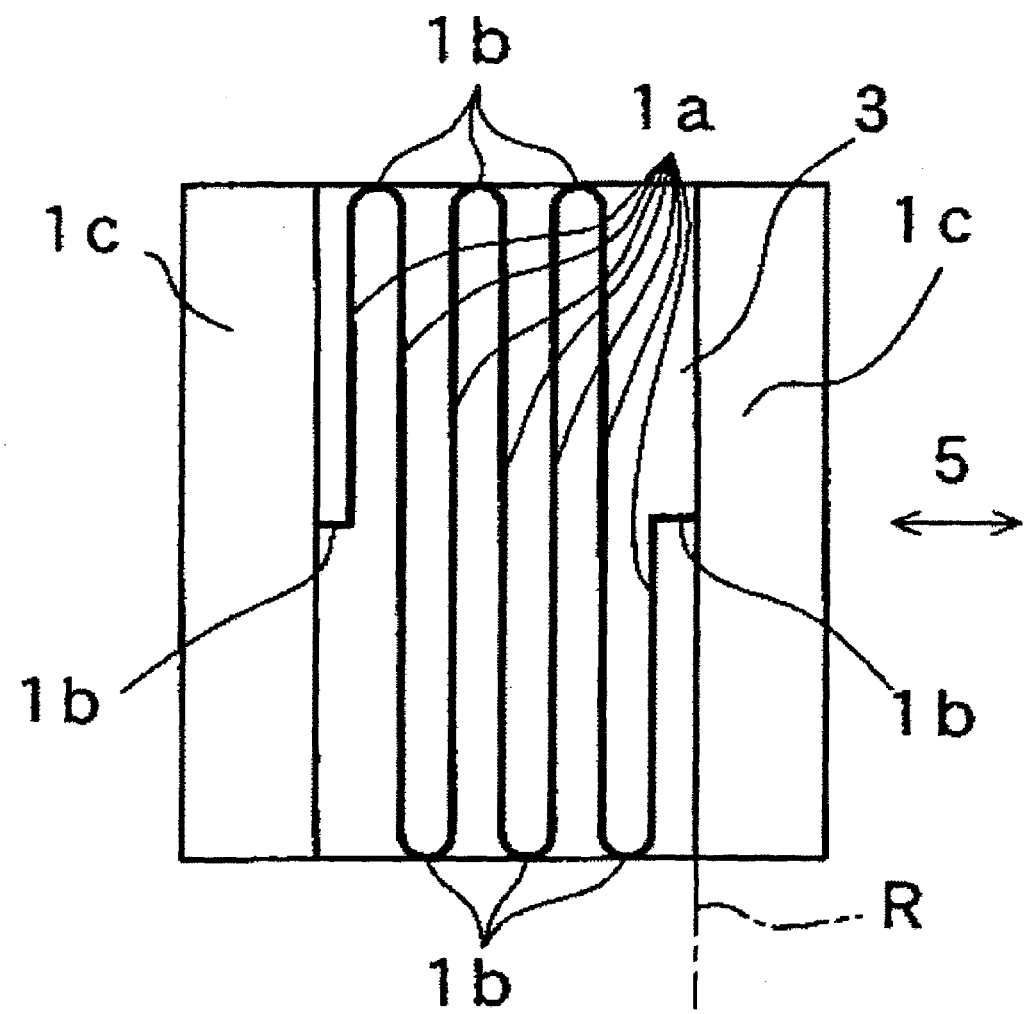
FIG. 3A is a plane view showing expansion and contraction operation of the actuator in the first embodiment of the present invention.
Figure 3B:
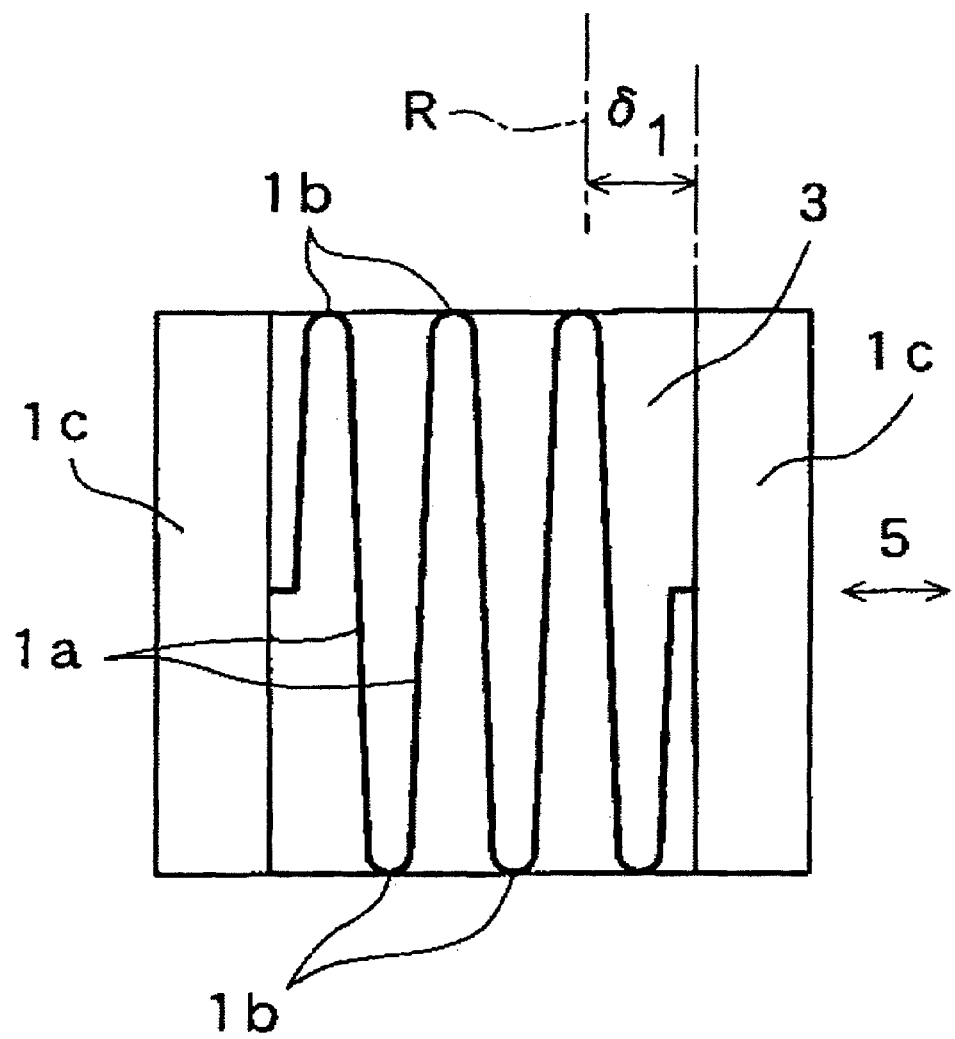
FIG. 3B is a plane view showing expansion and contraction operation of an actuator in a schematic configuration in the first embodiment of the present invention.

FIG. 3A to FIG. 3H are plane views showing the expansion and contraction operation of the actuator in the first embodiment. For simplification, only the conductive polymer layer 3 and the electrode 1 with the conductive polymer layer 3 attached thereto are schematically shown, since the conductive polymer layer 3C operates in the same way, description is given by representatively using the conductive polymer layer 3 in FIG. 3A to FIG. 3H. A few other configurations adoptable for the actuator of the present invention will be shown together. FIG. 3A and FIG. 3B show the case where the form of the electrode 1 is identical to the pattern form shown in FIG. 1A to FIG. 1D. FIG. 3A shows an initial state, and FIG. 3B shows the state in which only the left end of the actuator in the longitudinal direction 5 is secured while the right end of the conductive polymer layer 3 expands by $\delta_1$ from a reference position R in the initial state in FIG. 3A. More particularly, it is shown that the respective elongated patterns 1a of the electrode 1 deform in the width direction orthogonal to the longitudinal direction 5 along the longitudinal direction 5 according to the expansion.

Figure 3C:
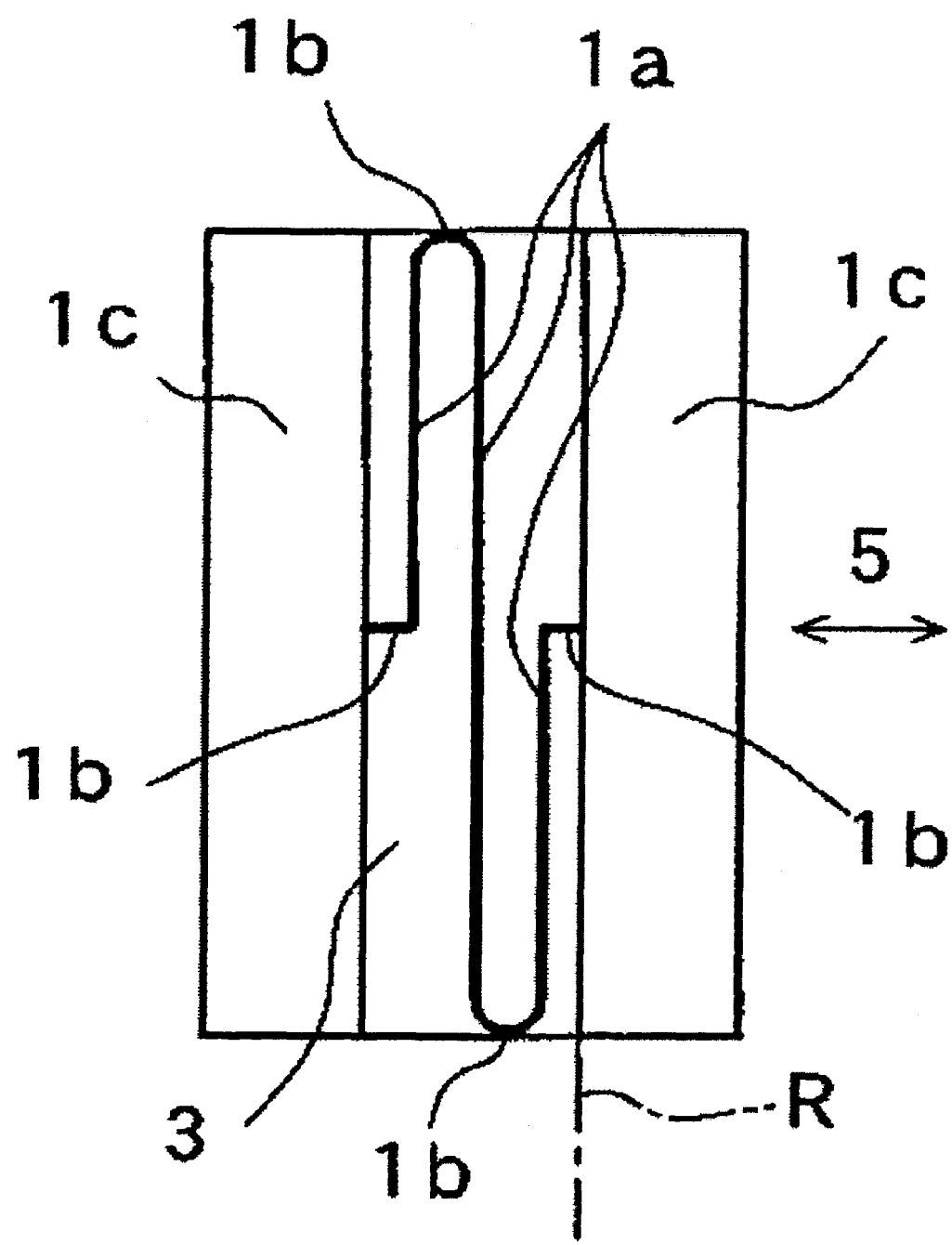
FIG. 3C is a plane view showing expansion and contraction operation of an actuator in another configuration in the first embodiment of the present invention.
Figure 3D:
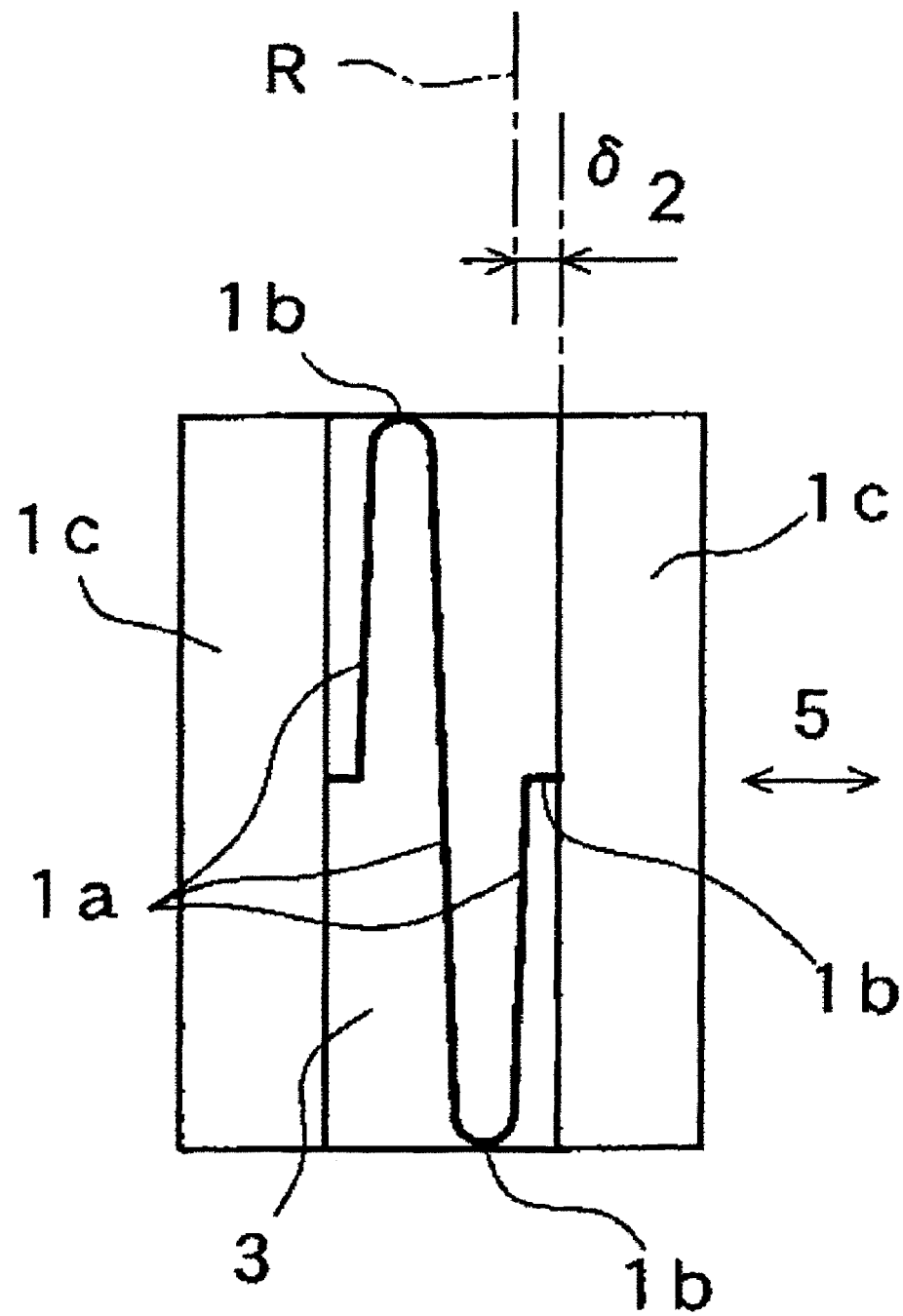
FIG. 3D is a plane view showing expansion and contraction operation of the actuator in the configuration in FIG. 3C in the first embodiment of the present invention.

Similarly, as another configuration of the present invention, FIG. 3C and FIG. 3D show the states before and after deformation in the case where the pattern form is constituted by an elongated pattern 1a of one cycle out of a number of elongated patterns 1a of the electrode 1. More particularly, it is shown the state in which the left end of the actuator in the longitudinal direction 5 is secured while the right end of the conductive polymer layer 3 expands by $\delta_2$ from the reference position R in the initial state in FIG. 3C.

Generally, a large deformation of the actuator can be achieved by setting the expansion and contraction direction 5 of the actuator as the longitudinal direction of the actuator, the length of the expansion and contraction portion thereby being longer. As shown in this example, it is also possible to set the width direction orthogonal to the expansion and contraction direction 5 as the longitudinal direction. The present invention is not intended to limit the expansion and contraction direction 5 of the actuator to the longitudinal direction of the actuator.

Figure 3E:
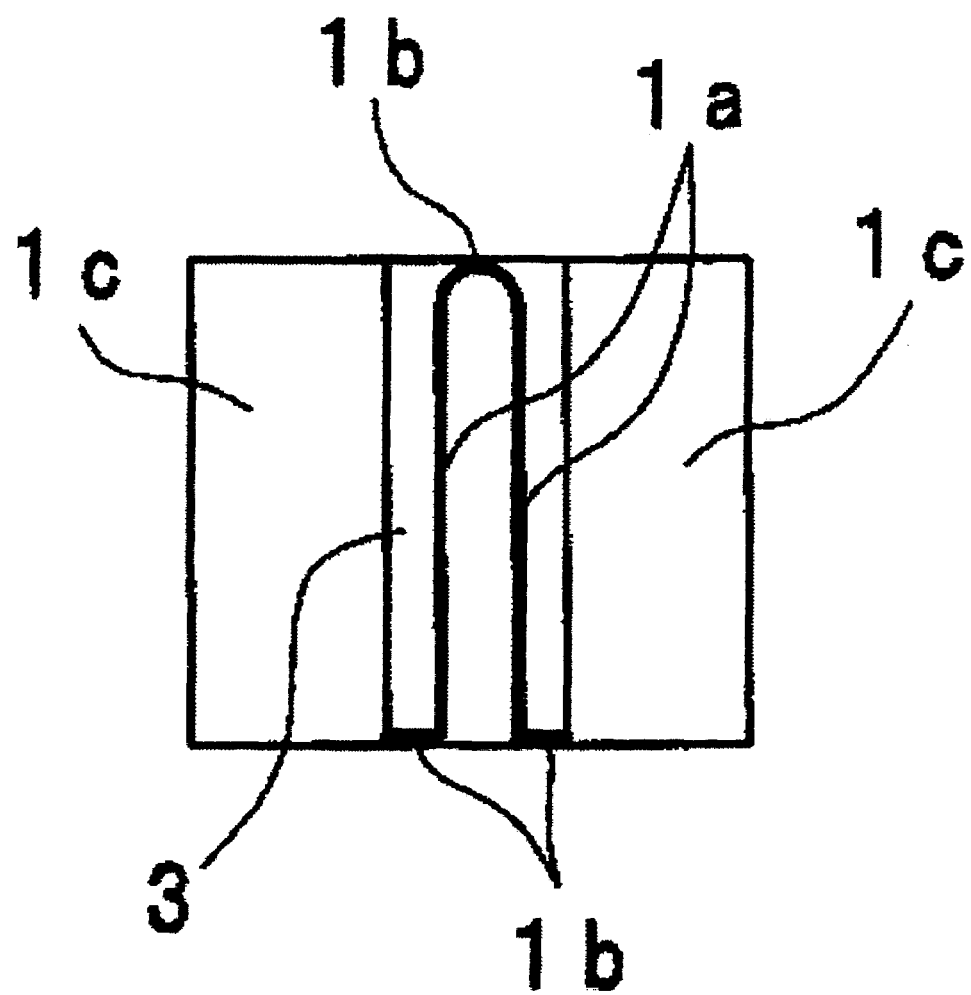
FIG. 3E is a plane view showing expansion and contraction operation of an actuator in another configuration in the first embodiment of the present invention.
Figure 3F:
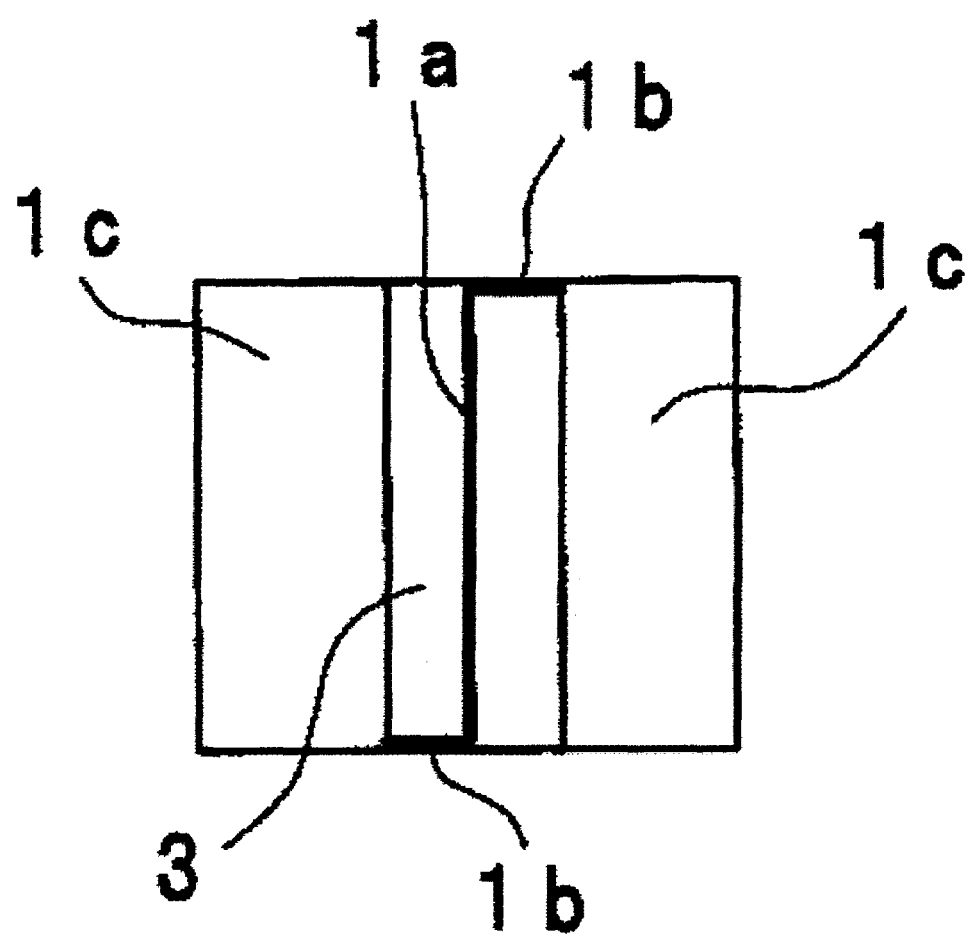
FIG. 3F is a plane view showing expansion and contraction operation of an actuator in another configuration in the first embodiment of the present invention.

Further, as still another configuration of the present invention, FIG. 3E and FIG. 3F show a minimum available unit of the pattern form in patterning of the actuator in the present invention. More particularly, FIG. 3E shows the case where the pattern form is constituted of an elongated pattern 1a of a half cycle out of a number of elongated patterns 1a of the electrode 1, and FIG. 3F shows the case where the pattern form is constituted of an elongated pattern 1a of a quarter cycle out of a number of elongated patterns 1a of the electrode 1.

Figure 3G:
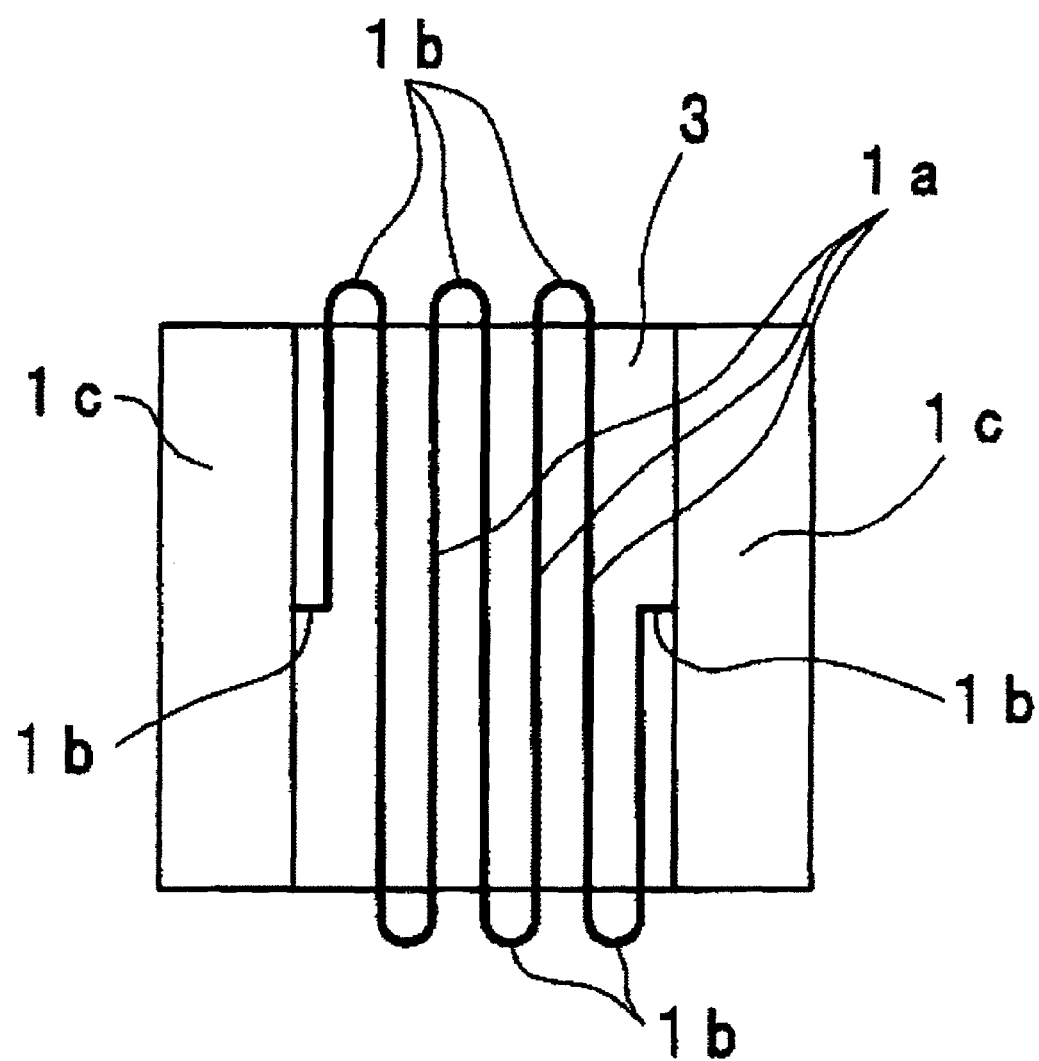
FIG. 3G is a plane view showing expansion and contraction operation of an actuator in another configuration in the first embodiment of the present invention.
Figure 3H:
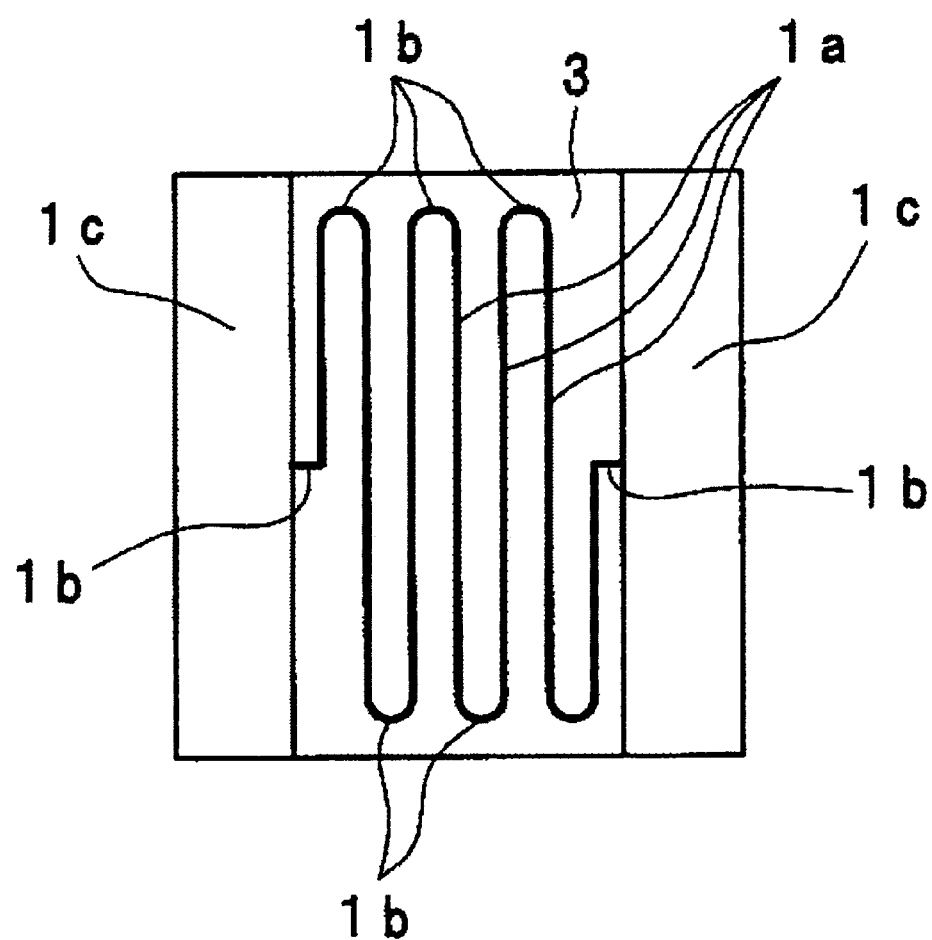
FIG. 3H is a plane view showing expansion and contraction operation of an actuator in another configuration in the first embodiment of the present invention.

Further, as another configuration of the present invention, the arrangement relationship between the electrode 1 and the conductive polymer layer 3 in the width direction may be arranged such that the width of the electrode 1 is larger than the width of the conductive polymer layer 3 as shown in FIG. 3G, and the arrangement relationship may also be reversed as shown in FIG. 3H. Each case is within the scope of the present invention.

FIG. 4 is a table showing the result of a calculation to obtain how the rigidity in the longitudinal direction can be lowered by the pattern forms in patterning of the electrode 1 of the actuator in the first embodiment of the present invention. Assumed values for the calculation are set as follows: the material is stainless steel SUS304; the longitudinal elastic modulus is $0.072 \times 10^{12}$ N/m$^2$; and the plate thickness is 10 µm. In the case of a flat plate (solid state or block configuration) electrode shown in the column (a) in the table, when the upper end of the flat plate with a thickness of 14 mm×a length of 8 mm was constrained and a distributed load having a total load of 1 mN was applied onto the lower end of the flat plate, the displacement in the middle of the lower end was 0.308 µm. In the case of the pattern form with a total width 14 mm×a length of 8 mm obtained in patterning the electrode 1 in the first embodiment of the present invention in column (b) shown in the table, when a concentrated load of the same 1 mN was applied to the pattern form in patterning with a line width of 0.1 mm and a pitch of 1 mm and, the displacement in the lower end portion was calculated at 50.56 mm, and assuming that a rigidity ratio of the former flat plate is 1, a rigidity ratio of the latter electrode 1 to the former flat plate is $6.1 \times 10^{-6}$. Thus, patterning of the electrode 1 in the first embodiment of the present invention makes it possible to reduce the rigidity to 1/100,000 or lower as compared with that in the flat plate.

The column (c) in the table shows, for comparison, the result of calculation in the case where the link portions 1b for linking the elongated patterns 1a of the electrode 1 are not disposed in the bent state but are disposed in the center portion of the width of the elongated patterns 1a and are disposed in succession in the longitudinal direction. The displacement in the middle portion of the lower end when a concentrated load of the same 1 mN is applied onto the lower end was calculated at 38.6 µm. The rigidity ratio was $7.9 \times 10^{-3}$, and the rigidity was reduced to at best nearly 1/100. Thus, for achieving a large rigidity reduction effect, it is necessary to dispose the link portions 1b in the bent state with respect to the elongated patterns 1a of the electrode 1. Further, the column (d) in the table shows the result of calculation in the case where the electrode is patterned in a waveform, and the result indicates that such a form can achieve considerable reduction in rigidity.

Figure 5A:
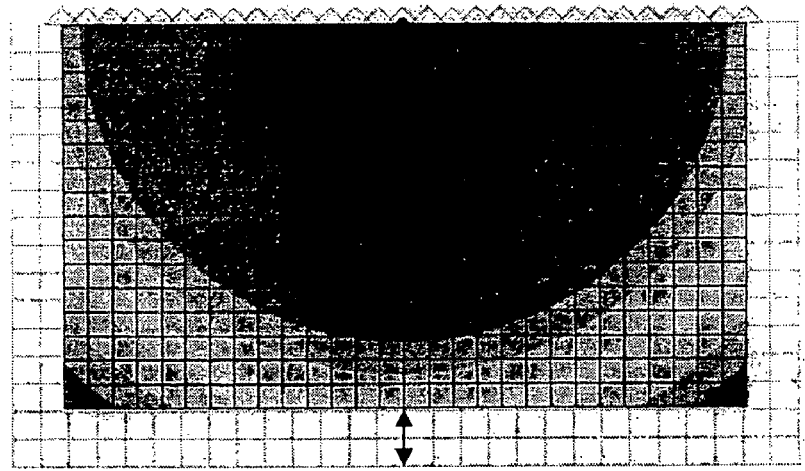
FIG. 5A is a plane view showing a reference example for explaining the result of analysis and calculation of a deformed state of the actuator in the first embodiment of the present invention.
Figure 5B:
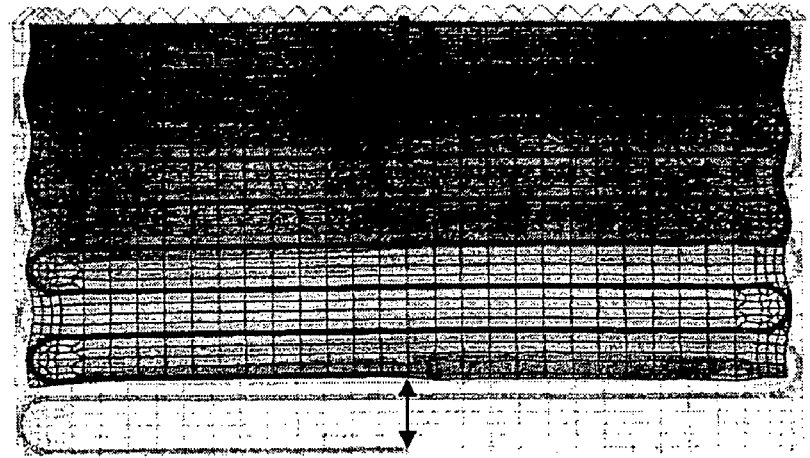
FIG. 5B is a plane view showing the result of analysis and calculation of a deformed state of the actuator in the first embodiment of the present invention.
Figure 5C:
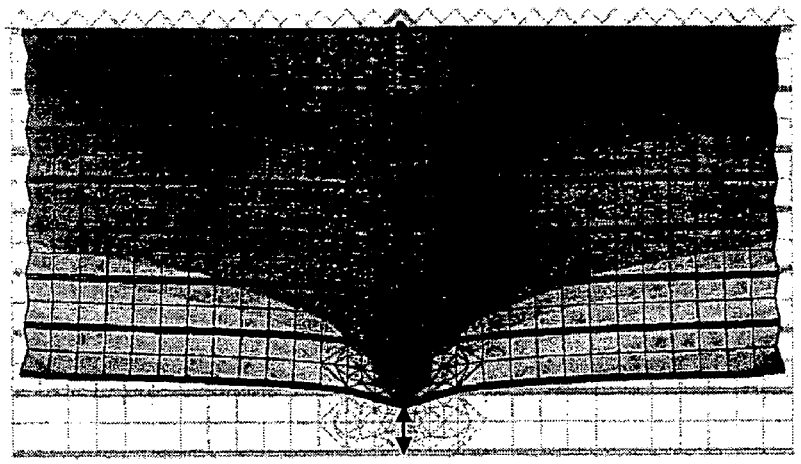
FIG. 5C is a plane view showing a result of analysis and calculation of the deformed state of an actuator having an electrode form in (c) of FIG. 4 for explaining the result of analysis and calculation of a deformed state of the actuator in the first embodiment of the present invention.
Figure 5D:
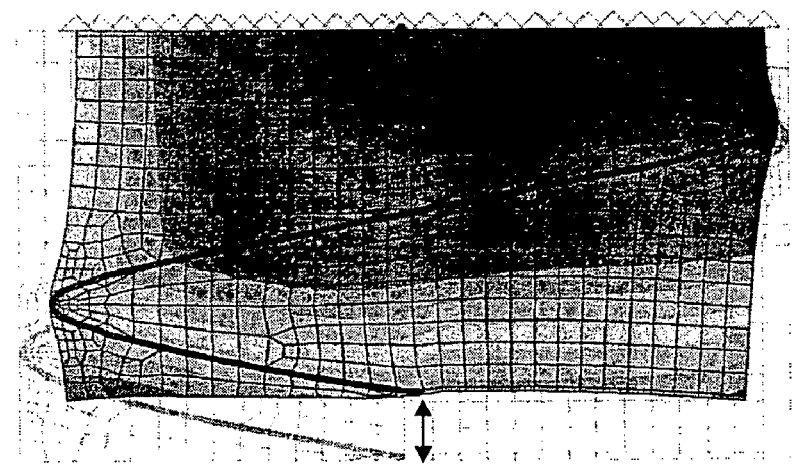
FIG. 5D is a plane view showing the result of analysis and calculation of a deformed state of an actuator having an electrode form of (d) of FIG. 4 for explaining the result of analysis and calculation of a deformed state of the actuator in the first embodiment of the present invention.

FIG. 5B to FIG. 5D are views in which conductive polymer layers are attached to the electrodes with the pattern forms in patterning of (b) to (d) shown in FIG. 4, and deformations associated with constriction of the conductive polymer layers in in-plane directions are simulation-calculated by finite element method. Under the conditions that the material of the conductive polymer layers is polypyrrole, the longitudinal elastic modulus is $0.003 \times 10^{12}$ N/m$^2$, Poisson's ratio is 0.3, and the conductive polymer layers are to contract in the in-plane direction of the polypyrrole in an isotropic way, deformations in the pattern forms in respective electrode patternings were relatively compared. The total size was set at 14 mm wide×8 mm long as was the case with FIG. 4, and the thickness of the polypyrrole conductive polymer layers was set at 20 μm.

FIG. 5A shows the case in which an electrode is not present and only a conductive polymer layer sheet is present. With the displacement in the center portion on the lower end in this case being 1, relative displacements at the same location were compared. It is to be noted that the results of calculation show the relative displacements, together with the forms before and after the deformations, as well as contour lines showing displacements of respective parts from a constraint point (center on the upper end) in gray scale.

FIG. 5B shows the case in which the conductive polymer layer 3 is attached to the electrode 1 with the pattern form in patterning in the first embodiment of the present invention in the column (b) in FIG. 4. The relative displacement in this case was calculated at 1.16, indicating that not only the displacement of the electrode 1 was less inhibited by reduction in rigidity in the longitudinal direction 5 of the actuator, but also such the anisotropy in rigidity of the electrode 1 has an effect of increasing the generated displacement. It is to be noted that in FIG. 5B, the state before deformation is shown by a chain line while the shrunken state after deformation is shown by a solid line.

Such a generated displacement increase effect in the longitudinal direction of the actuator in the present invention may be construed in such a way that high rigidity in the width direction orthogonal to the longitudinal direction constrains the displacement in this direction, and distortion components unable to escape will turn out to join the displacement in the longitudinal direction of the actuator.

It is to be noted that while it is not strictly affirmed that the conditions used as the assumptions for calculation such as the contraction being generated in the sheet-plane of the conductive polymer layer in an isotropic way and the Poisson's ratio being constant are correct, the assumption for calculation that the elastic characteristics of the conductive polymer layer are maintained is considered to be an accurate approximation.

FIG. 5C shows the case in which the conductive polymer layer sheet is attached to the electrode 1 in the column (c) in FIG. 4 having the link portions 1b of the elongated patterns 1a of the electrode 1 being disposed at the middle portions in succession in the longitudinal direction. In this case, the calculation result indicated that the generated displacement increase effect was not realized and that the displacement was reduced to 62% of the displacement gained in the case of the conductive polymer layer sheet only.

FIG. 5D shows the case of the electrode in the column (d) in FIG. 4, which is patterned in a waveform. In this case, the displacement increase effect, though smaller than that in the case of FIG. 5B, was realized. However, while deformation in the case of FIG. 5B is generated evenly in each part on the entire area, the deformation in the case of D is uneven and resultant unnecessary distortion and internal stress as an actuator are considered to impose an unfavorable influence on the reliability of the actuator. Moreover, in the case of FIG. 5B, a distance from the electrode to the plane surface of the conductive polymer layer sheet is even on the entire area range and is short, which makes it possible to apply homogeneous electric fields to the conductive polymer layer and to perform uniform and high-speed doping of the conductive polymer layer with ion species, which contributes to deformation. In the case of FIG. 5D, on the contrary, a distance from the electrode to the plane surface of the conductive polymer layer is uneven, which generates uneven electric fields and uneven doping of ion species in accordance with the uneven distance, which limits the operation speed. It is to be noted that in FIG. 5D, the state before deformation is shown by a chain line while the shrunken state after deformation is shown by a solid line. Thus, the case of FIG. 5D, though it is also the first embodiment of the present invention, is less preferable than the case of FIG. 5B.

Figure 5E:
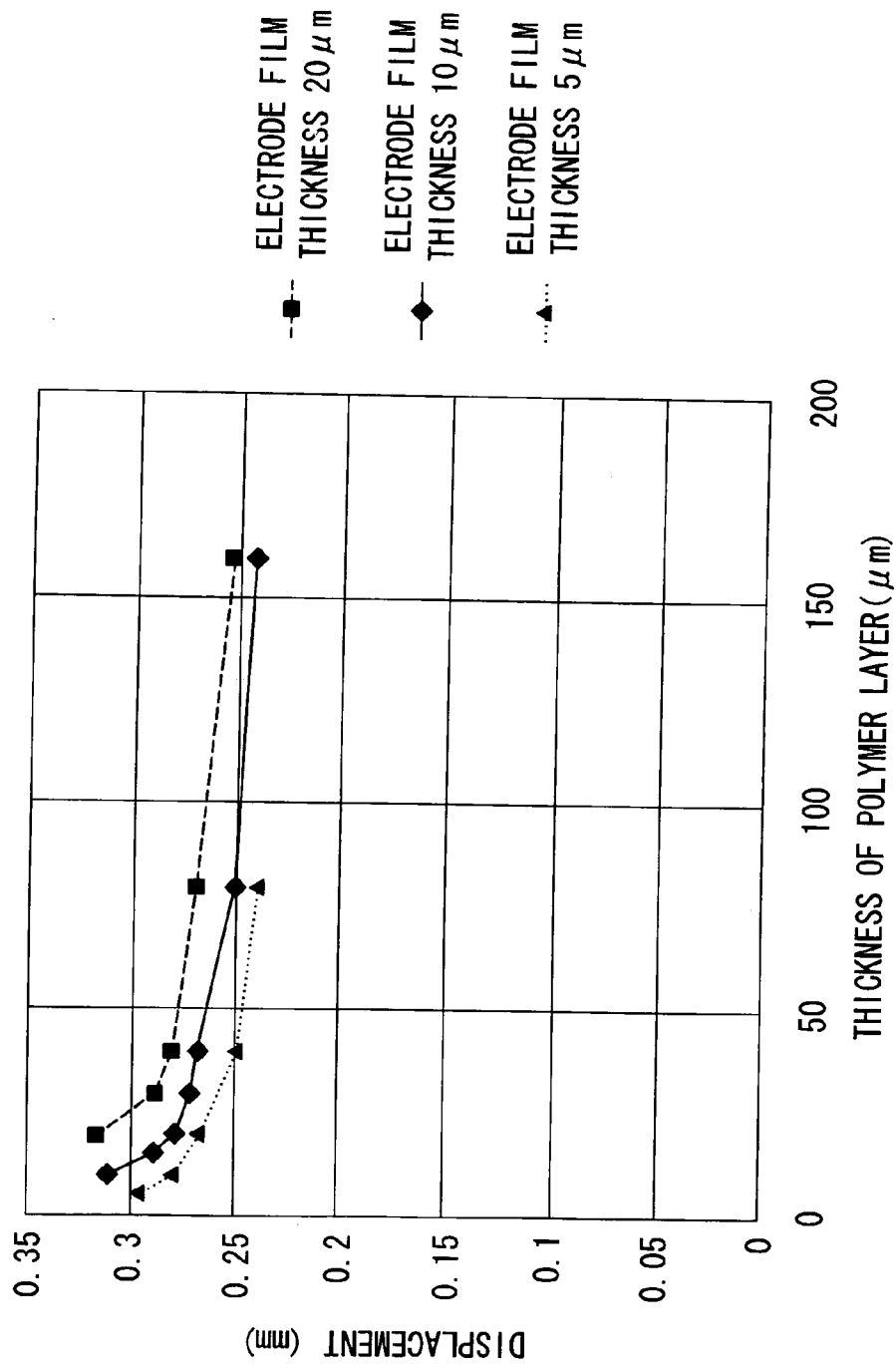
FIG. 5E is a graph showing the relationship between a thickness of a conductive polymer layer and a displacement amount of the actuator of FIG. 5B in the first embodiment of the present invention when a length of the actuator is 8 mm and a film thickness of the electrode of the actuator is changed (5 μm, 10 μm, 20 μm)
Figure 5F:
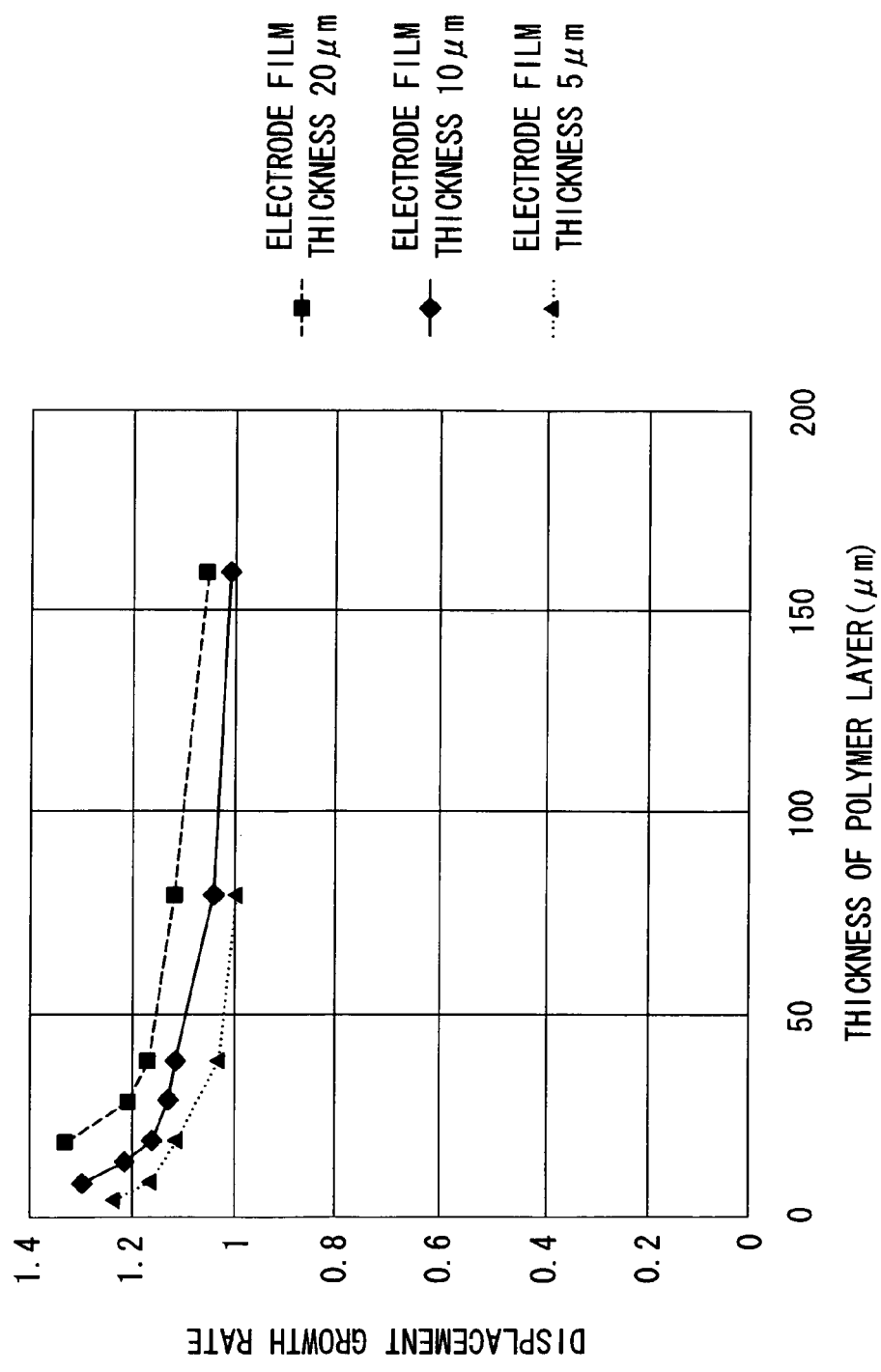
FIG. 5F is a graph showing the relationship between a thickness of a conductive polymer layer and a growth rate of a displacement amount (displacement growth rate) of the actuator of FIG. 5B in the first embodiment of the present invention when a length of the actuator is 8 mm and a film thickness of the electrode of the actuator is changed (5 μm, 10 μm, 20 μm)

FIG. 5E is a graph view showing the relationship between the thickness of the conductive polymer layer and a displacement amount of the actuator of FIG. 5B in the first embodiment of the present invention when a length of the actuator is 8 mm and a film thickness of the electrode of the actuator is changed (5 μm, 10 μm, 20 μm). Moreover, FIG. 5F is a graph view showing the relationship between a thickness of the conductive polymer layer and a growth rate of a displacement amount (displacement growth rate) of the actuator of FIG. 5B in the first embodiment of the present invention when a length of the actuator is 8 mm and a film thickness of the electrode of the actuator is changed (5 μm, 10 μm, 20 μm). These graph views show the results of simulation when assumed values for calculation of the patterned electrode are set as follows as with the case described before: the material is stainless steel SUS304; the longitudinal elastic modulus is $0.072 \times 10^{12}$ N/m$^2$; Poisson's ratio is 0.3; and the thickness is 10 μm, whereas assumed values of the conductive polymer layer are set as follows: the material is polypyrrole; the longitudinal elastic modulus is $0.003 \times 10^{12}$ N/m$^2$; Poisson's ratio is 0.3; and the thickness is 10 μm, 20 μm, 40 μm, 80 μm, and 160 μm. It was discovered that when the thickness of the conductive polymer layer was 10 μm which was the same as the thickness of the electrode, the displacement growth rate was 30%, and as the thickness increased, the displacement growth rate decreased.

Figure 5G:
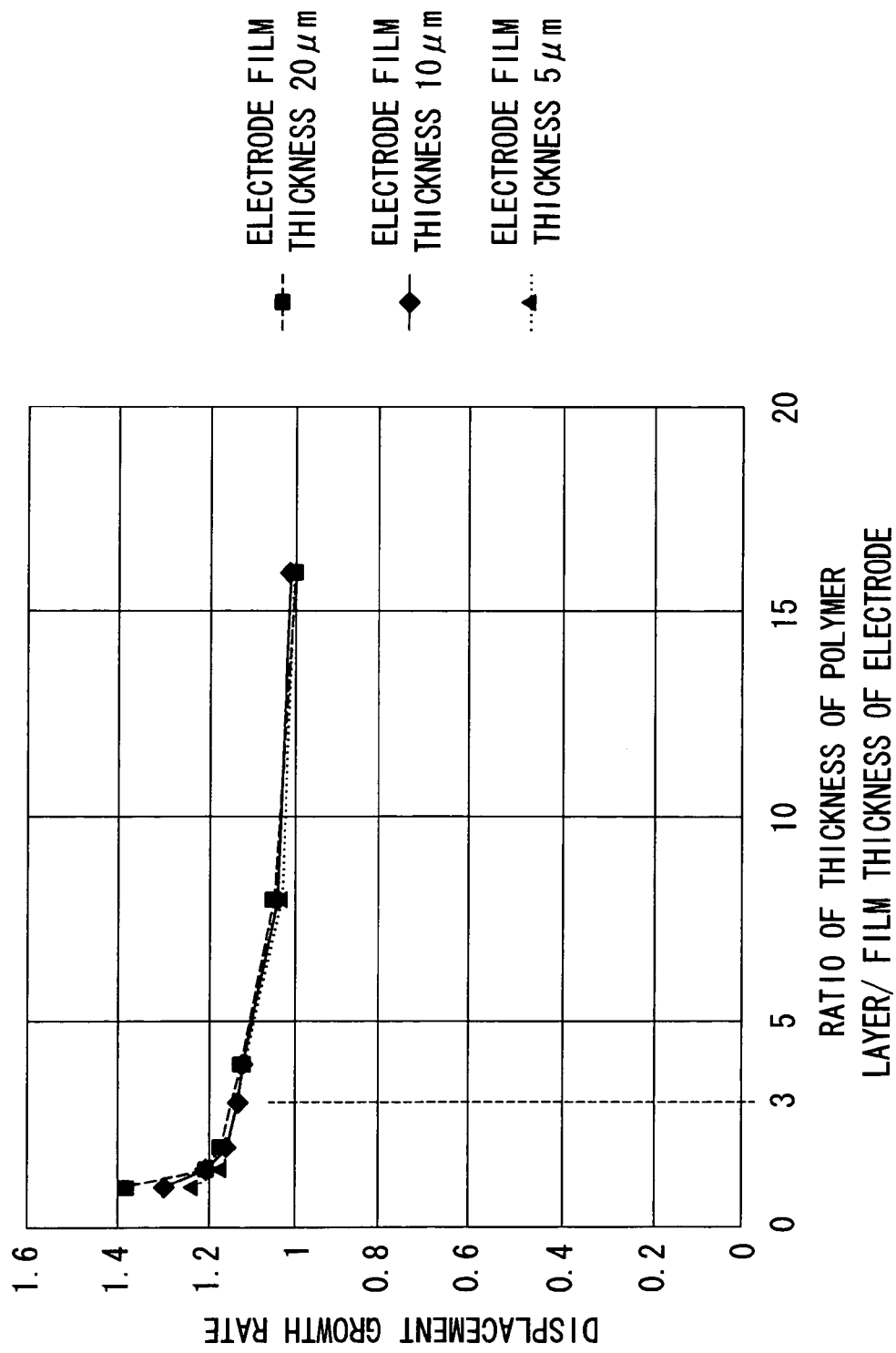
FIG. 5G is a graph showing the result of FIG. 5F by taking the displacement growth rate as a vertical axis and a ratio of (thickness of conductive polymer layer/film thickness of electrode) as a horizontal axis.

FIG. 5G is a graph view showing the result of FIG. 5F by taking the displacement growth rate as a vertical axis and a ratio of thickness of the conductive polymer layer to film thickness of the electrode as a horizontal axis. It was discovered that when said ratio was 3 or less, noticeable displacement increase effect was present.

The displacement increase effect generated in the actuator longitudinal direction (expansion and contraction direction) in the first embodiment of the present invention is generated in such away that high rigidity in the width direction orthogonal to the longitudinal direction constrains the displacement in this width direction, and distortion components unable to escape turn out to join the displacement in the longitudinal direction of the actuator. The phenomenon of the displacement increase effect decreasing as thickness increases is attributable to the fact that as the thickness of the conductive polymer layer becomes larger than the thickness of the patterned electrode, the distortion components are absorbed by a volume portion in the thickness direction so that the components contributing to the displacement in the longitudinal direction of the actuator decrease. Therefore, the displacement increase effect found in the structure of the actuator in the first embodiment of the present invention is a characteristic developed particularly and distinctively in a flat-plate low-profile actuator.

In an actuator which deforms a conductive polymer, the major deformation principle is coming and going of anions or cations from and to the conductive polymer layer in an oxidation reduction reaction. Therefore when excessive voltage is applied, the electrochemical reaction becomes irreversible, thereby generating defects which affect its cycle life. It is indicated that the aforementioned displacement increase effect of the actuator in the first embodiment of the present invention allows the actuator to drive at a voltage relatively lower than the actuator which does not have the displacement increase effect, for obtaining the same generated displacement. Therefore, the irreversible electrochemical reaction can be avoided and this particularly is an advantage of the actuator of the present invention, which makes it possible to provide an actuator excellent in cycle life and durability. Similarly, an electrolyte is dissolved by application of an excessive voltage, and this affects the life of the actuator. This issue can be solved by driving at a low voltage.

Further, these apparatuses function by coming and going of anions and cations from and to the conductive polymer layer through voltage application, and since this process is a diffusion process, the speed is controlled by the diffusion process. By structuring the conductive polymer layer of the actuator in the first embodiment of the present invention to be flat-plate and low-profile, the diffusion is performed swiftly and uniformly in the thickness direction, thereby making it possible to provide an actuator capable of high-speed function.

Working Example 1

Figure 6:
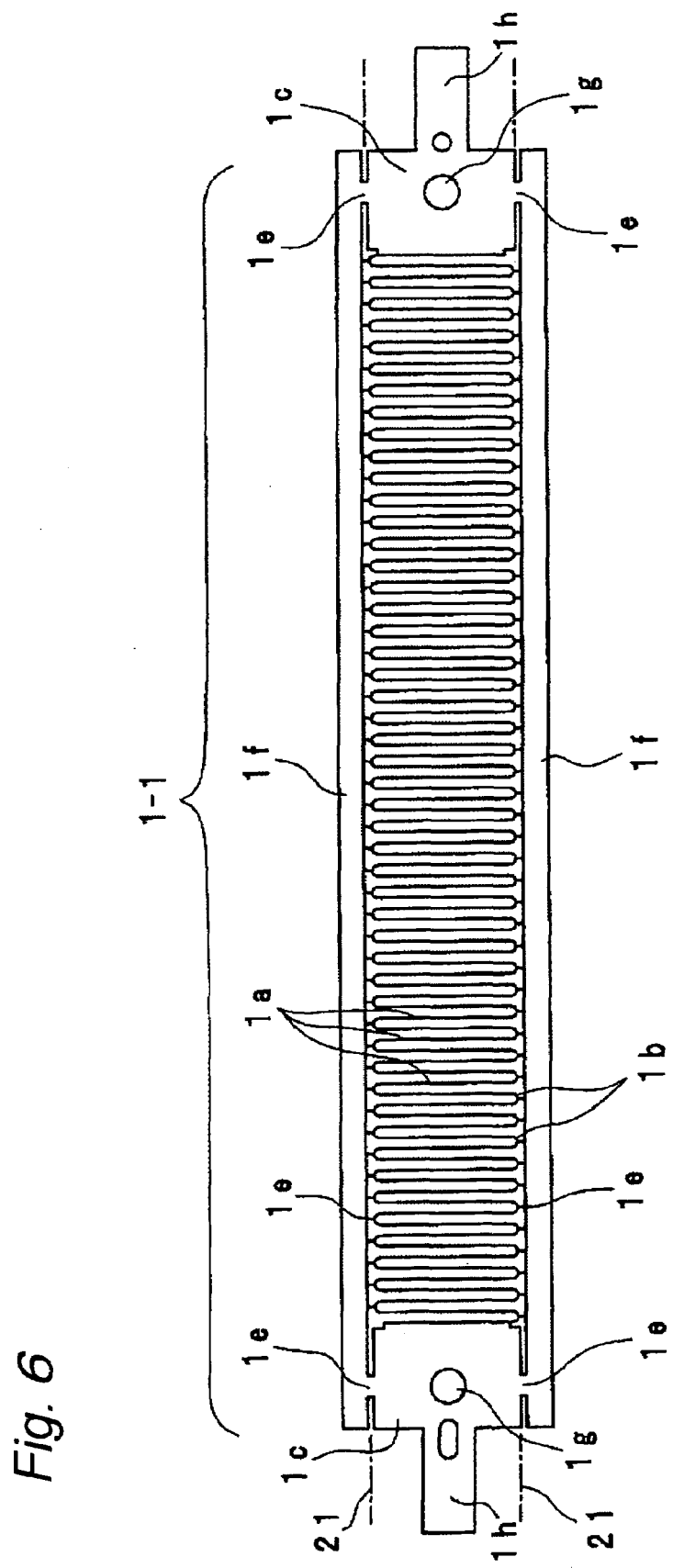
FIG. 6 is a plane view showing an electrode on a flat surface as an experimental model of the first embodiment of the present invention.

FIG. 6 shows a prototype electrode 1-1 formed by etching a stainless foil with a thickness of 10 μm to have a zigzag-shaped electrode patterning similar to that in FIG. 3A. The dimensions of an elongated pattern 1a can be 10 μm width and 14 mm long, with a pitch of 1 mm. Since these zigzag-shaped patterns are extremely thin lines, they have rigidity low enough for them to be deformed by their own weights and lose their shape. Therefore for the purpose of reinforcement, a cutoff portion 1f is disposed on both sides along the longitudinal direction, and the link portions 1b of the elongated patterns 1a and the cutoff portions 1f are linked by cutoff portion link portions 1e. As described later, these cutoff portions 1f are cut away at cutting positions 21 shown by chain lines in FIG. 6 after the conductive polymer layer 3 is formed on the electrode 1-1. The size of a pattern formation portion of the electrode 1 after the cutting is set at 100 mm long and 14 mm wide (corresponding to the length of the aforementioned elongated patterns 1a). On both the end portions of the electrode 1-1, extension portions 1c functioning as a force action portion are provided, and pin holes 1g for coupling hooks with pins are provided. Further, on the end portions of the extension portions 1c of the electrode 1-1, extraction electrodes 1h are further provided. It is to be noted that a small hole and a long hole outside the pin holes 1g disposed on both the ends are holes disposed for alignment of the pin during manufacturing process.

While formation of the conductive polymer layer 3 on the electrode 1-1 can be achieved by electrolytic polymerization or casting method, herein the electrolytic polymerization method was employed as a formation method for organic conductive polymer. In this case, since the conductive polymer layer 3 was grown by polymerization at locations where the electrode of the patterned electrode portion is not present, electrolytic polymerization was conducted while the electrode in FIG. 6 was in contact with another stainless flat plate electrode, and then the stainless flat plate electrode was removed. As the conductive polymer layer 3, polypyrrole with a current density of 1 mA/cm$^2$ and a film thickness of 20 μm was synthesized by electrolytic polymerization in an aqueous solution in which 0.1 mol/liter of pyrrole monomer and 0.25 mol/liter of paraphenol sulfonic acid that was to be a supporting electrolyte layer were dissolved, in a galvanostat mode (constant current control mode) with use of the electrode as a deposition electrode.

Next, as the electrolyte layer, a polymer gel sheet containing ionic fluid containing butyl methyl imide cation (BMIM$^+$) hexa fluorophosphate (PF$_6$) was bonded to the polypyrrole sheet, and carbon powders were sprayed and applied to the polymer gel sheet as an opposite electrode.

When a voltage of ±1V was applied to the actuator, strain of about 3.5% was observed in the longitudinal direction in an non-load state, and generated stress of about 3 Mpa was observed in the state that the displacement is constrained. It is to be noted that as a result of checking generated displacement in an actuator composed of polypyrrole only with use of the materials system same as above and without the use of the electrode 1 in the first embodiment of the present invention, the generated displacement was about 3%, which confirmed the displacement increase effect achieved by electrode 1 in the first embodiment of the present invention.

In each of the embodiments of the present invention, as the material of the electrode 1, metal including gold, platinum, nickel, or titanium; alloy; or carbon, in addition to stainless steel in the above embodiment may be used. Further, a thin plate made of any one of these materials may be coated with these material groups through sputter deposition etc. Further, the surface thereof may be subjected to surface treatment such as chemical oxidation. Among these materials, a titanium thin plate or a surface coated with titanium through sputter deposition which was subjected to chemical oxidation treatment with alkali solution such as SCI solution (H$_2$O$_2$:NH$_3$:water=1:1:5) provided particularly good bond strength with polypyrrole. This chemical oxide film was good in electrical conductivity with polypyrrole.

In each of the embodiments of the present invention, as the material of the conductive polymer layer 3, a pi-conjugated polymer with a base substrate of polyaniline, polypyrrole, or polythiophene; any one of organic conductive polymers which are derivatives thereof; or a carbon conductive polymer such as carbon fine particles, carbon nanotubes, or carbon fibers are used, by which an actuator involving swell and shrinkage deformation as with the case of the above embodiment may be implemented.

In each of the embodiments of the present invention, an example of forming an organic conductive polymer layer by casting method is obtained by dissolving powders of polyaniline basic emeraldine (emeraldine base: EB) synthesized by oxidation polymerization in a solvent and spreading the powders and the solvent on a substrate to evaporate the solvent so as to obtain a polyaniline cast film as an organic conductive polymer layer.

Moreover, an example of forming a carbon dispersion system conductive polymer layer by a casting method is obtained by mixing carbon fine particles into a Nafion dispersed solution and spreading the mixture on a substrate to evaporate the solvent.

In each of the embodiments of the present invention, using polymer gel or polymer containing an ionic solution as an electrolyte layer as described in the above embodiment has following advantages. The ionic solution has a vapor pressure of 1 mHg or lower at ambient temperatures and is nonvolatile, and therefore the electrolyte layer will not change by evaporation, allowing long-term usage in the atmosphere with sufficient reliability.

In each of the embodiments of the present invention, as the electrolyte constituting the electrolyte layer, a fibrous sheet physically impregnated with an electrolyte solvent or an electrolyte solvent being held in a polymer gel skeleton may be considered.

The ionic solution is used as the electrolyte, and it is possible to consider a fibrous sheet physically impregnated with the ionic solution or the ionic solution being held in a polymer gel skeleton.

In each of the embodiments of the present invention, as the opposite electrode, in addition to the carbon powders applied to the actuator in the above embodiment, a conductive paste or grease containing nonoxide metal powders of carbon, gold, or the like may be applied thereto. Moreover, a deposited thin film made of metal such as gold, platinum, nickel, or titanium, alloy thereof, or carbon; or the deposited thin film so patterned as to decrease rigidity in the longitudinal direction of the actuator may be used.

In each of the embodiments of the present invention, it is naturally understood that a flat plate electrode having a structure identical to that of the electrode 1 may also be used as the opposite electrode 2.

Second Embodiment

Figure 7B:
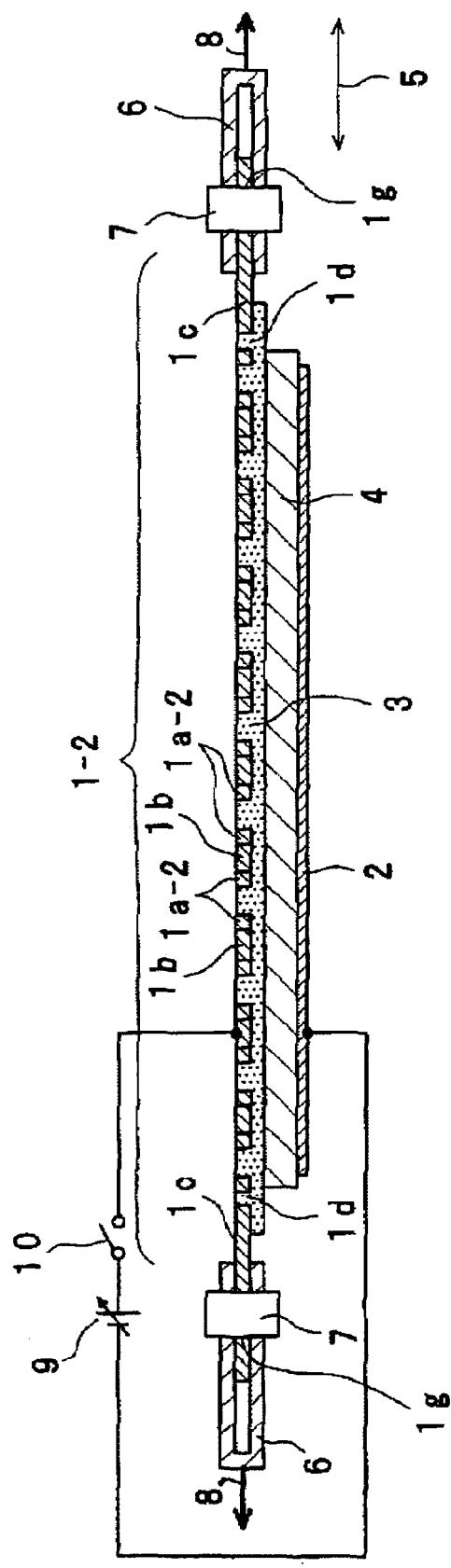
FIG. 7B is a cross sectional view showing the actuator in the second embodiment of the present invention.

FIG. 7A and FIG. 7B are a plane view and a cross sectional view showing a flat-plate low-profile actuator having a pattern form in another electrode patterning corresponding to second embodiment of the present invention. The actuator shown in FIG. 7A and FIG. 7B is identical to the actuator in FIG. 1 in the respect that an electrolyte layer 4 in contact with the conductive polymer layer 3 is present between an electrode 1-2 (corresponding to the electrode 1) having a conductive polymer layer 3 and a opposite electrode 2. The electrode 1-2 having the conductive polymer layer 3 is patterned to have low rigidity in an expansion and contraction direction 5 of the conductive polymer layer 3, and serves as a planar electrode also functioning as a support. The pattern form in patterning the electrode 1-2 in FIG. 7A and FIG. 7B is the form in which mainly in a direction orthogonal to the longitudinal direction 5, a number of elongated patterns 1a-2 are disposed and linked through link portions 1b. This point is also similar to FIG. 1A, though a basic pattern formed by elongated patterns 1a-2 is closed like a closed circuit (in other words, like a square-shaped frame), and these patterns are linked through the link portions 1b. This structure has the advantage that if a closed circuit pattern portion 1a-2 is disconnected, critical continuity failures of the electrode 1-2 will not occur unlike the case of the pattern in FIG. 1A.

Figure 8A:
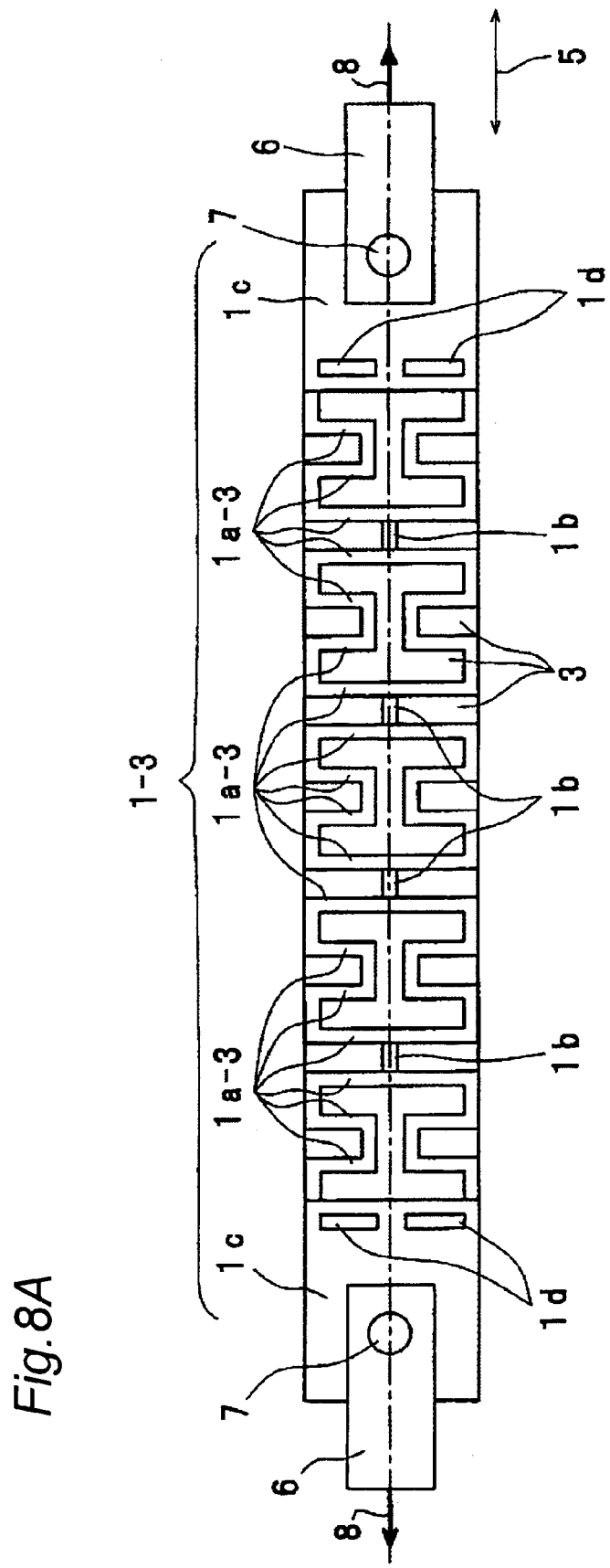
FIG. 8A is a plane view showing an actuator in another configuration in the second embodiment of the present invention.
Figure 8B:
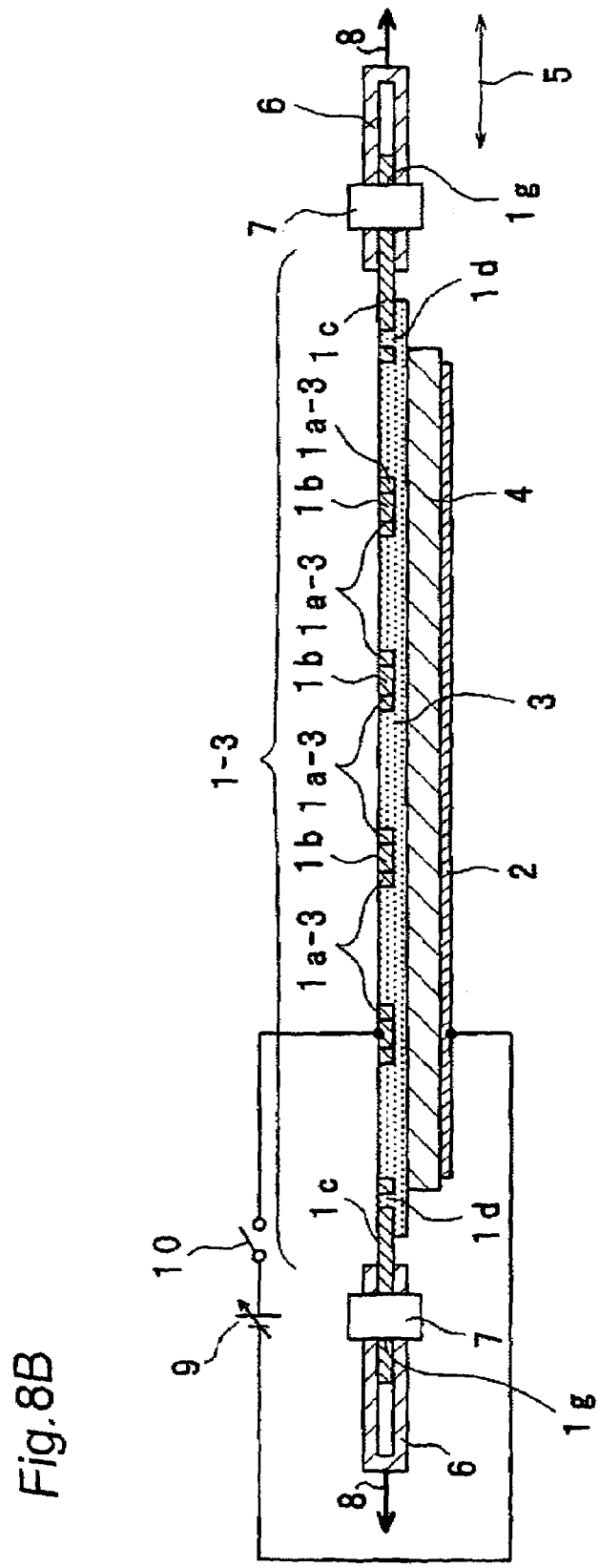
FIG. 8B is a cross sectional view showing the actuator in the another configuration in the second embodiment of the present invention.

FIG. 8A and FIG. 8B are a plane view and a cross sectional view showing an actuator having a pattern form in patterning of an electrode 1-3 (corresponding to the electrode 1) in another configuration in the second embodiment of the present invention. The component members and their operations in the drawings are identical to those in FIG. 1A and so the description thereof is omitted. The pattern form in the electrode patterning is characterized in that the proportion of the link portions 1b to a number of elongated patterns 1a-3 (corresponding to the elongated patterns 1a) are further decreased, and closed circuit pattern portions 1a-3 composed of elongated patterns are increased. As a result, even if the electrode might be disconnected, the probability of critical failure can be further reduced.

Figure 9B:
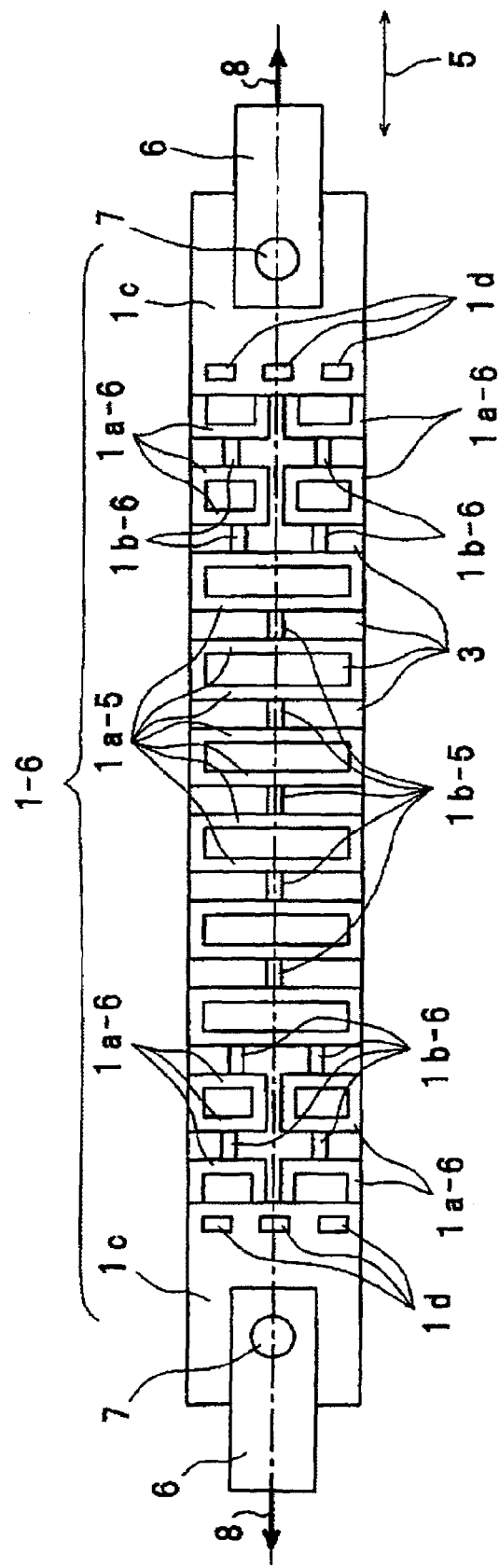
FIG. 9B is a cross sectional view showing an actuator in yet another configuration in the second embodiment of the present invention.

FIG. 9A and FIG. 9B are plane views showing an actuator having a pattern form in patterning of an electrode 1-4 (corresponding to the electrode 1) in still another configuration in the second embodiment of the present invention. In FIG. 9A, the width of elongated patterns 1a-4 (corresponding to the elongated patterns 1a) positioned close to extension portions 1c (force action portions) of the electrode 1-4 and the width of link portions 1b-4 (corresponding to the link portions 1b) are made relatively larger than the width of elongated patterns 1a-5 (corresponding to the elongated patterns 1a) and the width of link portions 1b-5 (corresponding to the link portions 1b) which are the portions other than the elongated patterns 1a-4 and the link portions 1b-4 for increasing rigidity in the expansion and contraction direction 5. This provides an effect of reinforcing the strength in the locations close to the extension portions 1c (force action portions). FIG. 9B shows an actuator in a pattern form in patterning of an electrode 1-6 (corresponding to the electrode 1) in yet another configuration in the second embodiment of the present invention, in which elongated patterns 1a-6 (corresponding to the elongated patterns 1a) in locations close to extension portions 1c (force action portions) and link portions 1b-6 (corresponding to the link portions 1b) are disposed in a plurality of lines as with the case in FIG. 9A, so that rigidity in the locations in the expansion and contraction direction 5 can be increased to reinforce the strength in those locations. Thus, arbitrary distribution of the pattern form in patterning of the electrode 1-6 makes it possible to impart desirable functions.

Third Embodiment

FIG. 10A, FIG. 10B, FIG. 11A, and FIG. 11B are plane views and cross sectional views respectively showing a stacked actuator in a third embodiment of the present invention and a stacked actuator in another configuration in the third embodiment.

Figure 10A:
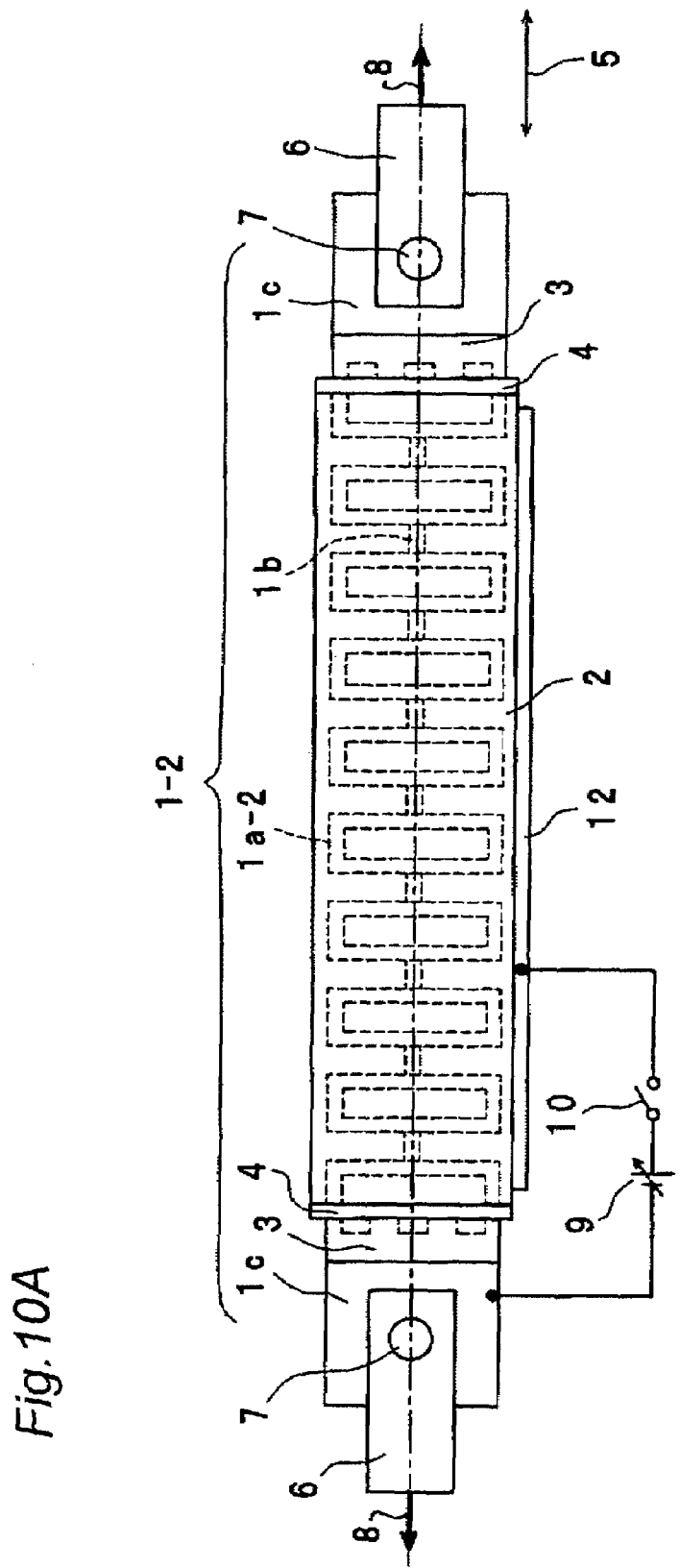
FIG. 10A is a plane view showing an actuator in a third embodiment of the present invention.
Figure 10B:
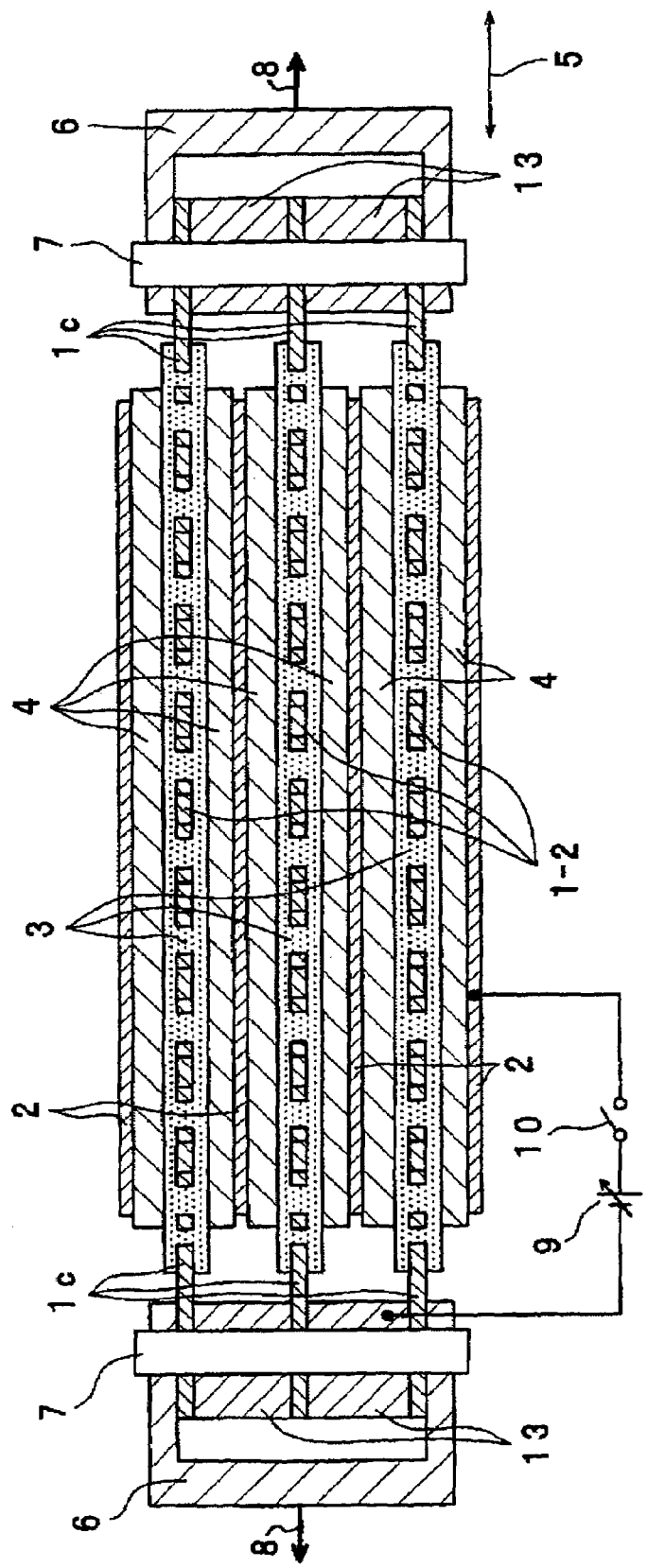
FIG. 10B is a cross sectional view showing the actuator in the third embodiment of the present invention.

In the actuator shown in FIG. 10A and FIG. 10B, a second conductive polymer layer integrally formed with a conductive polymer layer 3 on the top surface of the flat-plate low-profile actuator in the second embodiment in FIG. 7A with an electrode 1-2 being disposed in a center portion of the conductive polymer layer 3 and an electrolyte layer 4 and an opposite electrode 2 being disposed on the top surface side of the conductive polymer layer 3 constitutes a flat-plate low-profile constitutional unit. The flat-plate low-profile constitutional units are stacked in a plurality of layers, e.g., three layers, so that the electrodes 1-2, the conductive polymer layers 3, the electrolyte layers 4, and the opposite electrodes 2 are disposed in parallel with each other, and one opposite electrode 2 is commonly used for the opposite electrode 2 on the lower end of the first-layer actuator and the opposite electrode 2 on the top end of the second-layer actuator, while one opposite electrode 2 is commonly used for the opposite electrode 2 on the lower end of the second-layer actuator and the opposite electrode 2 on the top end of the third-layer actuator. Further, a conductive link member 13 is interposed in between each extension portion 1c of the first-layer actuator and each extension portion 1c of the second-layer actuator to establish an electric connection, while a conductive link member 13 is interposed in between each extension portion 1c of the second-layer actuator and each extension portion 1c of the third-layer actuator to establish electric connection. Then, the extension portions 1c of the first-layer actuator to the extension portions 1c of the third-layer actuator are hooked by hooks 6, and the hook 6, the hooked extension portion 1c of the first-layer actuator, upper-side conductive link member 13, extension portion 1c of the second-layer actuator, lower-side conductive link member 13, and extension portion 1c of the third-layer actuator are pierced by a pin 7, and by linking these members with the pin 7, the load 8 acting upon each extension portion 1c is supported. It is to be noted that reference numeral 12 in FIG. 10A is a protruding portion protruding from the opposite electrode 2 of the third-layer actuator along the width direction, and one end of a circuit having a switch 10 and a power source 9 is connected to the protruding portion 12 while the other end is connected to the conductive link member 13 disposed on either one of the end portions of the actuator.

Figure 11A:
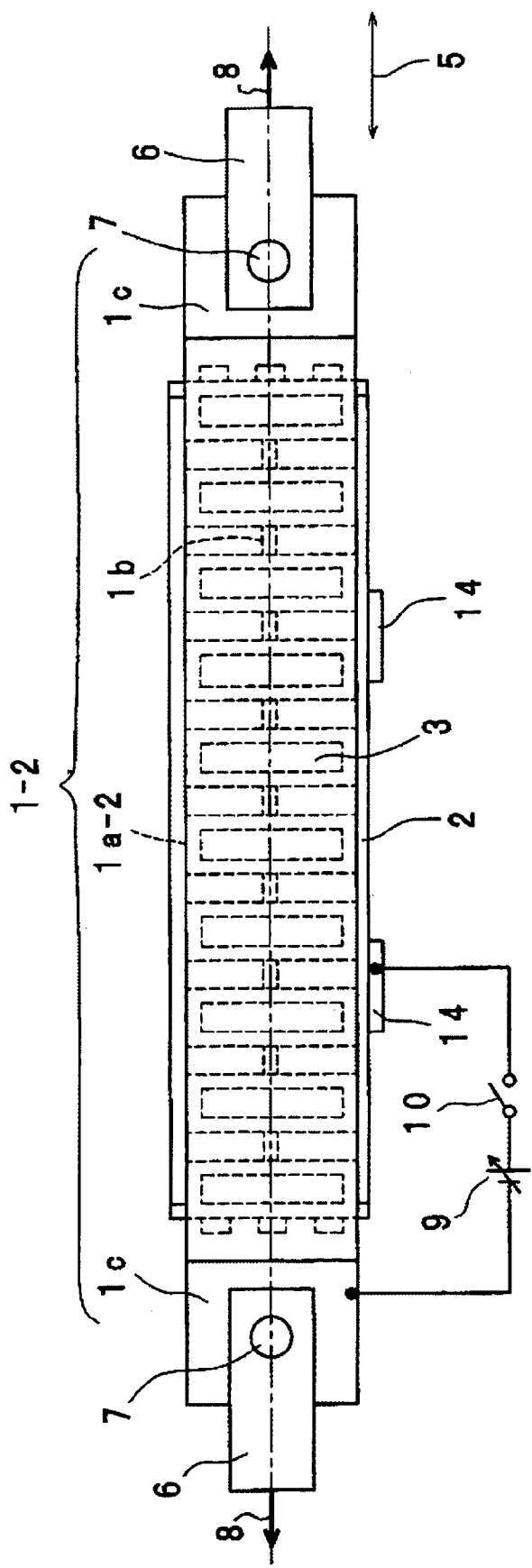
FIG. 11A is a plane view showing an actuator in another configuration in the third embodiment of the present invention.
Figure 11B:
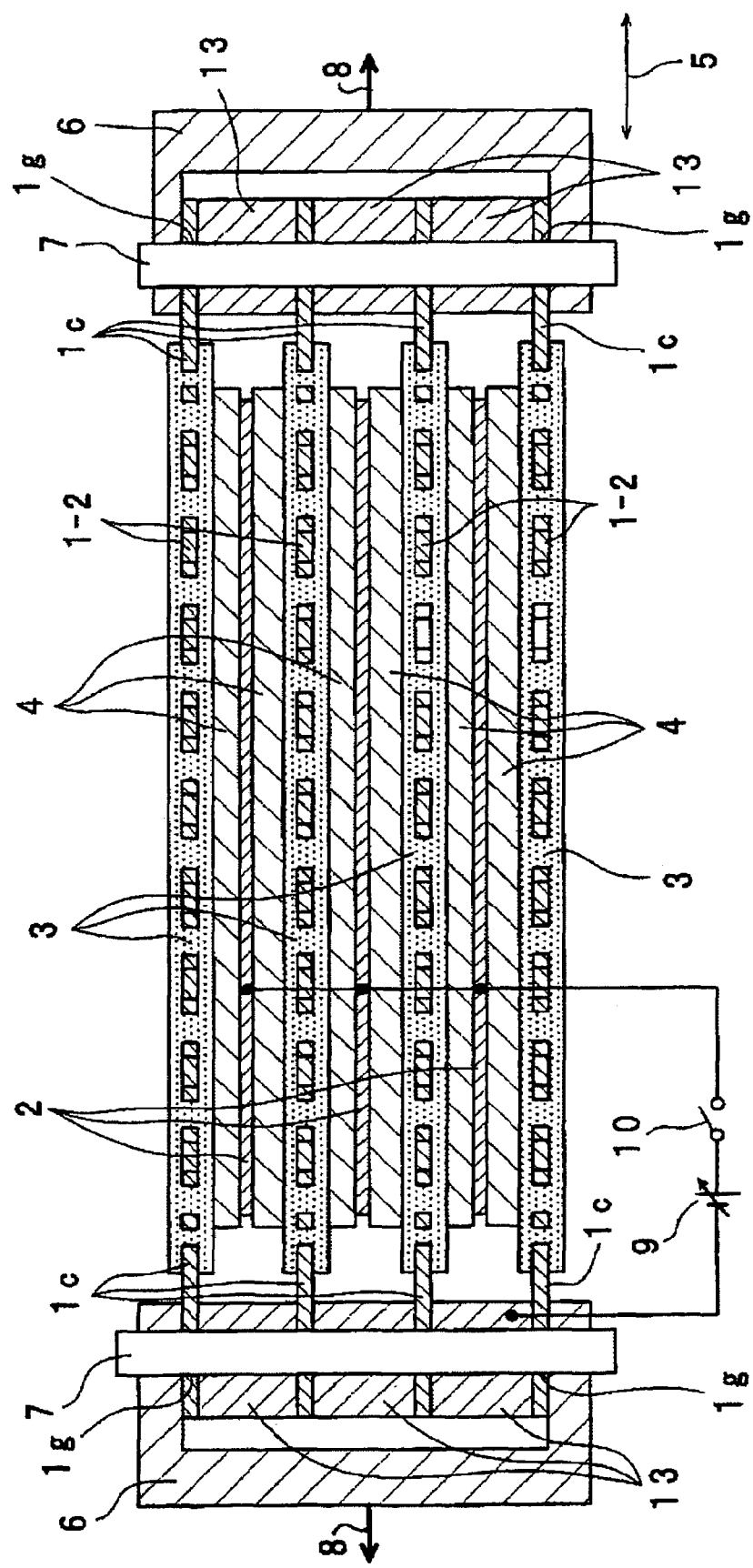
FIG. 11B is a cross sectional view showing the actuator in the another configuration in the third embodiment of the present invention.

Moreover, FIG. 11A and FIG. 11B show an actuator in another configuration. More particularly, in the actuator shown in FIG. 11A and FIG. 11B, a second conductive polymer layer integrally formed with a conductive polymer layer 3 on the top surface of the actuator in the second embodiment in FIG. 7A with an electrode 1-2 being disposed in a center portion of the conductive polymer layer 3 and an electrolyte layer 4 and an opposite electrode 2 being disposed on the top surface side of the conductive polymer layer 3 basically constitutes a constitutional unit. The constitutional units are stacked in a plurality of layers, e.g., two layers, so that the electrodes 1-2, the conductive polymer layers 3, the electrolyte layers 4, and the opposite electrodes 2 are disposed in parallel with each other, and one opposite electrode 2 is commonly used for the opposite electrode 2 on the lower end of the upper-side (second layer in FIG. 11B) actuator and the opposite electrode 2 on the top end of the lower-side (third layer in FIG. 11B) actuator. Further, in the uppermost (first layer in FIG. 11B) actuator, the electrolyte layer 4 and the opposite electrode 2 are not disposed on the upper surface side of the conductive polymer layer 3, while in the lowermost (fourth layer in FIG. 11B) actuator, the electrolyte layer 4 and the opposite electrode 2 are not disposed on the lower surface side of the conductive polymer layer 3. Further, a conductive link member 13 is interposed in between each extension portion 1c of the first-layer actuator and each extension portion 1c of the second-layer actuator to establish electric connection, a conductive link member 13 is interposed in between each extension portion 1c of the second-layer actuator and each extension portion 1c of the third-layer actuator to establish electric connection, and further a conductive link member 13 is interposed in between each extension portion 1c of the third-layer actuator and each extension portion 1c of the fourth-layer actuator to establish electric connection. Then, the extension portions 1c of the first-layer actuator to the extension portions 1c of the fourth-layer actuator are hooked by hooks 6, and the hook 6, the hooked extension portion 1c of the first-layer actuator, upper-side conductive link member 13, extension portion 1c of the second-layer actuator, middle conductive link member 13, extension portion 1c of the third-layer actuator, lower-side conductive link member 13, and extension portion 1c of the fourth-layer actuator are pierced by a pin 7. By linking these members with the pin 7, the load 8 acting upon each extension portion 1c is supported. It is to be noted that reference numeral 14 in FIG. 11A is a protruding portion protruding from the lower-side opposite electrode 2 of the first-layer actuator along the width direction, and one end of a circuit having a switch 10 and a power source 9 is connected to the protruding portion 14 while the other end is connected to the conductive link member 13 disposed on either one of the end portions of the actuator.

In the stacked actuator in the third embodiment and the stacked actuator in another configuration in the third embodiment, the electrode 1-2 is planar, and therefore each component member of the actuator is given a planar structure, which can make stacking easy. The cross sectional ratio of the conductive polymer layer 3 involving the expansion and contraction action of the stacked actuator allows employment of such a planar lamination structure, thereby bringing about advantages of easy enhancement of packing density. As a result, it becomes possible to increase the cross sectional area of the conductive polymer layer 3, which is limited in the case of a single unit, thereby allowing implementation of an actuator having large generated force necessary in robotics applications and the like.

It is to be noted that since coming and going of ion species from and to the conductive polymer layer 3 is a diffusion process, there is a trade-off that time necessary for diffusion can be reduced by decreasing the thickness of the conductive polymer layer 3. Therefore, it is desirable to stack a number of conductive polymer layers 3 as a way of increasing the cross sectional area.

Fourth Embodiment

Description will be given of a manufacturing method for a planar electrode support for an actuator in a fourth embodiment, the planar electrode support functioning as a fundamental member to form the actuators in the first to third embodiments described before.

Figure 12A:
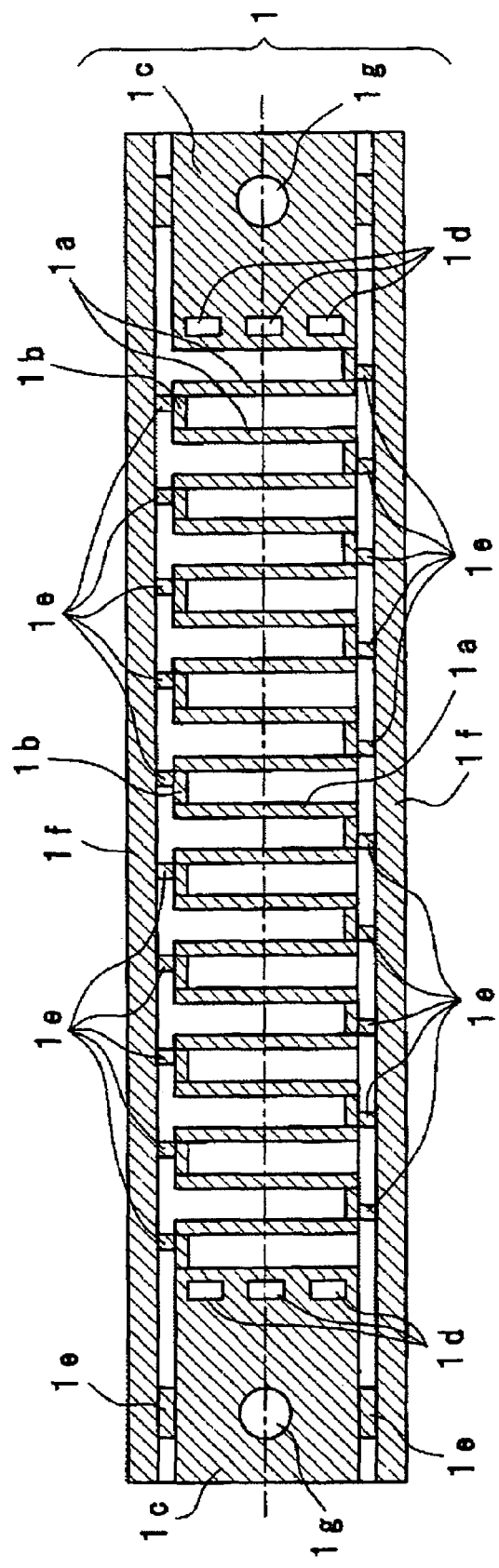
FIG. 12A is a plane view showing a planar electrode being supported in the state of being in close contact with another flat plate in a manufacturing method for a planar electrode support equipped with a conductive polymer in a fourth embodiment of the present invention.
Figure 12B:
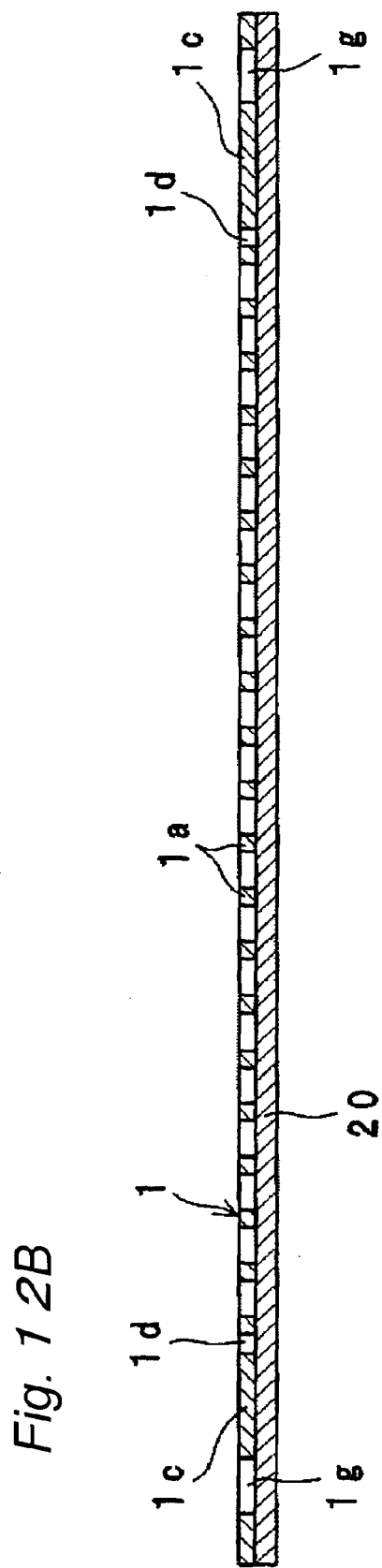
FIG. 12B is a cross sectional view showing the planar electrode being supported in the state of being in close contact with the another flat plate in the manufacturing method for a planar electrode support equipped with a conductive polymer in the fourth embodiment of the present invention.

FIG. 12A, FIG. 12B to FIG. 12H, and FIG. 12I are plane views and cross sectional views showing the planar electrode support structured to have conductive polymer layer 3 on the electrode 1 and a manufacturing method therefor. Since major component members in FIG. 12A and FIG. 12B are identical to those of the electrode 1 in the flat-plate low-profile actuator described in FIG. 1A (in FIG. 12A, the electrode 1 is hatched to distinguish the electrode 1 from space portions), the detailed description is omitted. Herein, as a component element facilitating manufacturing of a planar electrode support 90, a planar electrode 1 is formed to have cutoff portions if, which do not remain as part of the electrode 1 in the final product, on both the sides in the width direction. Respective link portions 1b for linking a number of elongated patterns 1a patterned on the electrode 1 to each other are linked to each opposed cutoff portion if through cutoff portion link portions 1e. Such patterning is performed by etching or punching. FIG. 12A and FIG. 12B show the state in which such a planar electrode 1 is supported in close contact with another flat plate 20.

Figure 12C:
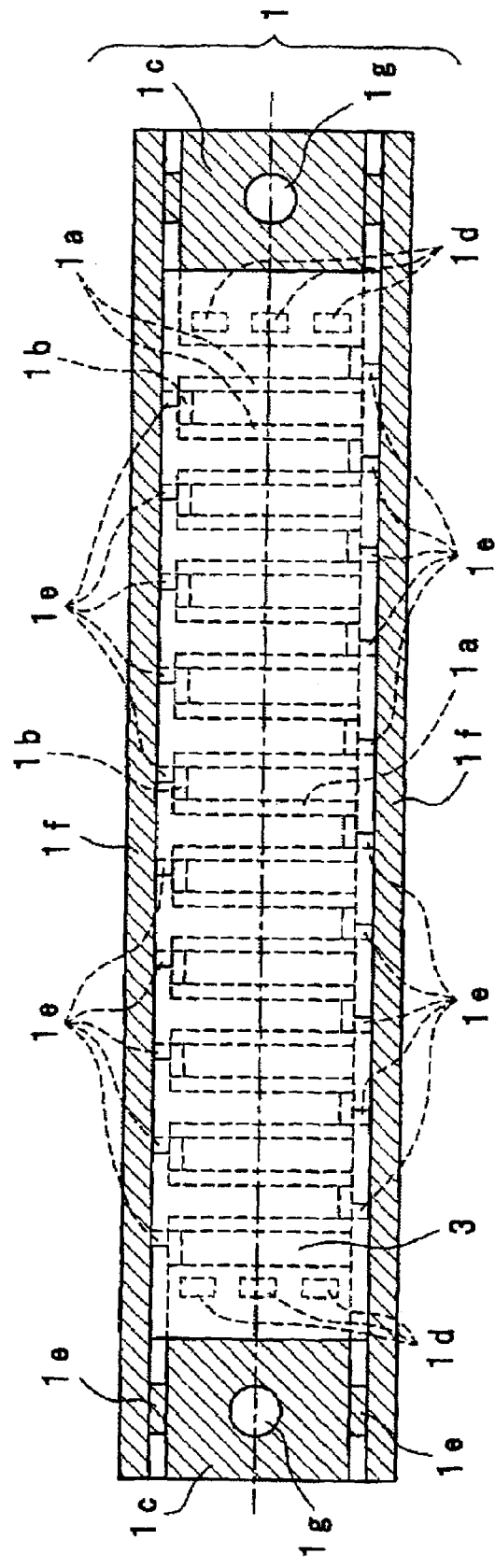
FIG. 12C is a plane view showing the state where the conductive polymer layer is formed so as to cover most parts of the planar electrode and the flat plate in the manufacturing method for a planar electrode support equipped with a conductive polymer in the fourth embodiment of the present invention.

Next, FIG. 12C and FIG. 12D show a state where a conductive polymer layer 3 is formed so as to cover most parts of the planar electrode 1 in close contact with the flat plate 20 and the flat plate 20 (in FIG. 12C, the electrode 1 is hatched to distinguish the electrode 1 from space portions). In the case of forming the conductive polymer layer 3 through electrolytic polymerization, the flat plate 20 serves as a flat plate electrode, and electrolytic deposition of conductive polymer is conducted by using both the electrode 1 and the flat plate electrode 20 as deposition electrodes to form the conductive polymer layer 3 in such a way as to cover most parts of the electrode 1 and the flat plate electrode 20. The conductive polymer layer 3 made of polypyrrole in the aforementioned working example 1 was formed by this method. As another formation method for the conductive polymer layer 3, a casting method may be employed. In this case, the flat plate 20 does not necessarily need to be an electrode, and the conductive polymer layer 3 can be formed by such methods as printing or application. One way of forming the conductive polymer layer 3 by a casting method is dissolving powders of polyaniline basic emeraldine (emeraldine base: EB) synthesized by oxidation polymerization in a solvent and spreading the powders and the solvent on a substrate to evaporate the solvent so as to obtain a polyaniline cast film as the conductive polymer layer 3.

Figure 12E:
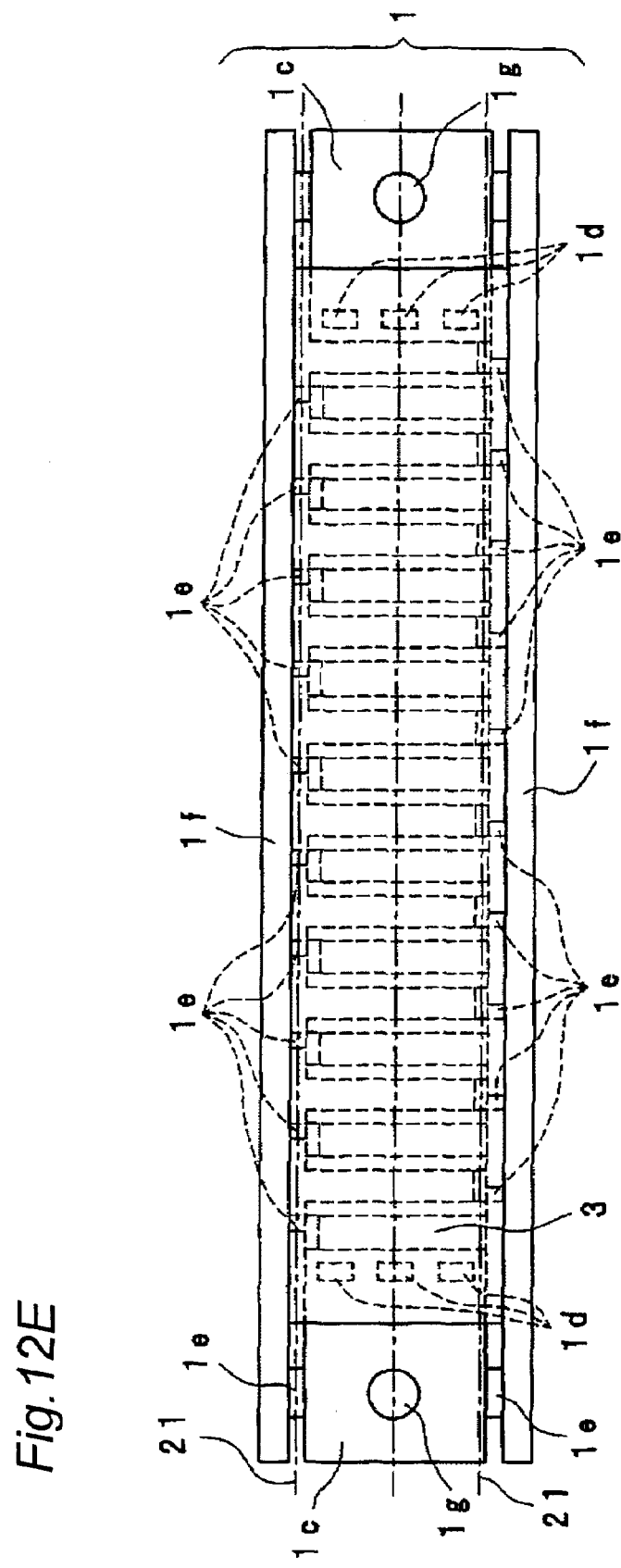
FIG. 12E is a plane view showing the state where the flat plate is removed from the electrode and the conductive polymer layer in the manufacturing method for a planar electrode support equipped with a conductive polymer in the fourth embodiment of the present invention.
Figure 12G:
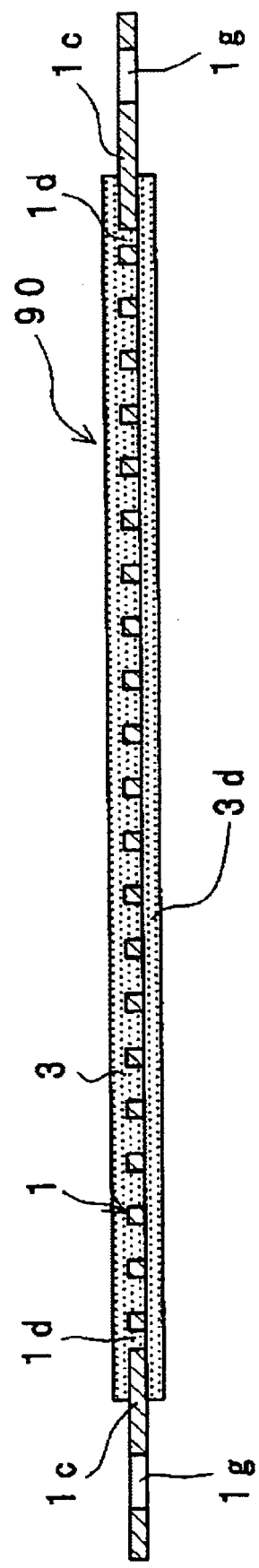
FIG. 12G is a cross sectional view showing the state where a conductive polymer layer is formed also on the back surface of the conductive polymer layer in the manufacturing method for a planar electrode support equipped with a conductive polymer in the fourth embodiment of the present invention.

Next, after the conductive polymer layer 3 is formed on the flat plate 20 so as to cover most parts of the electrode 1, the flat plate 20 is separated and removed from the electrode 1 and the conductive polymer layer 3. FIG. 12E and FIG. 12F show a state where the flat plate 20 is removed from the electrode 1 and the conductive polymer layer 3 in this way. If necessary, a conductive polymer layer 3*d* may be formed on the back surface of the conductive polymer layer 3 as shown in the cross sectional view of FIG. 12G. Thus, forming the conductive polymer layers 3, 3*d* on the both surfaces of the planar electrode support 90 provides the advantages that the effective area can be increased and a hole 1*d* provided on the extension portion 1*c* that is a force action portion can be linked through the front and back surfaces to increase reinforcement effect. Moreover, since the actuator may be structured to be symmetrical with respect to the planar electrode support 90 as the center, it becomes possible to provide a planar electrode support 90 equipped with the conductive polymer layers 3, 3*d*, which is free from unbalanced swell and shrinkage actions of the conductive polymer layers 3, 3*d*, free from unnecessary bending deformation and allows efficient expansion and contraction deformation in the expansion and contraction direction 5.

Figure 12H:
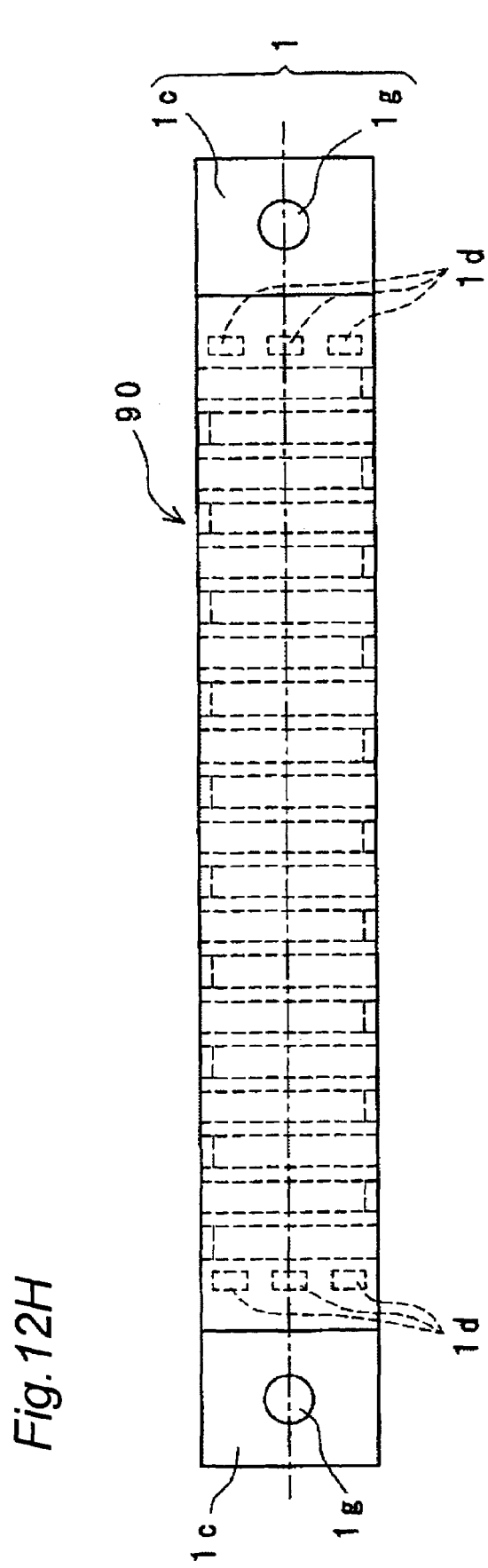
FIG. 12H is a plane view showing the state where cutoff portions on both sides are respectively cut off from the planar electrode in the manufacturing method for a planar electrode support equipped with a conductive polymer in the fourth embodiment of the present invention.
Figure 12I:
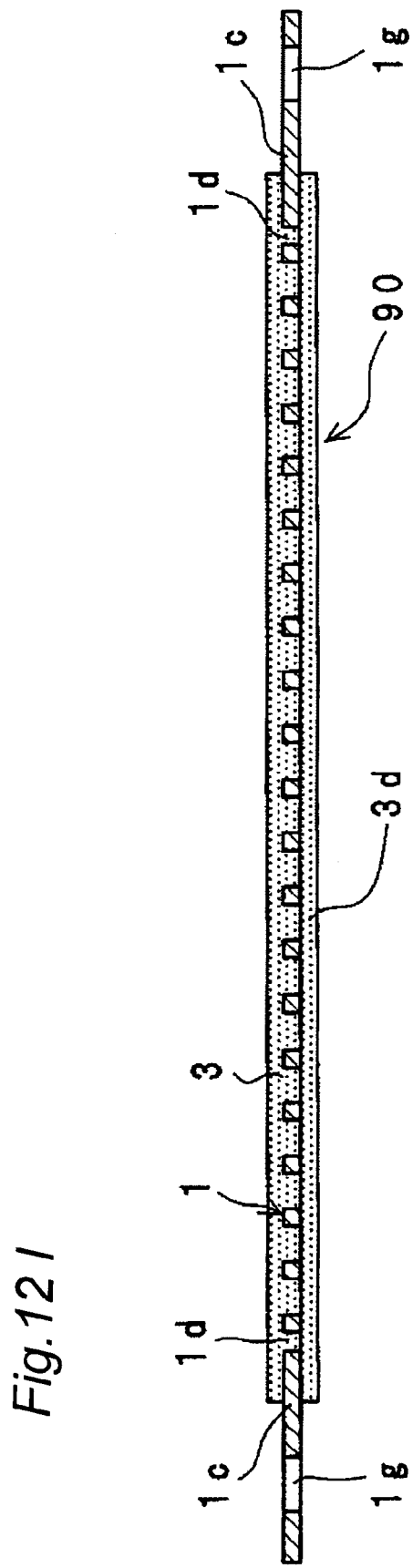
FIG. 12I is a cross sectional view showing the state where cutoff portions on both sides are respectively cut off from the planar electrode in the manufacturing method for a planar electrode support equipped with a conductive polymer in the fourth embodiment of the present invention.

Finally, at the locations of cutoff lines 21 in FIG. 12E, the cutoff portions if are cut off from both the sides of the planar electrode 1 so as to obtain the planar electrode support 90 equipped with the conductive polymer layers 3, 3*d* shown in FIG. 12H and FIG. 12I. At the stage that the conductive polymer is formed by electrolytic polymerization or casting method while the patterned planar electrode 1 is in contact with another flat plate 20, the interface between the flat plate 20 and their contact portion is not tightly bonded, and so the flat plate 20 can be easily separated from the electrode 1 and the conductive polymer layer 3. The inventors of the present invention have further discovered that easier separation is possible by using a flat plate having a sufficiently smooth surface such as stainless steel plates mirror-finished by buffing for example, or polished glassy carbon (amorphous carbon) plates as the flat plate 20. Particularly, the glassy carbon plate is excellent as it is high in surface hardness, sufficient in chemical stability, and is capable of enduring repeated use. Employing such a manufacturing method allows simplified and easy manufacturing of the planar electrode support for an actuator in the present invention.

Figure 13A:
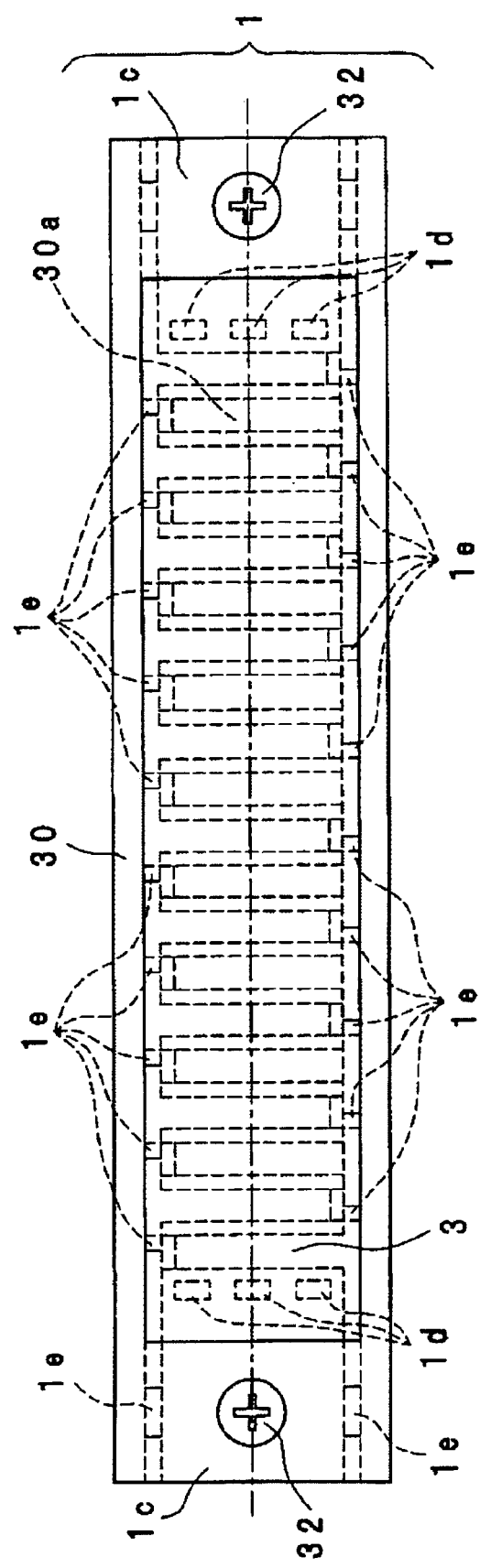
FIG. 13A is a plane view showing the state where a conductive polymer layer is formed on a substrate and an electrode sandwiched by a regulating jig for use in the manufacturing method in the fourth embodiment of the present invention.
Figure 13B:
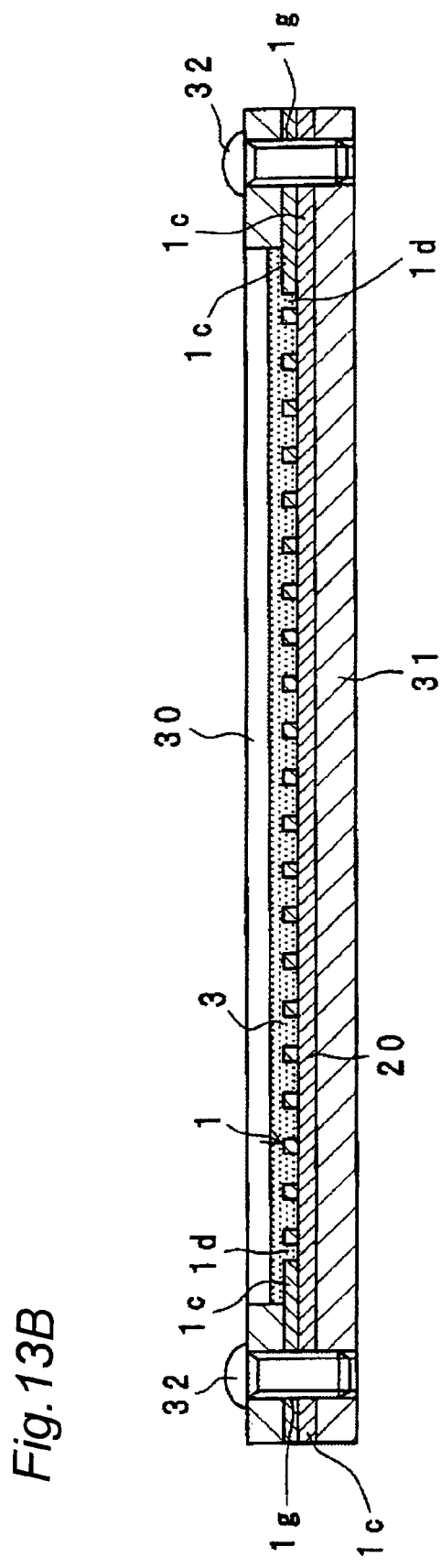
FIG. 13B is a cross sectional view showing the state where the conductive polymer layer is formed on the substrate and the electrode sandwiched by the regulating jig for use in the manufacturing method in the fourth embodiment of the present invention.

Further, FIG. 13A and FIG. 13B are a plane view and a cross sectional view showing a state where a regulating jig is used in the formation of a conductive polymer layer 3 by electrolytic polymerization, the conductive polymer 3 layer is formed on a substrate 20, and an electrode 1 sandwiched by the regulating jig. The regulating jig is composed of a base 31 on which the substrate 20 is placed and a rectangular frame-shaped mask plate 30 placed on the rectangular plate-like base 31 and having an aperture window 30*a* corresponding to the region in which the conductive polymer layer 3 is formed. With use of these, the substrate 20 is placed on the base 31 and is covered with the mask plate 30, and while the substrate 20 and the electrode 1 which are in close contact are interposed in between the base 31 and the mask plate 30, screws 32 are inserted into thru-holes of the mask plate 30 and the pin holes 1*g* of the electrode 1 on both the end portions and are screwed into screw holes on the substrate 20 for attachment. When these screwed substrate 20 and the electrode 1 are dipped in an electrolyte, portions of the substrate 20 and the electrode 1 other than the regions which are to constitute the conductive polymer layer 3 are sandwiched between the base 31 and the mask plate 30, as a result of which the conductive substrate 20 and electrode 1 are exposed to the electrolyte only at the location of the aperture window 30*a*, by which the conductive polymer layer 3 is synthesized by electrolytic polymerization only at this location.

Thus, with respect to the substrate 20 and the electrode 1, the portions other than the region in which the conductive polymer layer 3 is formed, are covered with the base 31 and the mask plate 30, so that only the region in which the conductive polymer layer 3 is formed is exposed, allowing the conductive polymer layer 3 in the region to be formed reliably and easily.

Figure 13C:
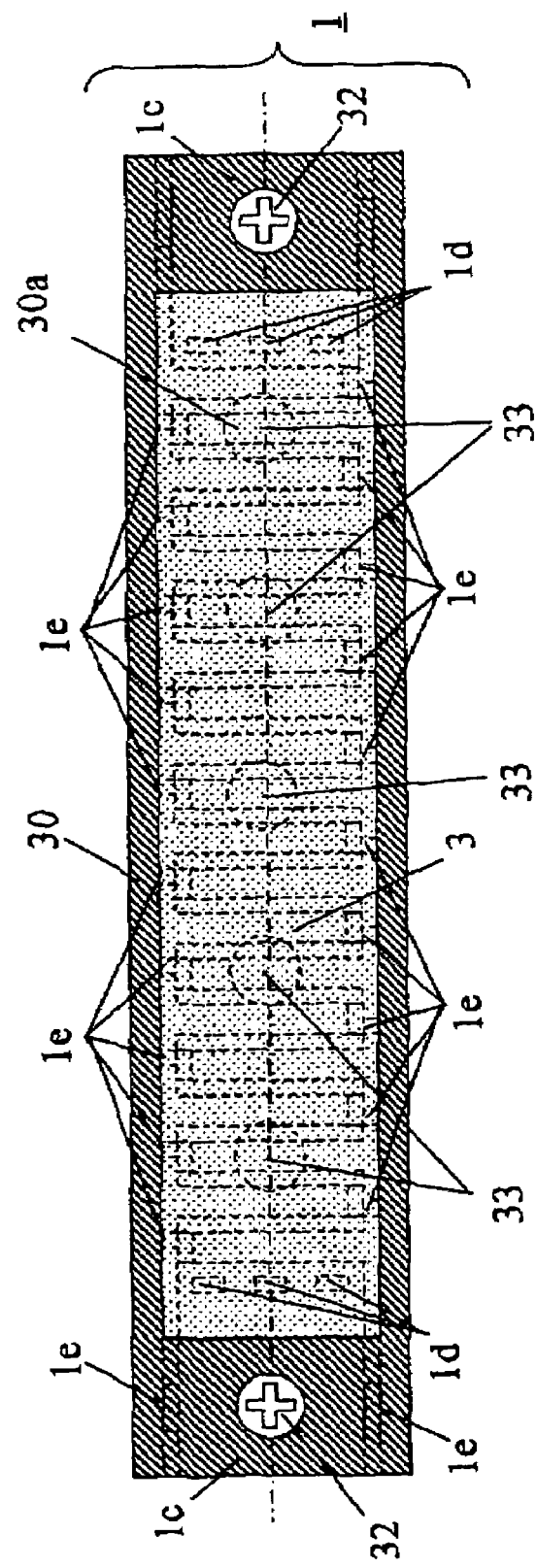
FIG. 13C is a plane view showing the state where a conductive polymer layer is formed on the substrate and the electrode sandwiched by a regulating jig with a magnet embedded in a base for use in a manufacturing method in a modified example of the fourth embodiment of the present invention.
Figure 13D:
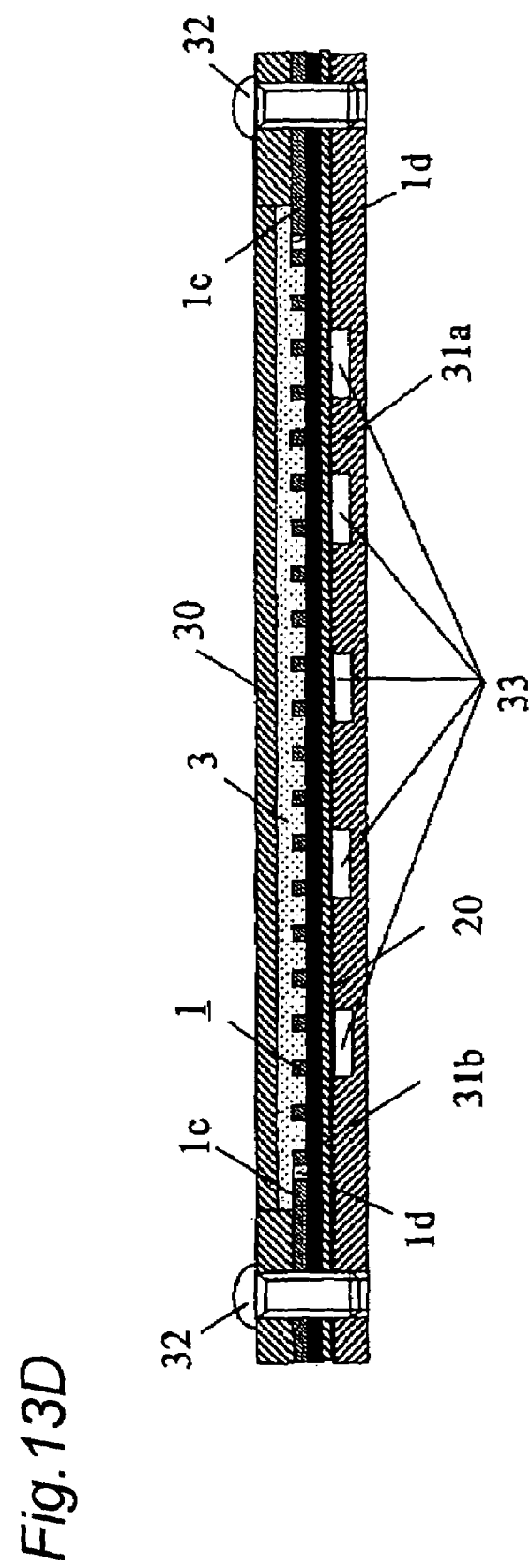
FIG. 13D is a cross sectional view showing the state where the conductive polymer layer is formed on the substrate and the electrode sandwiched by the regulating jig of FIG. 13C.

Further, FIG. 13C and FIG. 13D show a regulating jig with magnets 33 embedded in a base 31*a*, 31*b* as another embodiment of the regulating jig. FIG. 13E is a partially enlarged view showing a failure which may occur in the case of using the regulating jig of FIG. 13A and FIG. 13B, in which contact between the electrode 1 and the flat plate 20 may be poor enough to generate a gap 34. In the case where such a gap 34 is generated, local film defects are likely to be generated when conductive polymer is formed thereon. To cope with this issue, as shown in FIG. 13F, a thin plate made of magnetic materials such as magnetic stainless materials or nickel foils is used as the electrode 1 and the regulating jig with the magnets 33 embedded therein is used, so that the magnets 33 attract the electrode 1 toward the magnet side, which provides an effect of bringing the electrode 1 and the flat plate 20 into close contact without any gap. Further, in the case of forming the conductive polymer layer by electrolytic polymerization, synthesis initiation of the conductive polymer layer occurs with concentrated portions of magnetic fields in the vicinity of the magnets as a core, which allows synthesis of an entirely homogeneous conductive polymer layer. As the magnetic material of the planar electrode, stainless steel having magnetism such as SUS430, or nickel can be used as a material noncorrosive in the electrolyte.

Fifth Embodiment

Figure 14A:
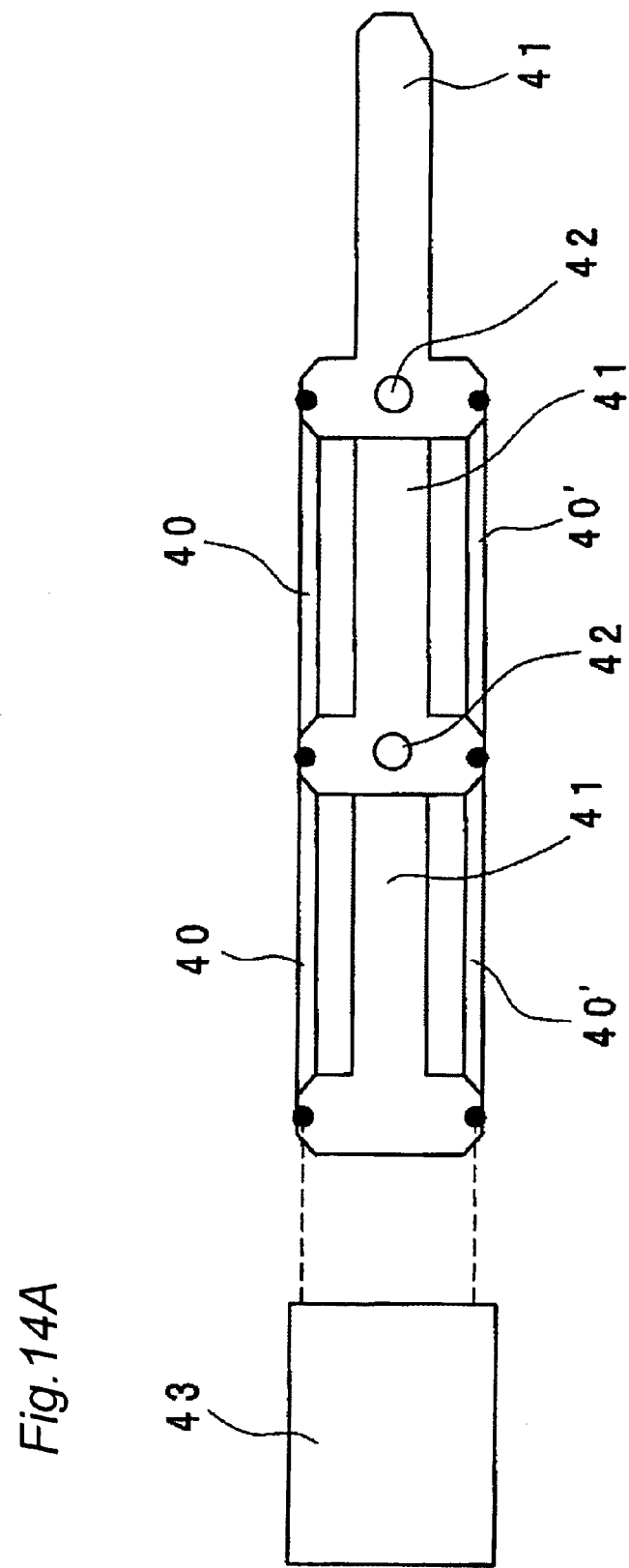
FIG. 14A is a side view showing a joint drive mechanism in a non drive state in a fifth embodiment of the present invention in which the actuator in the embodiment of the present invention being applied to an actuator of a joint drive mechanism.
Figure 14B:
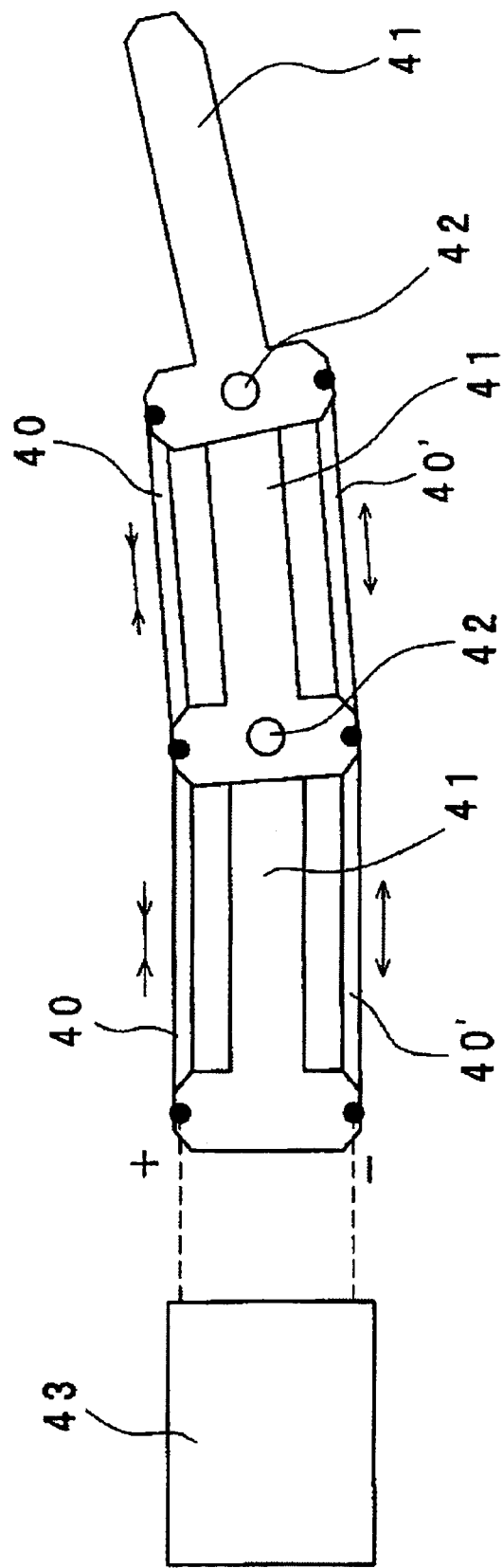
FIG. 14B is a side view showing the joint drive mechanism in a drive state in the fifth embodiment of the present invention in which the actuator in the embodiment of the present invention being applied to the actuator of the joint drive mechanism.

Examples of applying any one of the actuators in the first to fourth embodiments of the present invention to joint drive mechanism actuators 40, 40' are described as a fifth embodiment of the present invention. FIG. 14A is a side view showing the joint drive mechanism in the fifth embodiment. The joint drive mechanism is structured such that a pair of the actuators 40, 40' are linked across rotatable indirect portions 42 of indirect drive mechanisms which are connected through links 41, and a pair of these actuators 40, 40' are driven by antiphase voltages applied from a drive power source 43 to respective electrodes 1 and the like of the actuators 40, 40'. As the need arises, a pair of these actuators 40, 40' are antagonistically driven by superimposed bias voltages from the drive power source 43 applied to the respective electrodes 1 and the like. Consequently, as shown in FIG. 14B for example, the joint drive mechanism can be driven in such a way that the link 41 is inclined toward the right upper side as the conductive polymer layer 3 in the actuator 40 contracts along the longitudinal direction 5 as shown in FIG. 2D while the conductive polymer layer 3 in the actuator 40' expands along the longitudinal direction 5 as shown in FIG. 2B. Conversely, when voltages reverse to the above voltages are applied from the drive power source 43 to the respective electrodes 1 and the like of a pair of the actuators 40, 40', the joint drive mechanism can be driven in such a way that the link 41 is inclined toward the right lower side.

Therefore, it becomes possible to provide a joint drive mechanism for robots which is deformable and provides excellent controllability.

It is to be understood that among the aforementioned various embodiments, arbitrary embodiments may be properly combined so as to achieve the effects possessed by each embodiment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The actuator in the present invention is a flat-plate low-profile actuator having an electrolyte layer in contact with a planar conductive polymer layer disposed in between an electrode having the conductive polymer layer attached thereto and an opposite electrode, for deforming the conductive polymer layer to be swelled and shrunken by application of electric fields to between both electrodes, in which the electrode having the conductive polymer layer attached thereto is a planar electrode also serving as a support, which is patterned so that rigidity in a longitudinal direction that is an expansion and contraction direction of the conductive polymer layer is low while rigidity in a width direction almost orthogonal to the longitudinal direction is high. The actuator is usable as a drive source of various apparatuses such as robots which are expected to operate near the presence of human beings for housekeeping assistance, job assistance, and nursing help for elderly and physically-challenged persons in homes, offices, and hospitals, and as a flat-plate low-profile actuator in which the drive source itself is small-size, light-weighted, and flexible as well safe.

The invention claimed is:

1. A flat-plate low-profile actuator, comprising:
a planar conductive polymer layer extending in a longitudinal direction;
a first electrode in contact with the planar conductive polymer layer;
a second electrode disposed opposite to the first electrode; and
an electrolyte layer in contact with the planar conductive polymer layer, disposed in between the first electrode and the second electrode;
wherein the first electrode is planar and comprises at least one band-like portion and at least one link portion, each of the at least one link portion extending in the longitudinal direction, each of the at least one band-like portion extending in a direction perpendicular to the longitudinal direction, and each of the at least one link portion is shorter than each of the at least one band-like portion; and
wherein application of an electric potential between the first electrode and the second electrode deforms the planar conductive polymer layer such that the flat-plate low-profile actuator expands or contracts in the longitudinal direction;
wherein the first electrode is a zigzag-shaped planar electrode.

2. The flat-plate low-profile actuator as defined in claim 1, wherein the first electrode is a planar electrode, the at least one band-like portion is a plurality of band-like portions, the at least one link portion is a plurality of link portions, and the plurality of link portions connect adjacent pairs of the band-like portions.

3. The flat-plate low-profile actuator as defined in claim 1, further comprising planar extension portions disposed on two sides of the first electrode in the longitudinal direction, the planar extension portions being operable to transfer a force generated in the flat-plate low-profile actuator.

4. The flat-plate low-profile actuator as defined in claim 3, wherein the planar conductive polymer layer is disposed on front and back surfaces of the first electrode, and a hole is disposed in each of the extension portions so as to link the front and back planar conductive polymer layers for reinforcement.

5. The flat-plate low-profile actuator as defined in claim 1, wherein the first electrode and the second electrode are disposed on alternate sides of the flat-plate low-profile actuator.

6. The flat-plate low-profile actuator as defined in claim 1, wherein the first electrode is a thin plate having been subjected to a surface treatment.

7. The flat-plate low-profile actuator as defined in claim 1, wherein the planar conductive polymer layer is composed of a pi-conjugated polymer with a substrate comprising a substance selected from a group consisting of polyaniline, polypyrrole, polythiophene, a carbon dispersion conductive polymer, and an organic conductive polymer which is a derivative of polyaniline, polypyrrole, or polythiophene.

8. The flat-plate low-profile actuator as defined in claim 1, wherein the electrolyte layer is a polymer gel or a polymer containing an ionic liquid.

9. The flat-plate low-profile actuator as defined in claim 1, wherein a ratio of a thickness of the planar conductive polymer layer to a thickness of the first electrode is not more than 3.

10. The flat-plate low-profile actuator as defined in claim 1, wherein the first electrode is disposed such that the flat-plate low-profile actuator is less rigid in the longitudinal direction than a direction orthogonal to the longitudinal direction.

11. The flat-plate low-profile actuator as defined in claim 1, wherein the first electrode is a linear electrode.

12. The flat-plate low-profile actuator as defined in claim 1, wherein the first electrode comprises a plurality of interconnected linear electrode elements.

13. The flat-plate low-profile actuator as defined in claim 1, wherein the first electrode is a thin plate comprising a substance selected from a group consisting of carbon, gold, platinum, nickel, titanium, stainless steel, an alloy of gold, an alloy of platinum, an alloy of nickel, an alloy of titanium, and an alloy of stainless steel.

14. A flat-plate low-profile actuator, comprising:
a planar conductive polymer layer extending in a longitudinal direction;
a first electrode in contact with the planar conductive polymer layer;
a second electrode opposite to the first electrode; and
an electrolyte layer in contact with the planar conductive polymer layer, disposed in between the first electrode and the second electrode,
wherein the first electrode is planar and comprises at least one link portion extending in the longitudinal direction;
wherein the first electrode is disposed such that the flat-plate low-profile actuator is less rigid in the longitudinal direction than a direction orthogonal to the longitudinal direction; and
wherein the application of an electric potential between the first electrode and the second electrode deforms the planar conductive polymer layer such that the flat-plate low-profile actuator expands or contracts in the longitudinal direction;

wherein the planar conductive polymer layer has a first side extending in the longitudinal direction and a second side extending in the longitudinal direction; wherein the first electrode comprises a plurality of band-like portions, wherein the at least one link portion is a plurality of link portions, wherein the plurality of link portions connect adjacent band-like portions, and wherein the plurality of link portions alternate between being disposed on the first side and the second side such that the band-like portions and the link portions cumulatively form a zig-zag pattern.

15. The flat-plate low-profile actuator as defined in claim 14, wherein the first electrode comprises a plurality of interconnected linear electrode elements.

16. The flat-plate low-profile actuator as defined in claim 14, wherein the first electrode is a thin plate having been subjected to a surface treatment.

17. The flat-plate low-profile actuator as defined in claim 14, wherein the planar conductive polymer layer is composed of a pi-conjugated polymer with a substrate comprising a substance selected from a group consisting of polyaniline, polypyrrole, polythiophene, a carbon dispersion conductive polymer, and an organic conductive polymer which is a derivative of polyaniline, polypyrrole, or polythiophene.

18. The flat-plate low-profile actuator as defined in claim 14, wherein the first electrode is a thin plate comprising a substance selected from a group consisting of carbon, gold, platinum, nickel, titanium, stainless steel, an allow of gold, an allow of platinum, an alloy of nickel, an alloy of titanium, and an alloy of stainless steel.

19. A flat-plate low-profile actuator, comprising:
a planar conductive polymer layer extending in a longitudinal direction;
a first electrode in contact with the planar conductive polymer layer;
a second electrode disposed opposite to the first electrode; and
an electrolyte layer in contact with the planar conductive polymer layer, disposed in between the first electrode and the second electrode;
wherein the first electrode is planar and comprises at least one band-like portion and at least one link portion, each of the at least one link portion extending in the longitudinal direction, each of the at least one band-like portion extending in a direction perpendicular to the longitudinal direction, and each of the at least one link portion is shorter than each of the at least one band-like portion;
wherein application of an electric potential between the first electrode and the second electrode deforms the planar conductive polymer layer such that the flat-plate low-profile actuator expands or contracts in the longitudinal direction; and
wherein the planar conductive polymer layer has a first side extending in the longitudinal direction and a second side extending in the longitudinal direction; wherein the at least one band-like portion is a plurality of band-like portions, wherein the at least one link portion is a plurality of link portions, wherein the plurality of link portions connect adjacent band-like portions, and wherein the plurality of link portions alternate between being disposed on the first side and the second side such that the band-like portions and the link portions cumulatively form a zig-zag pattern.

* * * * *